United States Patent
Kaasten et al.

(10) Patent No.: US 7,512,586 B2
(45) Date of Patent: Mar. 31, 2009

(54) SYSTEM AND METHOD FOR FILTERING AND ORGANIZING ITEMS BASED ON COMMON ELEMENTS

(75) Inventors: Shaun A. Kaasten, Calgary (CA); Jason F. Moore, Redmond, WA (US); Kenneth M. Tubbs, Bellevue, WA (US); Relja Ivanovic, Redmond, WA (US); David G. De Vorchik, Seattle, WA (US); Richard M. Banks, Egham (GB); Patrice L. Miner, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 213 days.

(21) Appl. No.: 11/379,732

(22) Filed: Apr. 21, 2006

(65) Prior Publication Data

US 2006/0200466 A1 Sep. 7, 2006

Related U.S. Application Data

(63) Continuation of application No. 10/440,035, filed on May 16, 2003, now Pat. No. 7,162,466, which is a continuation-in-part of application No. 10/403,341, filed on Mar. 27, 2003.

(51) Int. Cl.
*G06F 17/30* (2006.01)
*G06F 17/20* (2006.01)

(52) U.S. Cl. ............... 707/1; 707/10; 707/100; 707/101; 707/200; 715/210

(58) Field of Classification Search ............ 707/1, 707/10, 100, 101, 200; 709/219, 231; 715/210
See application file for complete search history.

(56) References Cited

U.S. PATENT DOCUMENTS

| 5,241,671 A | 8/1993 | Reed et al. |
| 5,333,315 A | 7/1994 | Saether et al. |
| 5,388,196 A | 2/1995 | Pajak et al. |
| 5,461,710 A | 10/1995 | Bloomfield et al. |
| 5,499,364 A | 3/1996 | Klein et al. |
| 5,504,852 A | 4/1996 | Thompson-Rohrlich |

(Continued)

FOREIGN PATENT DOCUMENTS

CN 1421800 11/2001

(Continued)

OTHER PUBLICATIONS

Written Opinion of Singapore Application No. 200403220-7 dated May 18, 2006.

(Continued)

*Primary Examiner*—Pierre M Vital
*Assistant Examiner*—Fred I Ehichioya
(74) *Attorney, Agent, or Firm*—Shook, Hardy and Bacon

(57) ABSTRACT

A system and method for filtering and organizing items from computer memories based on common elements is provided. Filters are provided for manipulating the items. The filters are essentially tools for narrowing down a set of items. The filters can be dynamically generated based on the properties of the separate items. The system utilizes virtual folders. The virtual folders expose regular files and folders to users in different views based on their metadata instead of the actual physical underlying file system structure on the disk.

18 Claims, 40 Drawing Sheets

U.S. PATENT DOCUMENTS

| | | |
|---|---|---|
| 5,513,306 A | 4/1996 | Mills et al. |
| 5,544,360 A | 8/1996 | Lewak et al. |
| 5,559,948 A | 9/1996 | Bloomfield et al. |
| 5,598,524 A | 1/1997 | Johnston, Jr. et al. |
| 5,630,042 A | 5/1997 | McIntosh et al. |
| 5,680,563 A | 10/1997 | Edelman |
| 5,696,486 A | 12/1997 | Poliquin et al. |
| 5,757,925 A | 5/1998 | Faybishenko |
| 5,790,121 A | 8/1998 | Sklar et al. |
| 5,802,516 A | 9/1998 | Shwarts et al. |
| 5,831,606 A | 11/1998 | Nakajima et al. |
| 5,835,094 A | 11/1998 | Ermel et al. |
| 5,838,317 A | 11/1998 | Bolnick et al. |
| 5,838,322 A | 11/1998 | Nakajima et al. |
| 5,867,163 A | 2/1999 | Kurtenbach |
| 5,875,446 A | 2/1999 | Brown et al. |
| 5,878,410 A | 3/1999 | Zbikowski et al. |
| 5,899,995 A | 5/1999 | Millier et al. |
| 5,923,328 A | 7/1999 | Griesmer |
| 5,929,854 A | 7/1999 | Ross |
| 5,933,139 A | 8/1999 | Feigner et al. |
| 5,935,210 A | 8/1999 | Stark |
| 5,987,454 A | 11/1999 | Hobbs |
| 5,987,506 A | 11/1999 | Carter et al. |
| 6,003,040 A | 12/1999 | Mital et al. |
| 6,008,806 A | 12/1999 | Nakajima et al. |
| 6,014,137 A | 1/2000 | Burns |
| 6,016,692 A | 1/2000 | Schaenzer et al. |
| 6,021,262 A | 2/2000 | Cote et al. |
| 6,023,708 A | 2/2000 | Mendez et al. |
| 6,025,843 A | 2/2000 | Sklar |
| 6,037,944 A | 3/2000 | Hugh |
| 6,061,692 A | 5/2000 | Thomas et al. |
| 6,061,695 A | 5/2000 | Slivka et al. |
| 6,065,012 A | 5/2000 | Balsara et al. |
| 6,078,924 A | 6/2000 | Ainsbury et al. |
| 6,097,389 A | 8/2000 | Morris et al. |
| 6,144,968 A | 11/2000 | Zellweger |
| 6,147,601 A | 11/2000 | Sandelman et al. |
| 6,181,342 B1 | 1/2001 | Niblack |
| 6,202,061 B1 | 3/2001 | Khosla et al. |
| 6,237,011 B1 | 5/2001 | Ferguson et al. |
| 6,240,421 B1 | 5/2001 | Stolarz |
| 6,243,094 B1 | 6/2001 | Sklar |
| 6,243,724 B1 | 6/2001 | Mander et al. |
| 6,246,411 B1 | 6/2001 | Strauss |
| 6,256,031 B1 | 7/2001 | Meijer et al. |
| 6,268,852 B1 | 7/2001 | Lindhorst et al. |
| 6,275,829 B1 | 8/2001 | Angiulo et al. |
| 6,279,016 B1 * | 8/2001 | De Vorchik et al. ......... 715/210 |
| 6,308,173 B1 | 10/2001 | Glasser et al. |
| 6,317,142 B1 | 11/2001 | Decoste et al. |
| 6,324,551 B1 | 11/2001 | Lamping et al. |
| 6,339,767 B1 | 1/2002 | Rivette et al. |
| 6,341,280 B1 | 1/2002 | Glass et al. |
| 6,363,377 B1 | 3/2002 | Kravets et al. |
| 6,363,400 B1 | 3/2002 | Chtchetkine et al. |
| 6,401,097 B1 | 6/2002 | McCotter et al. |
| 6,411,311 B1 | 6/2002 | Rich et al. |
| 6,430,575 B1 | 8/2002 | Dourish et al. |
| 6,437,807 B1 | 8/2002 | Berquist et al. |
| 6,448,985 B1 | 9/2002 | McNally |
| 6,453,311 B1 | 9/2002 | Powers, III |
| 6,453,319 B1 | 9/2002 | Mattis et al. |
| 6,466,238 B1 | 10/2002 | Berry et al. |
| 6,466,932 B1 | 10/2002 | Dennis et al. |
| 6,470,344 B1 | 10/2002 | Kothuri et al. |
| 6,480,835 B1 | 11/2002 | Light |
| 6,505,233 B1 | 1/2003 | Hanson et al. |
| 6,513,038 B1 | 1/2003 | Hasegawa et al. |
| 6,526,399 B1 | 2/2003 | Coulson et al. |
| 6,535,229 B1 | 3/2003 | Kraft |
| 6,535,230 B1 | 3/2003 | Celik |
| 6,539,399 B1 | 3/2003 | Hazama et al. |
| 6,549,217 B1 | 4/2003 | De Greef et al. |
| 6,549,916 B1 | 4/2003 | Sedlar |
| 6,563,514 B1 | 5/2003 | Samar |
| 6,573,906 B1 | 6/2003 | Harding et al. |
| 6,573,907 B1 | 6/2003 | Madrane |
| 6,583,799 B1 | 6/2003 | Manolis et al. |
| 6,590,585 B1 | 7/2003 | Suzuki et al. |
| 6,606,105 B1 | 8/2003 | Quartetti |
| 6,613,101 B2 | 9/2003 | Mander et al. |
| 6,628,309 B1 | 9/2003 | Dodson et al. |
| 6,636,238 B1 | 10/2003 | Amir et al. |
| 6,636,250 B1 | 10/2003 | Gasser |
| 6,658,406 B1 | 12/2003 | Mazner et al. |
| 6,662,198 B2 | 12/2003 | Satyanarayanan et al. |
| 6,684,222 B1 | 1/2004 | Cornelius et al. |
| 6,735,623 B1 | 5/2004 | Prust |
| 6,738,770 B2 | 5/2004 | Gorman |
| 6,745,206 B2 | 6/2004 | Mandler et al. |
| 6,754,829 B1 | 6/2004 | Butt et al. |
| 6,762,776 B2 | 7/2004 | Huapaya |
| 6,762,777 B2 | 7/2004 | Carroll |
| 6,763,458 B1 | 7/2004 | Watanabe et al. |
| 6,768,999 B2 | 7/2004 | Prager et al. |
| 6,784,900 B1 | 8/2004 | Dobronsky et al. |
| 6,795,094 B1 | 9/2004 | Watanabe et al. |
| 6,801,919 B2 | 10/2004 | Hunt et al. |
| 6,803,926 B1 | 10/2004 | Lamb et al. |
| 6,816,863 B2 | 11/2004 | Bates et al. |
| 6,823,344 B1 | 11/2004 | Isensee et al. |
| 6,847,959 B1 | 1/2005 | Arrouye et al. |
| 6,853,391 B2 | 2/2005 | Bates et al. |
| 6,865,568 B2 | 3/2005 | Chau |
| 6,871,348 B1 | 3/2005 | Cooper |
| 6,876,900 B2 | 4/2005 | Takeda et al. |
| 6,876,996 B2 | 4/2005 | Czajkowski et al. |
| 6,880,132 B2 | 4/2005 | Uemura |
| 6,883,009 B2 | 4/2005 | Yoo |
| 6,883,146 B2 | 4/2005 | Prabhu et al. |
| 6,906,722 B2 | 6/2005 | Hrebejk et al. |
| 6,922,709 B2 | 7/2005 | Goodman |
| 6,938,207 B1 | 8/2005 | Haynes |
| 6,944,647 B2 | 9/2005 | Shah et al. |
| 6,947,959 B1 | 9/2005 | Gill |
| 6,950,818 B2 | 9/2005 | Dennis et al. |
| 6,952,724 B2 | 10/2005 | Prust |
| 6,980,993 B2 | 12/2005 | Horvitz et al. |
| 7,010,755 B2 | 3/2006 | Anderson et al. |
| 7,051,291 B2 | 5/2006 | Sciammarella et al. |
| 7,062,718 B2 | 6/2006 | Kodosky et al. |
| 7,068,291 B1 | 6/2006 | Roberts et al. |
| 7,139,811 B2 | 11/2006 | Lev Ran et al. |
| 7,203,948 B2 | 4/2007 | Mukundan et al. |
| 7,240,292 B2 | 7/2007 | Hally et al. |
| 7,293,031 B1 * | 11/2007 | Dusker et al. ............... 707/101 |
| 2001/0034771 A1 | 10/2001 | Hutsch et al. |
| 2001/0047368 A1 | 11/2001 | Oshinsky et al. |
| 2001/0049675 A1 | 12/2001 | Mandler et al. |
| 2001/0053996 A1 | 12/2001 | Atkinson |
| 2001/0056434 A1 | 12/2001 | Kaplan et al. |
| 2001/0056508 A1 | 12/2001 | Arneson et al. |
| 2002/0019935 A1 | 2/2002 | Andrew et al. |
| 2002/0033844 A1 | 3/2002 | Levy et al. |
| 2002/0046232 A1 | 4/2002 | Adams et al. |
| 2002/0046299 A1 | 4/2002 | Lefeber et al. |
| 2002/0049717 A1 | 4/2002 | Routtenberg et al. |
| 2002/0052885 A1 | 5/2002 | Levy |
| 2002/0054167 A1 | 5/2002 | Hugh |
| 2002/0059199 A1 | 5/2002 | Harvey |
| 2002/0062310 A1 | 5/2002 | Marmor et al. |
| 2002/0075310 A1 | 6/2002 | Prabhu et al. |

| | | | | | | |
|---|---|---|---|---|---|---|
| 2002/0075312 A1 | 6/2002 | Amadio et al. | | 2003/0212680 A1 | 11/2003 | Bates et al. |
| 2002/0075330 A1 | 6/2002 | Rosenzweig et al. | | 2003/0212710 A1 | 11/2003 | Guy |
| 2002/0087740 A1 | 7/2002 | Castanho et al. | | 2003/0222915 A1 | 12/2003 | Marion et al. |
| 2002/0087969 A1 | 7/2002 | Brunheroto et al. | | 2003/0225796 A1 | 12/2003 | Matsubara |
| 2002/0089540 A1 | 7/2002 | Geier et al. | | 2003/0227487 A1 | 12/2003 | Hugh |
| 2002/0091679 A1 | 7/2002 | Wright | | 2003/0233419 A1 | 12/2003 | Beringer |
| 2002/0091697 A1 | 7/2002 | Huang et al. | | 2004/0001106 A1 | 1/2004 | Deutscher et al. |
| 2002/0091739 A1 | 7/2002 | Ferlitsch et al. | | 2004/0002993 A1 | 1/2004 | Toussaint et al. |
| 2002/0095416 A1 | 7/2002 | Schwols | | 2004/0003247 A1 | 1/2004 | Fraser et al. |
| 2002/0097278 A1 | 7/2002 | Mandler et al. | | 2004/0006549 A1 | 1/2004 | Mullins et al. |
| 2002/0103998 A1 | 8/2002 | DeBruine | | 2004/0008226 A1 | 1/2004 | Manolis et al. |
| 2002/0104069 A1 | 8/2002 | Gouge et al. | | 2004/0019584 A1 | 1/2004 | Greening et al. |
| 2002/0107973 A1* | 8/2002 | Lennon et al. ............... 709/231 | | 2004/0019655 A1 | 1/2004 | Uemura et al. |
| 2002/0111942 A1 | 8/2002 | Campbell et al. | | 2004/0030731 A1 | 2/2004 | Iftode et al. |
| 2002/0113821 A1 | 8/2002 | Hrebejk et al. | | 2004/0044696 A1 | 3/2004 | Frost |
| 2002/0120505 A1 | 8/2002 | Henkin et al. | | 2004/0044776 A1 | 3/2004 | Larkin |
| 2002/0120757 A1 | 8/2002 | Sutherland et al. | | 2004/0054674 A1 | 3/2004 | Carpenter et al. |
| 2002/0129033 A1 | 9/2002 | Hoxie et al. | | 2004/0056896 A1 | 3/2004 | Doblmayr et al. |
| 2002/0138552 A1 | 9/2002 | DeBruine et al. | | 2004/0068524 A1 | 4/2004 | Aboulhosn et al. |
| 2002/0138582 A1 | 9/2002 | Chandra et al. | | 2004/0070612 A1 | 4/2004 | Sinclair et al. |
| 2002/0138744 A1 | 9/2002 | Schleicher et al. | | 2004/0083433 A1 | 4/2004 | Takeya |
| 2002/0149888 A1 | 10/2002 | Motonishi et al. | | 2004/0085581 A1 | 5/2004 | Tonkin |
| 2002/0152262 A1 | 10/2002 | Arkin et al. | | 2004/0088374 A1 | 5/2004 | Webb et al. |
| 2002/0152267 A1 | 10/2002 | Lennon | | 2004/0091175 A1 | 5/2004 | Beyrouti |
| 2002/0156895 A1 | 10/2002 | Brown | | 2004/0098370 A1 | 5/2004 | Garland et al. |
| 2002/0161800 A1 | 10/2002 | Eld et al. | | 2004/0098379 A1 | 5/2004 | Huang |
| 2002/0163572 A1 | 11/2002 | Center et al. | | 2004/0098742 A1 | 5/2004 | Hsieh et al. |
| 2002/0169678 A1 | 11/2002 | Chao et al. | | 2004/0103073 A1 | 5/2004 | Blake et al. |
| 2002/0184357 A1 | 12/2002 | Traversat et al. | | 2004/0103280 A1 | 5/2004 | Balfanz et al. |
| 2002/0188605 A1 | 12/2002 | Adya et al. | | 2004/0117358 A1 | 6/2004 | Von Kaenel et al. |
| 2002/0188735 A1 | 12/2002 | Needham et al. | | 2004/0133572 A1 | 7/2004 | Bailey et al. |
| 2002/0194252 A1 | 12/2002 | Powers, III | | 2004/0133588 A1 | 7/2004 | Kiessig et al. |
| 2002/0196276 A1 | 12/2002 | Corl et al. | | 2004/0148434 A1 | 7/2004 | Matsubara et al. |
| 2002/0199061 A1 | 12/2002 | Friedman et al. | | 2004/0153451 A1 | 8/2004 | Phillips et al. |
| 2003/0001964 A1 | 1/2003 | Masukura et al. | | 2004/0153968 A1 | 8/2004 | Ching et al. |
| 2003/0009484 A1 | 1/2003 | Hamanaka et al. | | 2004/0167942 A1 | 8/2004 | Oshinsky et al. |
| 2003/0014415 A1 | 1/2003 | Weiss et al. | | 2004/0177116 A1 | 9/2004 | McConn et al. |
| 2003/0018657 A1 | 1/2003 | Monday | | 2004/0177148 A1 | 9/2004 | Tsimelzon, Jr. |
| 2003/0018712 A1 | 1/2003 | Harrow et al. | | 2004/0177319 A1 | 9/2004 | Horn |
| 2003/0028610 A1 | 2/2003 | Pearson | | 2004/0183824 A1 | 9/2004 | Benson et al. |
| 2003/0037060 A1 | 2/2003 | Kuehnel | | 2004/0189704 A1 | 9/2004 | Walsh et al. |
| 2003/0041178 A1 | 2/2003 | Brouk et al. | | 2004/0189707 A1 | 9/2004 | Moore et al. |
| 2003/0046260 A1 | 3/2003 | Satyanarayanan et al. | | 2004/0193594 A1 | 9/2004 | Moore et al. |
| 2003/0069893 A1 | 4/2003 | Kanai et al. | | 2004/0193600 A1 | 9/2004 | Kaasten et al. |
| 2003/0069908 A1 | 4/2003 | Anthony et al. | | 2004/0193621 A1 | 9/2004 | Moore et al. |
| 2003/0074356 A1 | 4/2003 | Kaier et al. | | 2004/0193672 A1 | 9/2004 | Samji et al. |
| 2003/0078918 A1 | 4/2003 | Souvignier et al. | | 2004/0193673 A1 | 9/2004 | Samji et al. |
| 2003/0081007 A1 | 5/2003 | Cyr et al. | | 2004/0199507 A1 | 10/2004 | Tawa |
| 2003/0084425 A1 | 5/2003 | Glaser | | 2004/0205168 A1 | 10/2004 | Asher |
| 2003/0093321 A1 | 5/2003 | Bodmer et al. | | 2004/0205625 A1 | 10/2004 | Banatwala et al. |
| 2003/0093531 A1 | 5/2003 | Yeung et al. | | 2004/0205633 A1 | 10/2004 | Martinez et al. |
| 2003/0093580 A1 | 5/2003 | Thomas et al. | | 2004/0205698 A1 | 10/2004 | Schliesmann et al. |
| 2003/0098881 A1 | 5/2003 | Nolte et al. | | 2004/0215600 A1 | 10/2004 | Aridor et al. |
| 2003/0101200 A1 | 5/2003 | Koyama et al. | | 2004/0220899 A1 | 11/2004 | Barney et al. |
| 2003/0105745 A1 | 6/2003 | Davidson et al. | | 2004/0223057 A1 | 11/2004 | Oura et al. |
| 2003/0110188 A1 | 6/2003 | Howard et al. | | 2004/0225650 A1 | 11/2004 | Cooper et al. |
| 2003/0115218 A1 | 6/2003 | Bobbitt et al. | | 2004/0230572 A1 | 11/2004 | Omoigui |
| 2003/0117403 A1 | 6/2003 | Park et al. | | 2004/0230599 A1 | 11/2004 | Moore et al. |
| 2003/0117422 A1 | 6/2003 | Hiyama et al. | | 2004/0230917 A1 | 11/2004 | Bales et al. |
| 2003/0120928 A1 | 6/2003 | Cato et al. | | 2004/0249902 A1 | 12/2004 | Tadayon et al. |
| 2003/0120952 A1 | 6/2003 | Tarbotton et al. | | 2005/0004928 A1 | 1/2005 | Hamer et al. |
| 2003/0122873 A1 | 7/2003 | Dieberger et al. | | 2005/0010860 A1 | 1/2005 | Weiss et al. |
| 2003/0126136 A1 | 7/2003 | Omoigui | | 2005/0015405 A1 | 1/2005 | Plastina et al. |
| 2003/0126212 A1 | 7/2003 | Morris et al. | | 2005/0027757 A1 | 2/2005 | Kiessig et al. |
| 2003/0135495 A1 | 7/2003 | Vagnozzi | | 2005/0050470 A1 | 3/2005 | Hudson et al. |
| 2003/0135517 A1 | 7/2003 | Kauffman | | 2005/0055306 A1 | 3/2005 | Miller et al. |
| 2003/0135659 A1 | 7/2003 | Bellotti et al. | | 2005/0080807 A1 | 4/2005 | Beilinson et al. |
| 2003/0140115 A1 | 7/2003 | Mehra | | 2005/0097477 A1 | 5/2005 | Camara et al. |
| 2003/0154185 A1 | 8/2003 | Suzuki et al. | | 2005/0114672 A1 | 5/2005 | Duncan et al. |
| 2003/0158855 A1 | 8/2003 | Farnham et al. | | 2005/0120242 A1 | 6/2005 | Mayer et al. |
| 2003/0177422 A1 | 9/2003 | Taroukhine et al. | | 2005/0131903 A1 | 6/2005 | Margolus et al. |
| 2003/0184587 A1 | 10/2003 | Ording et al. | | 2005/0149481 A1 | 7/2005 | Hesselink et al. |
| 2003/0210281 A1 | 11/2003 | Ellis et al. | | 2005/0166159 A1 | 7/2005 | Mondry et al. |

| | | | |
|---|---|---|---|
| 2005/0171947 | A1 | 8/2005 | Gautestad |
| 2005/0192953 | A1 | 9/2005 | Neale et al. |
| 2005/0192966 | A1 | 9/2005 | Hilbert et al. |
| 2005/0243993 | A1 | 11/2005 | McKinzie et al. |
| 2005/0246331 | A1 | 11/2005 | De Vorchik et al. |
| 2005/0246643 | A1 | 11/2005 | Gusmorino et al. |
| 2005/0246664 | A1 | 11/2005 | Michelman et al. |
| 2005/0256909 | A1 | 11/2005 | Aboulhosn et al. |
| 2005/0257169 | A1 | 11/2005 | Tu |
| 2005/0283476 | A1 | 12/2005 | Kaasten et al. |
| 2006/0004692 | A1 | 1/2006 | Kaasten et al. |
| 2006/0020586 | A1 | 1/2006 | Prompt et al. |
| 2006/0036568 | A1 | 2/2006 | Moore et al. |
| 2006/0053066 | A1 | 3/2006 | Sherr et al. |
| 2006/0080308 | A1 | 4/2006 | Carpentier et al. |
| 2006/0129627 | A1 | 6/2006 | Phillips et al. |
| 2006/0173873 | A1 | 8/2006 | Prompt et al. |
| 2006/0200466 | A1 | 9/2006 | Kaasten et al. |
| 2006/0200832 | A1 | 9/2006 | Dutton |
| 2006/0218122 | A1 | 9/2006 | Poston et al. |
| 2006/0277432 | A1 | 12/2006 | Patel et al. |
| 2007/0168885 | A1 | 7/2007 | Muller et al. |
| 2007/0180432 | A1 | 8/2007 | Gassner et al. |
| 2007/0186183 | A1 | 8/2007 | Hudson |

FOREIGN PATENT DOCUMENTS

| | | |
|---|---|---|
| GB | 2329492 | 3/1999 |
| WO | 9938092 | 7/1999 |
| WO | WO 0225420 | 3/2002 |
| WO | WO 2004107151 | 9/2004 |

OTHER PUBLICATIONS

McFedries, Paul; "The Complete Idiot's Guide to Windows XP", Table of Contents, Oct. 3, 2001, Alpha Books, Ch. 6: Using My Computer to Fiddle w/h Files and Folder-printed p. 1-6, Finding a File in Mess p. 103.

Langer, Maria, Mac OS X: Visual QuickStart Guide; Apr. 2001, Peachpit Press, Mac OS X Disk Organization (pp. 1-3), Views (pp. 1-11), Outlines (1-3).

Ray, Jay, Mac OS X Unleashed, Nov. 2001, Sams, Chapter 4. The Finder: Working with Files and Applications (pp. 1-15), Getting File Information (pp. 1-7).

International Search Report and Written Opinion of PCT/US04/25931 dated Apr. 3, 2007.

Kuchinsky, et al., "FotoFile: A Consumer Multimedia Organization and Retrieval System", May 1999, ACM, pp. 496-503.

Written Opinion of SG 200301764-7 dated Jan. 11, 2007.

Windows Commander (website), <URL: http://www.ghisler.com>, accessed using http://www.archive.org/web/web.php, in particular, http://web.archive.org/web/20030207145141/www.ghisler.com/featurel.htm, archived on Feb. 7, 2003; http://web.archive.org/web/20021017022627/www.ghisler.com/addons.htm, archived on Oct. 17, 2002; http://web.archive.org/web/20021009213316/www.ghisler.com/efaquser.htm, archived on Oct. 9, 2003; unable to access website.

Bott, et al., "Microsoft Windows XP Inside Out", Microsoft Press, 2001, Chapter 11, 39 pages.

Bott, et al., Book titled "Special Edition Using Windows 98, Second Edition", Dec. 21, 1999, second edition, pp. 1-7.

Supplementary European Search Report for EP 04780390 dated Jun. 18, 2007.

Olivie, et al., "A Generic Metadata Query Tool", 1999, pp. 1-8.

Rathbone, Windows XP for Dummies, 2001, Wiley Publishing, Inc., pp. 145, 203 and 204.

Microsoft Windows XP Professional, 1985-2001.

Grosky, et al., "Using Metadata for Intelligent Browsing of Structured Media Objects", Dec. 1994, Sigmond Record, vol. 23, No. 4, pp. 49-56.

International Search Report for PCT/US06/26854 dated Sep. 25, 2007.

Examination Report for New Zealand Patent No. 534665 dated Jul. 27, 2007.

Russian Official Action and English Translation of Official Action for Application No. 2003114526/09 dated May 11, 2007, 7 pages.

Lee, J., "An End-User Perspective on File-Sharing Systems," Communications of the ACM 46(2):49-53, Feb. 2003.

Ohtani, A., et al., "A File Sharing Method For Storing Area Network and Its Performance Verification," NEC Res. & Develop. 44(1):85-90, Jan. 2003.

H. Weinreich, et al., "The Look of the Link—Concepts of the User Interface of Extended Hyperlinks," Proceedings of the Twelfth ACM Conference on Hypertext and Hypermedia, Hypertext '01, Aarhus, Denmark, Aug. 2001, pp. 19-28.

Seltzer, M., et al., "Journaling Versus Soft Updates: Asynchronous Meta-data Protection in File Systems," Proceedings of the 2000 USENIX Technical Conference, San Diego, CA, Jun. 18-23, 2000, pp. 71-84.

R. Rao, et al., "Rich Interaction in the Digital Library," Communications of the ACM 38(4):29-39. 1995.

Piernas, J., et al., "DualIFS: A New Journaling File System Without Meta-Data Duplication," Conference Proceedings of the 2002 International Conference on Supercomputing, New York, Jun. 22-26, 2002, p. 137-146.

Manber, U., and S. Wu, "Glimpse: A Tool to Search Through Entire File Systems," Proceedings of USENIX Winter 1994 Conference, San Francisco, Ca, Jan. 17-21, 1994.

Coster, R., and D. Svensson, "Inverted File Search Algorithms for Collaborative Filtering," Proceedings of the 25th Annual International ACM SIGIR Conference on Research and Development in Information Retrieval, Tampere, Finland, Aug. 11-15, 2002.

Gifford, D.K., et al., "Semantic File Systems," Proceedings of the 13th ACM Symposium on Operating Systems Principles, Pacific Grove CA., Sep. 1991, pp. 16-25.

Blair, C., and G.E. Monahan, "Optimal Sequential File Search: A Reduced-State Dynamic Programming Approach," European Journal of Operational Research 86(2):358-365, 1995.

Clay, L.M., et al., Posting Protocol for Improved Keyword Search Success in Peer-to-Peer File Sharing Systems, Proceedings of SPIE-Int. Soc. Opt. Eng., Santa Clara, CA, Jan. 23-24, 2003, vol. 5019, pp. 138-149.

Na, J., and V. Rajaravivarma, "Multimedia File Sharing in Multimedia Home or Office Business Networks," Proceedings of the 35th Southeastern Symposium on System Theory, Morgantown, W. Va., Mar. 16-18, 2003, pp. 237-241.

Kwon G., and K.D. Ryu, "An Efficient Peer-to-Peer File Sharing Exploiting Hierarchy and Asymmetry," Proceedings of the 2003 Symposium on Applications and the Internet, Orlando, Fla., Jan. 27-31, 2003, pp. 226-233.

Qian, J., et al., "ACLA: A Framework for Access Control List (ACL) Analysis and Optimization," Fifth Joint Working Conference on Communications and Multimedia Security, Darnstadt, Germany, May 21-22, 2001, pp. 197-211.

Rao, J.R., "Some Performance Measures of File Sharing on Multiple Computer Systems," Proceedings of the Conference on Modeling and Simulation, vol. 6, Part I, Pittsburgh, Penn., Apr. 24-25, 1976, pp. 527-530.

Reinauer, R., "UNIX System V.# Remote File Sharing Capabilities and Administration," Unisphere 8(6):64-68, Sep. 1988.

Templin, P.J., Jr., "Providing a Centralized File Sharing Resource at Bucknell University", Proceedings of the User Services Conference for College and University Computing Services Organization, Bloomington, Ind., Oct. 25-28, 1998, pp. 289-292.

Yamai, N. et al., "NFS-Based Secure File Sharing Over Multiple Administrative Domains With Minimal Administration," Systems and Computers in Japan 33(14):50-58, Dec. 2002.

Yong Kyu Lee, et al., Metadata Management of the SANtopia File System, Proceedomgs of the 8th International Conference onParallel and Distributed Systems (ICPADS 2001), Kyoungju City, Korea, Jun. 26-29, 2001, pp. 492-499, IEEE Computer Society, 2001, ISBN 0-7695-1153-8.

Horst F. Wedde, et al., A Universal Framework for Managing Metadata in the Distributed Dragon Slayer System, Proceedings of the 26th Euromicro Conference (Euromicro'00), vol. 2, Maastricht, The Netherlands, Sep. 5-7, 2000, pp. 96-101, IEEE Computer Society, 2000, ISBN 1089-6503.

Jolon Faichney, et al., Goldleaf Hierarchical Document Browser, Second Australian User Interface Conference (AUIC'01), Gold Coast, Queensland, Australia, Jan. 29-February 1, 2001, pp. 13-20, IEEE Computer Society, 2001, ISBN 0-7695-0969-X.

Dino Esposito, New Graphical Interface: Enhance Your Programs with New Windows XP Shell Features, MSDN Magazine, Nov. 2001, vol. 16, No. 11.

Stuart Yeates, et al., Tag Insertion Complexity, Data Compression Conference, (DCC 2001), Snowbird, Utah, USA, Mar. 27-29, 2001,pp. 243-252, IEEE Computer Society2001, ISBN 1068-0314.

Bipin C. Desal, et al., Resource Discovery: Modeling, Cataloguing and Searching, Seventh International Workshop on Database and Expert Systems Applications (DEXA '96), Zurich, Switzerland, Sep. 9-10, 1996, pp. 70-75, IEEE-CS Press, 1996, ISBN 0-8186-7662-0.

Gulrukh Ahanger, et al., Automatic Composition Techniques for Video Production, IEEE Transactions on Knowledge and Data Engineering, Nov./Dec. 1998, pp. 967-987, vol. 10, No. 6, IEEE Computer Society, 1998, ISBN 1041-4347.

Jane Hunter, An Overview of the MPEG-7 Description Language (DDL), IEEE Transactions on Circuits and Systems for Video Technology, Jun. 2001, pp. 765-772, vol. 11, No. 6, IEEE Computer Society, 2001, ISBN 1051-8215.

Philippe Salembier, et al., MPEG-7 Multimedia Description Schemes, IEEE Transactions on Circuits and Systems for Video Technology, Jun. 2001, pp. 748-759, vol. 11, No. 6, IEEE Computer Society, 2001, ISBN 1051-8215.

Thomas Sikora, The MPEG-7 Visual Standard for Content Description—An Overview, IEEE Transactions on Circuits and Systems for Video Technology, Jun. 2001, pp. 696-702, vol. 11, No. 6, IEEE Computer Society, 2001, ISBN 1051-8215.

B.S. Manjunath, et al., Color and Texture Descriptors, IEEE Transactions on Circuits and Systems for Video Technology, Jun. 2001, pp. 703-715, vol. 11, No. 6, IEEE Computer Society, 2001, ISBN 1051-8215.

"Predefined Properties" http://help.sap.comlsaphelp—ep50sp5/helpdata/en/la/9a4a3b80f2ec40aa7456bc87a94259/content.htm.

"Info Vision Infonnation Management System" http://66.1 02. 7.1 04/search?q=cache:m IXV6K6sQOQJ :www.amlib.netlproducts/infovision.htm+customised+ multi+property+file+navigation &hl=en.

"Previewing Files in the Common Dialog" http://www .elitevb.comlcontentiO 1,0084,0 II.

"TdcFolderListView component" http://www.appcontrols.comlmanualsldiskcontrols/index.html?tdcfolderlistview.htm.

"Previewing Files" http://developer.apple.comldocumentation/QuickTimeIINMAC/QT/iqMovieToolbox.1a.htm.

"Text File Previewer 2.0 Beta" http://www .freedownloadscenter.comlUtilitiesITextViewersITextFile]reviewer.html.

"Your Next OS: Windows 2006?" http://www.pcworld.comlnewsiarticle/O,aid,II3'63I,OO.asp.

"GetOpenFileName Function," downloaded from <http://msdn.microsoft.com>; date of first publication prior to Mar. 28, 2005; 2 pages.

"GetSaveFileName Function," downloaded from <http://msdn.microsoft.com>; date of first publication prior to Mar. 28, 2005; 2 pages.

"Using Common Dialog Boxes," downloaded from <http://msdn.microsoft.com>; date of first publication prior to Mar. 28, 2005; 8 pages.

"How to Use a Common Dialog File Open Dialog with Win32 API," downloaded from <http://support.microsoft.com>; date of first publication prior to Mar. 28, 2005; 3 pp.

"Creating an Enhanced Metafile," downloaded from <http://msdn.microsoft.com>; date of first publication prior to Mar. 28, 2005; 2 pages.

"Common Dialog Box Library," downloaded from <http://msdn.microsoft.com>: date of first publication prior to Mar. 28, 2005; 8 pages.

"OPENFILENAME Structure," downloaded from <http://msdn.microsoft.com>; date of first publication prior to Mar. 28, 2005; 7 pages.

"Open and Save as Dialog Boxes," downloaded from <http://msdn.microsoft.com>; date of first publication prior to Mar. 29, 2005; 9 pages.

"Customizing common dialog boxes," downloaded from http://msdn.microsoft.com; date for first publication prior to Apr. 20, 2005, 4 pages.

G.D. Venolia, et al., Supporting Email Workflow. Microsoft Research Technical Report MSR-TR-2001-88. Revised Dec. 2001 (Original Sep. 2001). Microsoft Corporation, Redmond, WA.

G.D. Venolia and C. Neustaedter. Understanding Sequence and Reply Relationships within Email Converstations: A Mixed-Model Visualization. Microsoft Research Technical Report MSR-TR-2002-102. Sep. 23, 2002 (Revised Jan. 13, 2003).

Microsoft Digital Image Suite User's Manual, Version 9.0. pp. 105-118, Available: http://www.microsoft.com/products/imaging/guides/SuiteManual.pdf, Apr. 30, 2004.

"Using Tags to Organize Your Photos.", Adobe Photoshop Album 2.0 Tutorial, Available: http://www.adobe.com/digitalimag/tips/phsaltaggin/pdfs/phsaltaggin.pdf, Apr. 30, 2004.

Examples of dialogs user interfaces; date of first publication prior to Mar. 31, 2005; 8 pages.

"Visually Theming and Styling Your Applications and Documents" (CLI 308); downloaded from <http://msdn.microsoft.com/longhorn/pdcmaterials/pdctalksavalon/>; date of first publication prior to Mar. 31, 2005; 34 pages.

New User Interface Possibilities in Longhorn (CLI 304); downloaded from <http://msdn.microsoft.com/longhorn/pdcmaterials/pdctalksavalon/>; date of first publication prior to Mar. 31, 2005; 45 pages.

Windows Forms: Exploiting Windows Longhorn "Features from Within Your Application" (CLI 391); downloaded from http://msdn.microsoft.com/longhorn/pdcmaterials/pdctalksavalon/>; date of first publication prior to Mar. 31, 2005; 27 pages.

MessageBox Function; downloaded from <http://msdn.microsoft.com>; date of first publication prior to Mar. 31, 2005; 4 pages.

Creating and Installing Theme Files; downloaded from <http://msdn.microsoft.com>; date of first publication prior to Feb. 21, 2005; 4 pages.

"MessageBox Function"; downloaded from <http://msdn.microsoft.com>; date of first publication prior to Mar. 31, 2005; 4 pages.

"Creating and Installing Theme Files"; downloaded from <http://msdn.microsoft.com>; date of first publication prior to Feb. 21, 2005; 4 pages.

"About Dialog Boxes"; downloaded from <http://msdn.microsoft.com>; date of first publication prior to Feb. 21, 2005; 10 pages.

"Property Sheets and Inspectors"; downloaded from <http://msdn.microsoft.com>; date of first publication prior to Feb. 21, 2005; 6 pages.

"PROPSHEETPAGE"; downloaded from <http://msdn.microsoft.com>; date of first publication prior to Feb. 21, 2005; 3 pages.

"DialogProc Function"; downloaded from <http://msdn.microsoft.com>; date of first publication prior to Feb. 21, 2005; 2 pages.

"Creating Wizards"; downloaded from <http://msdn.microsoft.com>; date of first publication prior to Mar. 31, 2005; 17 pages.

"Property Sheets"; downloaded from <http://msdn.microsoft.com>; date of first publication prior to Mar. 31, 2005; 7 pages.

"Property Sheet Reference"; downloaded from <http://msdn.microsoft.com>; date of first publication prior to Mar. 31, 2005; 5 pages.

"DRAWITEMSTRUCT Structure"; downloaded from <http://msdn.microsoft.com>; date of first publication prior to Feb. 25, 2005; 3 pages.

"Using Buttons"; downloaded from <http://msdn.microsoft.com>; date of first publication prior to Feb. 25, 2005; 5 pages.

Button Messages; downloaded from <http://msdn.microsoft.com>; date of first publication prior to Feb. 25, 2005; 4 pages.

"Button Styles"; downloaded from <http://msdn.microsoft.com>; date of first publication prior to Feb. 25, 2005; 2 pages.

"CreateWindow Function"; downloaded from <http://msdn.microsoft.com>; date of first publication prior to Feb. 25, 2005; 5 pages.

"Using Dialog Boxes"; downloaded from <http://msdn.microsoft.com>; date of first publication prior to Mar. 31, 2005; 8 pages.

"CreatePropertySheetPage Function"; downloaded from <http://msdn.microsoft.com>; date of first publication prior to Mar. 31, 2005; 1 page.

"DestroyPropertySheetPage Function"; downloaded from <http://msdn.microsoft.com>; date of first publication prior to Mar. 31, 2005; 1 page.

"PropertySheet Function"; downloaded from <http://msdn.microsoft.com>; date of first publication prior to Mar. 31, 2005; 2 pages.

"PropSheetPageProc Function"; downloaded from <http://msdn.microsoft.com>; date of first publication prior to Mar. 31, 2005; 2 pages.

"PropSheetProc Function"; downloaded from <http://msdn.microsoft.com>; date of first publication prior to Mar. 31, 2005; 2 pages.

"PSN_KILLACTIVE Notification"; downloaded from <http://msdn.microsoft.com>; date of first publication prior to Mar. 31, 2005; 1 page.

"PSN_QUERYCANCEL Notification"; downloaded from <http://msdn.microsoft.com>; date of first publication prior to Mar. 31, 2005; 1 page.

"PSN_RESET Notification"; downloaded from <http://msdn.microsoft.com>; date of first publication prior to Mar. 31, 2005; 1 page.

"PSN_SETACTIVE Notification"; downloaded from <http://msdn.microsoft.com>; date of first publication prior to Mar. 31, 2005; 1 page.

"PSN_TRANSLATEACCELERATOR Notification"; downloaded from <http://msdn.microsoft.com>; date of first publication prior to Mar. 31, 2005; 1 page.

"PSN_WIZBACK Notification"; downloaded from <http://msdn.microsoft.com>; date of first publication prior to Mar. 31, 2005; 3 pages.

"PSN_WIZFINISH Notification" ; downloaded from <http://msdn.microsoft.com>; date of first publication prior to Mar. 31, 2005; 1 page.

"PSN_WIZNEXT Notification"; downloaded from <http://msdn.microsoft.com>; date of first publication prior to Mar. 31, 2005; 3 pages.

"PSM_ADDPAGE Message"; downloaded from <http://msdn.microsoft.com>; date of first publication prior to Mar. 31, 2005; 2 pages.

"PSM_IDTOINDEX Message"; downloaded from <http://msdn.microsoft.com>; date of first publication prior to Mar. 31, 2005; 1 page.

"PSM_INDEXTOHWND Message"; downloaded from <http://msdn.microsoft.com>; date of first publication prior to Mar. 31, 2005; 1 page.

"PSM_HWNDTOINDEX Message"; downloaded from <http://msdn.microsoft.com>; date of first publication prior to Mar. 31, 2005; 1 page.

"PSM_INDEXTOID Message"; downloaded from <http://msdn.microsoft.com>; date of first publication prior to Mar. 31, 2005; 1 page.

"PSM_INDEXTOPAGE Message"; downloaded from <http://msdn.microsoft.com>; date of first publication prior to Mar. 31, 2005; 1 page.

"PSM_PAGETOINDEX Message"; downloaded from <http://msdn.microsoft.com>; date of first publication prior to Mar. 31, 2005; 1 page.

"PSM_PRESSBUTTON Message"; downloaded from <http://msdn.microsoft.com>; date of first publication prior of Mar. 31, 2005; 1 page.

"PSM_QUERYSIBLINGS Message" ; downloaded from <http://msdn.microsoft.com>; date of first publication prior to Mar. 31, 2005; 1 page.

"PSM_SETCURSEL Message"; downloaded from <http://msdn.microsoft.com>; date of first publication prior to Mar. 31, 2005; 1 page.

"PSM_SETCURSELID Message"; downloaded from <http://msdn.microsoft.com>; date of first publication prior to Mar. 31, 2005; 1 page.

"PSM_SETFINISHTEXT Message"; downloaded from <http://msdn.microsoft.com>; date of first publication prior to Mar. 31, 2005; 1 page.

"PSM_SETHEADERTITLE Message"; downloaded from <http://msdn.microsoft.com>; date of first publication prior to Mar. 31, 2005; 1 page.

"PSM_SETWIZBUTTONS Message"; downloaded from <http://msdn.microsoft.com>; date of first publication prior to Mar. 31, 2005; 2 pages.

"PROPSHEETHEADER Structure" ; downloaded from <http://msdn.microsoft.com>; date of first publication prior to Mar. 31, 2005; 5 pages.

"PROPSHEETPAGE Structure"; downloaded from <http://msdn.microsoft.com>; date of first publication prior to Mar. 31, 2005; 4 pages.

"PSHNOTIFY Structure"; downloaded from <http://msdn.microsoft.com>; date of first publication prior to Mar. 31, 2005; 1 page.

"BCM_GETIDEALSIZE Message"; downloaded from <http://msdn.microsoft.com>; date of first publication prior to Mar. 31, 2005; 1 page.

"PSM_SETTITLE Message"; downloaded from <http://msdn.microsoft.com>; date of first publication prior to Mar. 31, 2005; 1 page.

A.T. McCray, et al., Extending the role of Metadata in a Digital Library System, May 19, 1999, IEEE, pp. 190-199.

Alexa T. McCray, et al., Principles for Digital Library Development, May 2001, ACM, pp. 49-53.

Stelovsky, J., and C. Aschwanden, "Software Architecture for Unified Management of Event Notification and Stream I/O and Its Use for Recording and Analysis of User Events," *Proceedings of the 35th Annual Hawaii International Conference on System Sciences*, IEEE Computer Society, Big Island, Hawaii, Jan. 7-10, 2002, p. 1862-1867.

"About Managing Messages with Rules", Microsoft® Outlook® 2003 Help file, 3 pp.

"Trillian/Trillian Pro IM Clients" Products Description, ©1999-2004 Cerulean Studios, <http://www.ceruleanstudios.com> [retrieved Apr. 30, 2004].

International Search Report of WO2004/097638 A1 (McKee, et al.) dated Nov. 11, 2004.

Simpson, Alan, Windows 95 Uncut, 1995, IDG Books Worldwide, Inc., pp. 104-107.

Microsoft Windows XP Version 2002 (Screen Dumps, Figs. 1-16).

Feng, et al., "Schemata Transformation of Object-Oriented Conceptual Models to XML", Computer Systems Science & Engineering, vol. 18, No. 1, Jan. 2003.

Joseph, M., "The UML for Data Modellers," Elektron, Apr. 2004, pp. 72-73.

Wang, G., et al., "Extending XML Scheme with Nonmonotonic Inheritance," in M.A. Jesufeld and O. Paster (eds.), ER 2003 Workshops, Lecture Notes in Computer Science 2814:402-407, 2003.

Adobe, Inc., et al., "Adobe Photoshop CS Classroom in a Book," Dec. 1, 2003, pp. 1-29.

Adobe, Inc., et al., "Adobe Photoshop 7.0", 2001; pp. 1-9.

Heinlein, et al., "Integration of Message Passing and Shared Memory in the Stanford FLASH Multiprocessor, Architectural Support for Programming Languages and Operating Systems,", pp. 38-50, published 1994.

Louis, et al., "Context Learning Can Improve User Interaction Information Reuse and Integration," Proceedings of the 2004 IEEE International Conference on, pp. 115-120, Nov. 8-10, 2004.

Cohen, et al., "A Case for Associative Peer to Peer Overlays" -ACM SIGCOMM Computer Communications Review, vol. 33, No. 1, Jan. 2003, pp. 95-100.

Lui, et al., "Interoperability of Peer-to-Peer File Sharing Protocols" -ACM SIGecom Exchanges, vol. 3, No. 3, Aug. 2002, pp. 25-33.

Wikipedia, File Allocation Table, 2006, <http://en.wikipedia.org/wiki/File_Allocation_Table.>.

Microsoft Windows 2000 Professional Step by Step, Lesson 3: Managing Files and Folders, Jan. 5, 2000, 12 pages.

Dino Esposito, More Windows 2000 UI Goodies: Extending Explorer Views by Customizing Hypertext Template Files, first date of publication unknown but, prior to Jun. 16, 2006, 15 pages.

Dino Esposito, Visual C++ Windows Shell Programming, Dec. 1, 1998, Apress, ISBN 1861001843, pp. 463-469.

Paul DiLascia, "More Fun with MFC:DIBs, Palettes, Subclassing, and a Gamut of Goodies, Part III", Microsoft Systems Journal, Jun. 1997, 20 pages.

Windows Commander, <http://web.archive.org/web/20021017022627/www.ghisler.com/addons.htm> and <http://web.archive.org/web/20021017022627/www.ghisler.com/addons.htm>, first date of publication unknown but, prior to Feb. 19, 2003, 30 pages.

Directory Opus 6.1—Viewer SDK Plugin SDK 1.0, GP Software, 2001, accessible via <http://www.gpsoft.com.au>, first date of publication unknown, but prior to Feb. 19, 2003, 30 pages.

Microsoft Press Pass, "Windows XP is Here!", New York, Oct. 25, 2001.

Microsoft, "Microsoft Windows XP Professional Product Documentation" section: (1) To Change how you view items in a folder, (2) Viewing files and folders overview, (3) to associate a file with a program, (4) To change or remove a program, copyright 2006, publication date unknown.

McFedries, Paul, "The Complete Idiot's Guide to Windows XP", Table of Contents, Oct. 3, 2001; Alpha Books, Chapter 8: A Tour of the My Pictures Folder—printed pp. 1-8, Chapter 11: Sights and Sounds: Music and Other Multimedia-printed pp. 1-3.

Stanek R. William, "Microsoft Windows XP Professional Administrator's Pocket Consultant", Sep. 25, 2001; Microsoft Press, Chapter 9, printed pp. 1-8.

Shah, Sarju, "Windows XP Preview", FiringSquad, May 4, 2001, online, printed pp. 1-5; Figure: Hi-Res Image Viewer.

International Search Report of EP 03007786 dated Aug. 6, 2004.

International Search Report of EP 0315717 dated Aug. 26, 2003.

Australian Search Report of SG200301757-1 dated Dec. 1, 2004.

International Search Report of PCT/US03/15625 dated Aug. 8, 2003.

International Search Report and Written Opinion of PCT/US05/26655 dated Mar. 21, 2006.

International Search Report of PCT/US05/13589 dated Apr. 22, 2005.

International Search Report of PCT/US05/27258 dated Aug. 1, 2005.

International Search Report of EP 03007909 dated Jun. 13, 2006.

International Search Report of WO2004/097638 A1 dated Nov. 11, 2004.

* cited by examiner

*Fig.33.*

All authors
storage - document library menus ▶

41 items, 100mb

More info...

All categories
▶ All authors
January work
More quick links

Filter by
Look for...
By date
2000 * 2001 * 2002
Pick an author ▶
Pick a category ▶
More filters ▶

▶ Size

Hide preview | ▲ activity 1
activity 2
activity 3
More activities ▶

950 — Name    Author    Modified date    Type    Size    Location
951 — Author 1
952 — Author 2
953 — Author 3
954 — Author 4

All authors
storage - document library menus ▲ | 🌐 📇 ♥ 📄 | | Hide preview | ◀

41 items, 100mb
activity 1
activity 2
activity 3
More info...
More activities ▶

| 950 — Name | Author | Modified date | Type | Size | Location |
|---|---|---|---|---|---|
| Author 1 | | | | | |
| 951a — 📄 Document1 | Author1 | 11th July 2001 | Microsoft Excel | 382kb | \\server1\folder 2 |
| 951b — 📄 Document2 | Author1 | 22nd Dec 2002 | Microsoft Word | 206kb | myDocuments\folder1 |
| Author 2 — 952 | | | | | |
| Author 3 — 953 | | | | | |
| Author 4 — 954 | | | | | |

All categories
▲ All authors
January work
More quick links

Filter by
[ Look for... ]
By date
2000 * 2001 * 2002
Pick an author ▶
Pick a category ▶
More filters ▶

▶ Size

600

611

SYSTEM AND METHOD FOR FILTERING AND ORGANIZING ITEMS BASED ON COMMON ELEMENTS

CROSS-REFERENCE(S) TO RELATED APPLICATION(S)

This application is a continuation of prior U.S. patent application Ser. No. 10/440,035, filed May 16, 2003, which is a continuation-in-part of prior U.S. patent application Ser. No. 10/403,341, filed Mar. 27, 2003, priority from the filing date of which is hereby claimed under 35 U.S.C. § 120, the entire contents of which are incorporated herein by reference.

FIELD OF THE INVENTION

The present invention relates to systems and methods for viewing items that are stored in a computer memory, and more particularly, to a system and method for filtering and organizing items based on common elements.

BACKGROUND OF THE INVENTION

Present computer file systems have a number of undesirable limitations. One limitation is that users are generally unable to control the structure that they are shown. In other words, when folders are organized, a user must choose a structure, and that structure is then difficult to change. As a specific example, for a "music" folder, a user may choose to organize the music files in an artist/album format, wherein all of the album folders for each artist are grouped into that particular artist's folder, and all of the songs on a particular album are grouped into that album's folder. The artist/album format is not conducive to playing a type of music (e.g., playing two jazz songs from two different artists), or for playing a selection of albums from different artists.

As another issue, a user may have a large number of files which are difficult to organize. Some users implement a rigid sense of placement for the files, and thus create strict hierarchies for them. The management of such files become increasingly complex and difficult as the number of available documents grows, making search and retrieval also difficult. This problem is further exacerbated when additional files are utilized from other locations, such as shared files, etc.

Users also have to deal with files being in different locations, such as on different devices, on other PCs, or online. For example, users can select to listen to their music on the computer (as may be accessible to a music program) or can go online and listen to music from Web sites, however there is a strict division between these two sources. Music coming from different locations is organized differently, and not kept in the same fashion or place. As another example, files stored on a corporate network may inherently be separated from files a user has on a current machine.

Users also have to keep track not only of what file data is stored, but where it is stored. For example, for music files, users are forced to keep copies on various systems and to try to track which music files are located where. This can make files difficult to locate, even when they are locally stored.

It is also sometimes difficult to find and return to files that a user has. A user may find it difficult to recall where and how they stored certain files. Given a set of folders and even a group of similar files, users often find it difficult to quickly find the one that they are looking for. For files stored in a difficult place to find, it is that much more complex to locate. In addition, once users have enough files in a folder, it becomes more difficult to parse the folder quickly, especially if the contents are similar.

It is also sometimes difficult for users to find or return to files on a network. Sharing and publishing files is often hard to do, and it may often be even more difficult to retrieve such a file from someone who makes it available. Users typically have to memorize or map the various sites and names that they need for finding files on a network.

Name spaces may vary, which can cause confusion to the user as to what is "correct." This is particularly true on a network where there are different naming conventions, limitations, and so on. For example, certain operating systems may require short names with no spaces in order for them to be visible.

Programs also often save files to their own directory or other name spaces, which can make it difficult for users to find their way back to the files. Programs often have default directories and places they save documents. A user often has to search through their hard disk and make guesses about where a file is stored.

Related items are also often stored in separate places. Related files that a user has may be stored on different parts of the hard disk, etc. This problem becomes more common with the developments of digital media services that have multiple content types (e.g., pictures, music, video).

The present invention is directed to providing a system and method that overcome the foregoing and other disadvantages. More specifically, the present invention is directed to a system and method for filtering and organizing items based on common elements.

SUMMARY OF THE INVENTION

A system and method for filtering and organizing items from computer memories based on common elements is provided. In accordance with one aspect of the invention, filters are provided for manipulating the items. The filters are essentially tools for narrowing down a set of items. In one embodiment, the filters are dynamically generated based on the properties of the separate items. For example, for a set of items, the filter mechanism may review the properties, and if the items generally have "authors" as a property, the filter can provide a list of the authors. Then by clicking on a particular author, the items that don't have the author disappear. This allows the user to narrow the contents.

In accordance with another aspect of the invention, a method for filtering items is provided in a computer system having a display and a memory for storing items with metadata properties. Display objects are provided on the display that each represent one or more items. The metadata properties of the items that are represented by the display objects are evaluated. A filter term is provided on the display that corresponds to a metadata property that is shared by a plurality of the items, wherein the selection of the filter term causes the items that are represented on the display to be reduced to those items that share the specified metadata property.

In accordance with another aspect of the invention, a plurality of items is represented on the display, and a filter term is dynamically generated based on the metadata properties of the items. When the filter term is selected, it reduces the items that are represented on the display to those that have the metadata property that corresponds to the filter term.

In accordance with another aspect of the invention, a plurality of items is represented on the display, and a filter area is provided in which a user can enter a filter term. When a filter term is entered by the user, the items that are represented on the display are reduced to those that contain the filter term. As the user types the filter term, additional items may be filtered as each new character is added to the filter term.

In accordance with another aspect of the invention, a back button is provided which may be used to back through a filtering process. For example, after a user has entered a filter term, the user may wish to return to the set of items that were represented on the display before the filter term was applied. The back button allows the user to back up to the desired point in the filter navigation.

In accordance with another aspect of the invention, quick links are provided. In one embodiment, quick links are a set of predefined links (e.g., located on the left side of the display) that can be clicked on to generate useful views of the sets of items. These can be predefined by the program, or set by a user. For example, clicking on "all authors" could return a view stacked by authors. "All documents" may return a flat view of all the documents across all of the storage areas. Users can also create their own quick links. For example, a user might filter down to all of the documents that they modified in January 2003, and then could save that as a quick link.

In accordance with another aspect of the invention, a method for providing quick links is implemented in a computer system having a display and a memory for storing items. In accordance with the method, a user first navigates to a view of a desired collection of items. A quick link that corresponds to the desired collection of items is saved and is provided with a name. The name of the quick link is presented on the display such that by clicking on the quick link a user can return to the view of the desired collection of items.

In accordance with another aspect of the invention, libraries are provided. Libraries consist of large groups of usable types of items that can be associated together. For example, photos may be one library, music may be another, and documents may be another. The libraries provide tools and activities that are related to the particular types of items. For example, in the photo library, there are tools and filters that relate to manipulating photos, such as for creating slide shows or sharing pictures.

In accordance with another aspect of the invention, a method for creating libraries is provided in a computer system with a display and a memory for storing items. The method begins by creating a library to contain items with one or more specified metadata properties. Then, items with the one or more specified metadata properties are automatically grouped into the library. Tools are also provided for manipulating the items of the library.

In accordance with another aspect of the invention, the items are presented to a user in virtual folders. The virtual folders expose items to users in different views based on their metadata instead of the actual physical underlying file system structure on the disk. Thus, the system is able to take a property that is stored in the database and represent it as a container that is like a folder. Since users are already familiar with working with folders, by presenting the virtual folders in a similar manner, users can adapt to the new system more quickly.

In accordance with another aspect of the invention, users are able to work with the virtual folders through direct manipulation. In other words, the mechanisms that are provided for manipulating the virtual folders are similar to those that are currently used for manipulating conventional physical folders (e.g., clicking and dragging, copying, pasting, etc.).

In accordance with another aspect of the invention, a wide scope of items may be available. In other words, the system is able to represent items from multiple physical locations (e.g., different hard drives, different computers, different network locations, etc.) so that to a user all the items appear to be from one location. For example, a user can be presented with all of their music files on a single screen, and manipulate the files all from one view, even though the files may be physically stored on different hard drives, different computers, or different network locations.

In accordance with another aspect of the invention, non-file items may be represented in the virtual folders. In other words, files that are stored in memory are located in a physical store. The virtual folders can be made to include items that are not currently represented in the physical store. Examples of non-file items are e-mails and contacts.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 33 is a diagram illustrative of a screen display in which a list of all of the authors of FIG. 32 is presented;

FIG. 34 is a diagram illustrative of a screen display in which "Author 1" has been selected from the list of FIG. 33 and all of the Author 1's documents are shown;

DETAILED DESCRIPTION OF THE PREFERRED EMBODIMENT

The present invention is directed to virtual folders. Virtual folders utilize the same or similar user interfaces that are currently used for file systems. The virtual folders expose regular files and folders (also known as directories) to users in different views based on their metadata instead of the actual physical underlying file system structure on the disk. Location-independent views are created which allow users to manipulate their files and folders utilizing similar controls as those presently used for managing file systems. In general, this means that users can organize and rearrange their files based on inherent properties in the files themselves, instead of the managing and organization being done as a separate part of the system. The virtual folders may represent files or items from different physical locations, such as from multiple disk drives within the same computer, between multiple computers, or different network locations, such that one view of files or items can expose files or items sitting at different physical locations. In one embodiment, the different items or files need only be connected via an IP network in order to be included.

The virtual folder modeling is also able to be used for traditionally non-file entities. An application of this is to have a set of user interfaces similar to files and folders (that is, objects and containers) to show traditionally non-file entities. One example of such non-file entities would be e-mails, while another would be contact information from a contact database. In this manner, virtual folders provide for a location-independent, metadata-based view system that works regardless of whether the data being shown is from files or non-file entities. In general, these aspects allow more flexibility in terms of letting users manipulate their files and data, using both common user interface techniques (drag and drop, double-click, etc.) as well as leveraging the rich integration of various data types.

Figure 1:
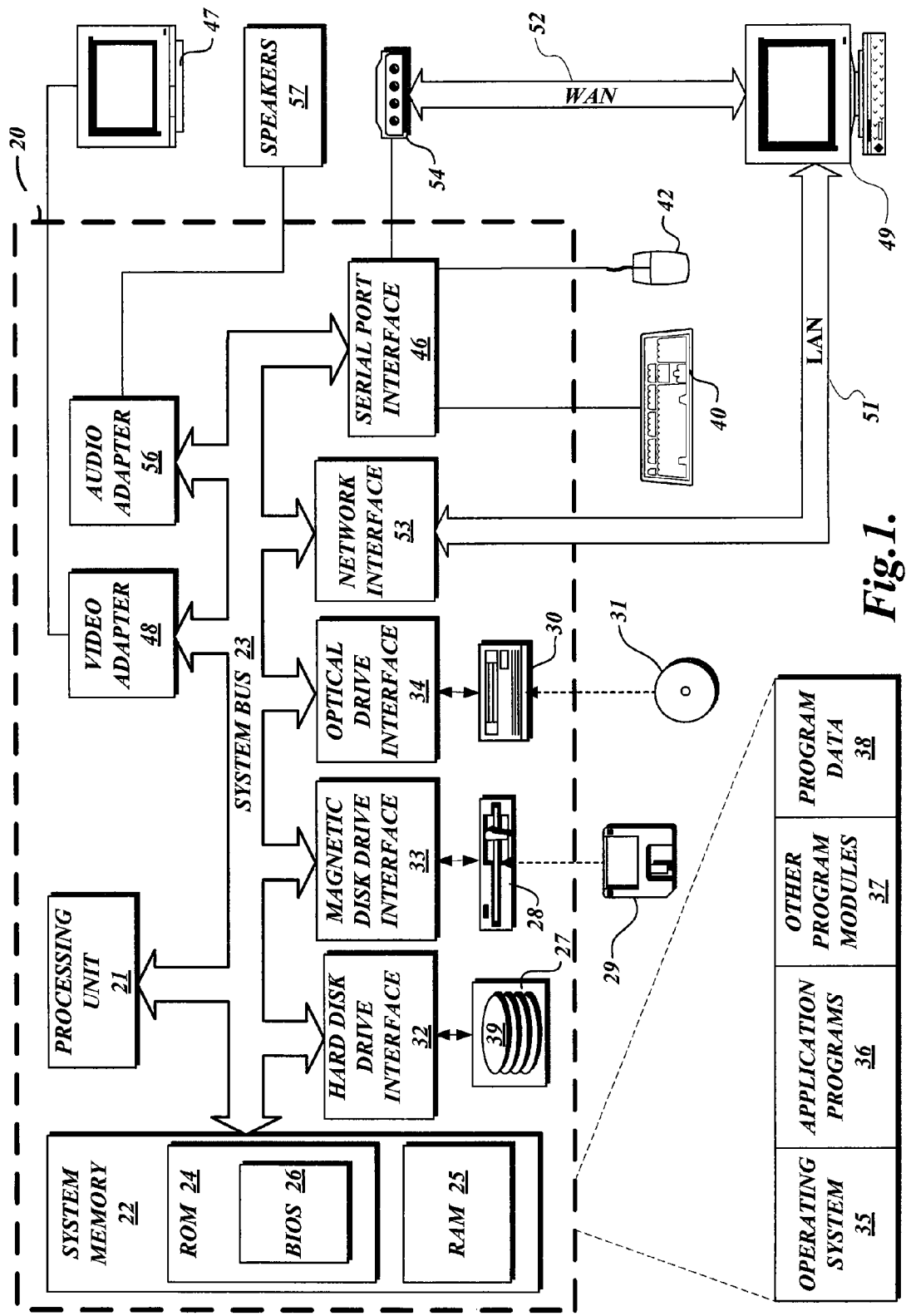
FIG. 1 is a block diagram of a general purpose computer system suitable for implementing the present invention.

FIG. 1 and the following discussion are intended to provide a brief, general description of a suitable computing environment in which the present invention may be implemented. Although not required, the invention will be described in the general context of computer-executable instructions, such as program modules, being executed by a personal computer. Generally, program modules include routines, programs, characters, components, data structures, etc., that perform particular tasks or implement particular abstract data types. As those skilled in the art will appreciate, the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from or writing to a hard disk 39, a magnetic disk drive 28 for reading from or writing to a removable magnetic disk 29, and an optical disk drive 30 for reading from or writing to a removable optical disk 31, such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer-readable instructions, data structures, program modules, and other data for the personal computer 20. Although the exemplary environment described herein employs a hard disk 39, a removable magnetic disk 29, and a removable optical disk 31, it should be appreciated by those skilled in the art that other types of computer-readable media which can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk 39, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus 23, but may also be connected by other interfaces, such as a parallel port, game port or a universal serial bus (USB). A display in the form of a monitor 47 is also connected to the system bus 23 via an interface, such as a video card or adapter 48. One or more speakers 57 may also be connected to the system bus 23 via an interface, such as an audio adapter 56. In addition to the display and speakers, personal computers typically include other peripheral output devices (not shown), such as printers.

The personal computer 20 may operate in a networked environment using logical connections to one or more personal computers, such as a remote computer 49. The remote computer 49 may be another personal computer, a server, a router, a network PC, a peer device or other common network node, and typically includes many or all of the elements described above relative to the personal computer 20. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20 or portions thereof may be stored in the remote memory storage device. It will be appreciated that the network connections shown are exemplary and other means of establishing a communications link between the computers may be used.

As implemented on a system of the type illustrated in FIG. 1, the present invention utilizes virtual folders which make it easier for users to perform basic tasks around file manipulation and folder navigation (browsing) and to provide higher level storage capabilities which can be leveraged in new features. The virtual folders expose files and items to users in different views based on their metadata instead of the actual physical underlying file system structure on the disk.

Figure 2:
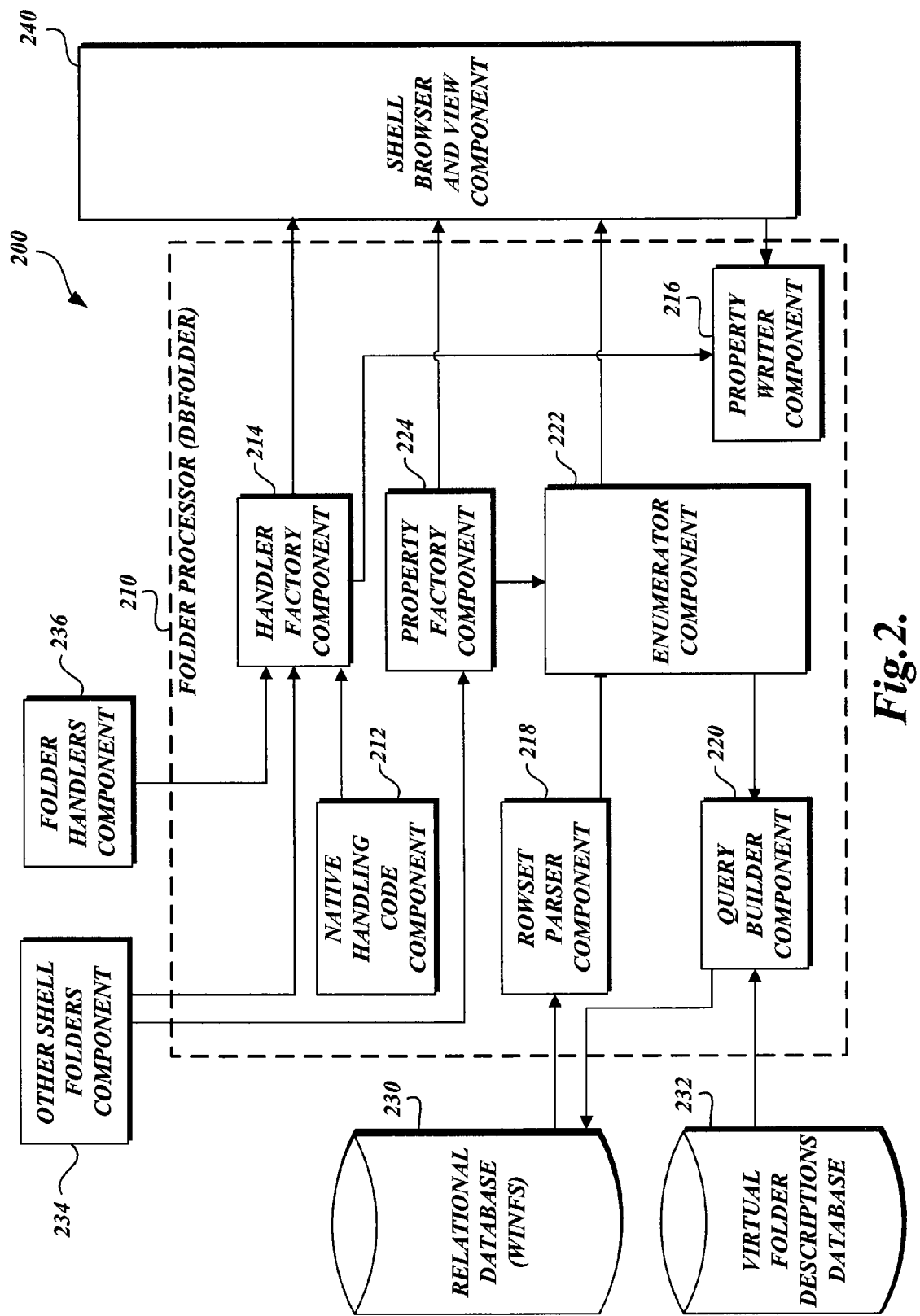
FIG. 2 is a block diagram of a virtual folder system in accordance with the present invention.

FIG. 2 is a block diagram of a virtual folder system 200 in accordance with the present invention. As will be described in more detail below, the virtual folders allow a user to change the "pivot" which controls the way the data is viewed. As an example, a user could view their music as a flat list of all the songs, which can be grouped by album. Alternatively, the user could switch the view to show only the genres or artists or years, etc. The user can tailor the view to see only the objects suited to the task at hand. This allows an improved browsing experience that negates the need for further navigation through folders (both down and back up). The same lessons and capabilities apply to modeling other data-types not stored as files. Contacts, for example, can be exposed to the user in this way, giving them familiar interface capabilities, as well as richer infrastructure for manipulating them than is provided by a flat address book.

As illustrated in FIG. 2, the virtual folder system 200 includes a folder processor 210, a relational database 230, a virtual folder descriptions database 232, an other shell folders component 234, a folder handler's component 236, and a shell browser and view component 240. The folder processor 210 includes a native handling code component 212, a handler factory component 214, a property writer component 216, a rowset parser component 218, a query builder component 220, an enumerator component 222, and a property factory component 224.

The relational database 230 stores properties about all files in the system. It also stores some items, like contacts (i.e., non-file items), entirely. In general, it stores metadata about the types of files and items that it contains. The relational database 230 receives SQL queries from the query builder 220. The relational database 230 also sends SQL rowsets to the rowset parser component 218, with one row per item column, columns being the item properties.

The virtual folder descriptions database 232 includes the virtual folder descriptions. The virtual folder descriptions database 232 sends data to the query builder component 220, including a list of types to display in the folder, the initial filter, and the physical locations to show results from (the scopes).

With regard to the other shell folders component 234, the folder processor 210 delegates to existing shell folders from many types of items, including all files, for handlers or properties. The other shell folders component 234 sends properties from other folders to the property factory 224. The other shell folders component also sends handlers to the handler factory 214.

The folder handlers component 236 provides code behavior for the items that exist only in the database, like contacts. This is what allows non-file items to behave akin to files. The folder handlers component 236 sends handlers to the handler factory 214.

For the native handling code component 212, the folder processor 210 directly implements certain handlers based on the properties of the items. The native handling code component 212 sends handlers to the handler factory 214. For the native handling code component 212 and the folder handlers component 236, like all namespaces, virtual folders have to provide a set of handlers (context menu, icon, thumbnail, infotip, ... ) for their items. For most of these (infotip, data object, drag-drop handler, background context menu ... ) the virtual folder provides a common (native) handler for all the types it holds. However there are others which the author of the type has to provide (context menu on the item itself, writable property store, ... ). The default handler can also be overridden. Virtual folders reuse this for files and allow non-file items do the same.

The handler factory 214 takes ID lists and produces code behaviors that provide context menus, icons, etc. In general, the folder processor 210 may use native handlers, external handlers, or delegate to other shell folders to get handlers, as described above with respect to the native handling code component 212, the other shell folders component 234, and the folder handlers component 236. The handler factory component 214 sends handlers to the shell browser in view 240, as requested by the view. The handler factory component 214 sends a property handler to the property writer 216.

The property writer 216 converts user intentions such as cut, copy, and paste into property rights to the file or item. A shell browser and view component 240 sends data to the property writer 216, including direct manipulation (cut/copy/paste) or editing of metadata. In general, since virtual folders present an organization based on the properties of an item, operations such as move and copy (drag-drop) become an edit on those properties. For example, moving a document, in a view stacked by author, from Author 1 to Author 2, means changing the author. The property writer component 216 implements this function.

The rowset parser 218 takes database rowsets and stores all item properties into a shell ID list structure. A rowset takes the piecewise definition of the virtual folder and builds a SQL string which can then be issued to the database. The rowset parser component 218 sends ID lists to the enumerator component 222. As described above, the rowset parser component 218 also receives data from the relational database 230, including SQL rowsets, with one row per item, the columns being item properties.

The query builder component 220 builds SQL queries. The query builder component 220 receives data from the enumerator component 222, including new filters from the navigation. The query builder component 220 also receives data from the virtual folder descriptions database 232, including a list of the types to display in the folder, the initial filter, and the physical location to show results from (the scopes). The query builder component 220 sends the SQL queries to the relational database 230.

In general, the query builder component 220 includes a set of rows (in other words a table). This is what running the query yields. The rowset parser component 218 takes each row and using the column names transforms the row into an ID list. An ID list is a well-known shell structure which is used to reference items in a namespace. Doing this allows virtual folders to be just like any other namespace to the rest of the shell. Also caching this data helps keep database access, which can be costly, to a minimum.

The enumerator component 222 operates in response to navigation to a virtual folder. As described above, the enumerator component 222 receives ID lists from the rowset parser component 218, and sends new filters from the navigation to the query builder component 220. The enumerator 222 also sends data to the shell browser and view component 240, including ID lists that are returned to be inserted into the view after a navigation.

The property factory component 224 takes ID lists and property identifiers and returns values for those properties. The property factory component 224 receives data from the handler factory component 214 including the property handler. As described above, the property factory component 224 also receives data from the other shell folders component 234, including properties from other folders. The property factory component 224 also sends data to the shell browser and view component 240, including item properties, as requested by the view.

The shell browser and view component 240 displays the contents of a folder in a window, and handles all the user interaction with the displayed files or items, such as clicking, dragging, and navigating. Thus, the shell browser and view component 240 receives the user actions. The shell browser and view component 240 also gets the data regarding the code behaviors that it needs from the folder, in this case the folder processor 210.

As described above, the virtual folders expose regular files and folders (also known as directories) to users in different views based on their metadata instead of the actual physical underlying file system structure on the disk. Thus, the system is able to take a property that is stored in the database and represent it as a container that is like a folder. Since users are already familiar with working with folders, by presenting the virtual folders in a similar manner, users can adapt to the new system more quickly.

Figure 3:
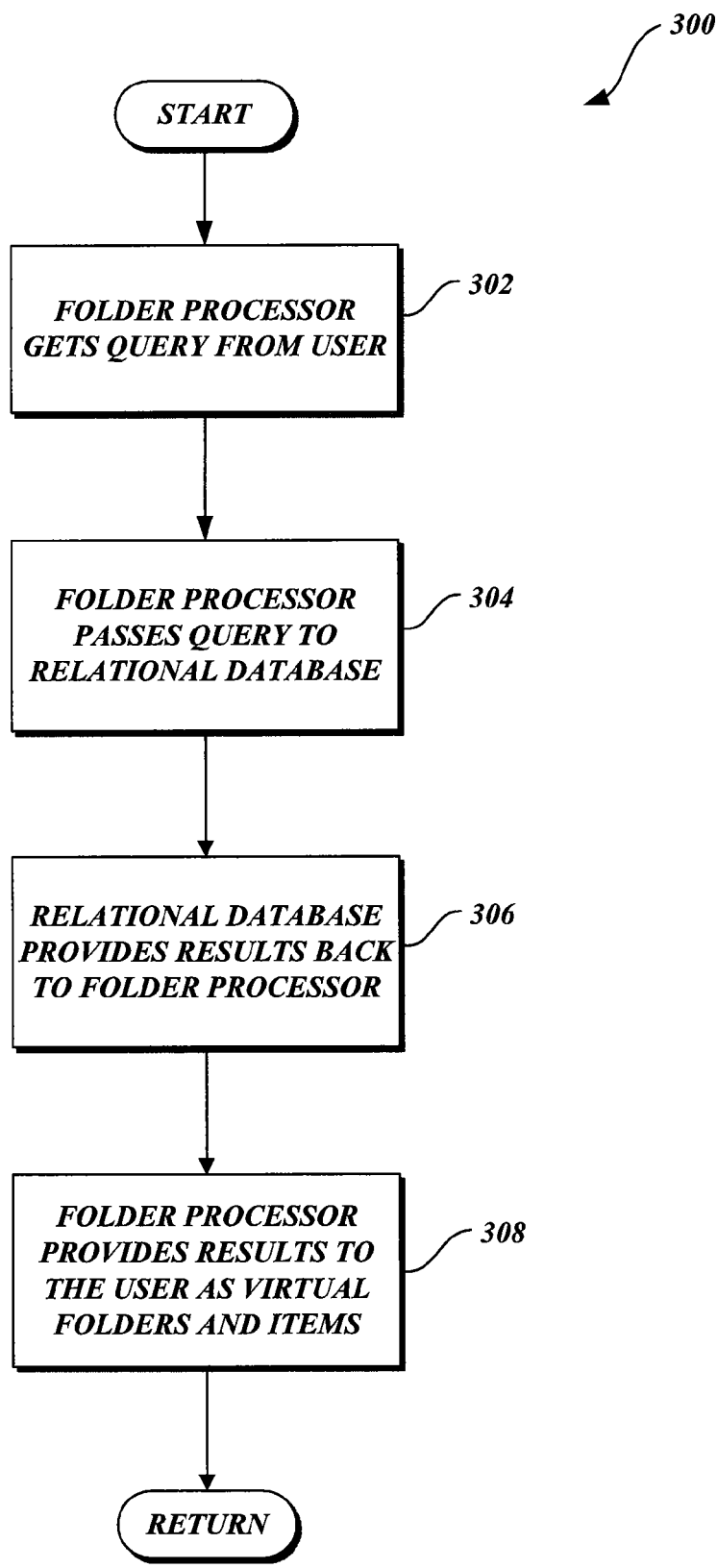
FIG. 3 is a flow diagram illustrative of a routine by which a user provides a query that draws back selected files and folders.

FIG. 3 is a flow diagram illustrative of a routine 300 by which a user provides a query that draws back selected items. At a block 302, the folder processor gets a query from the user. In a block 304, the folder processor passes the query to the relational database. At a block 306, the relational database provides the results back to the folder processor. At block 308, the folder processor provides the results to the user in the form of virtual folders and items.

Figure 4:
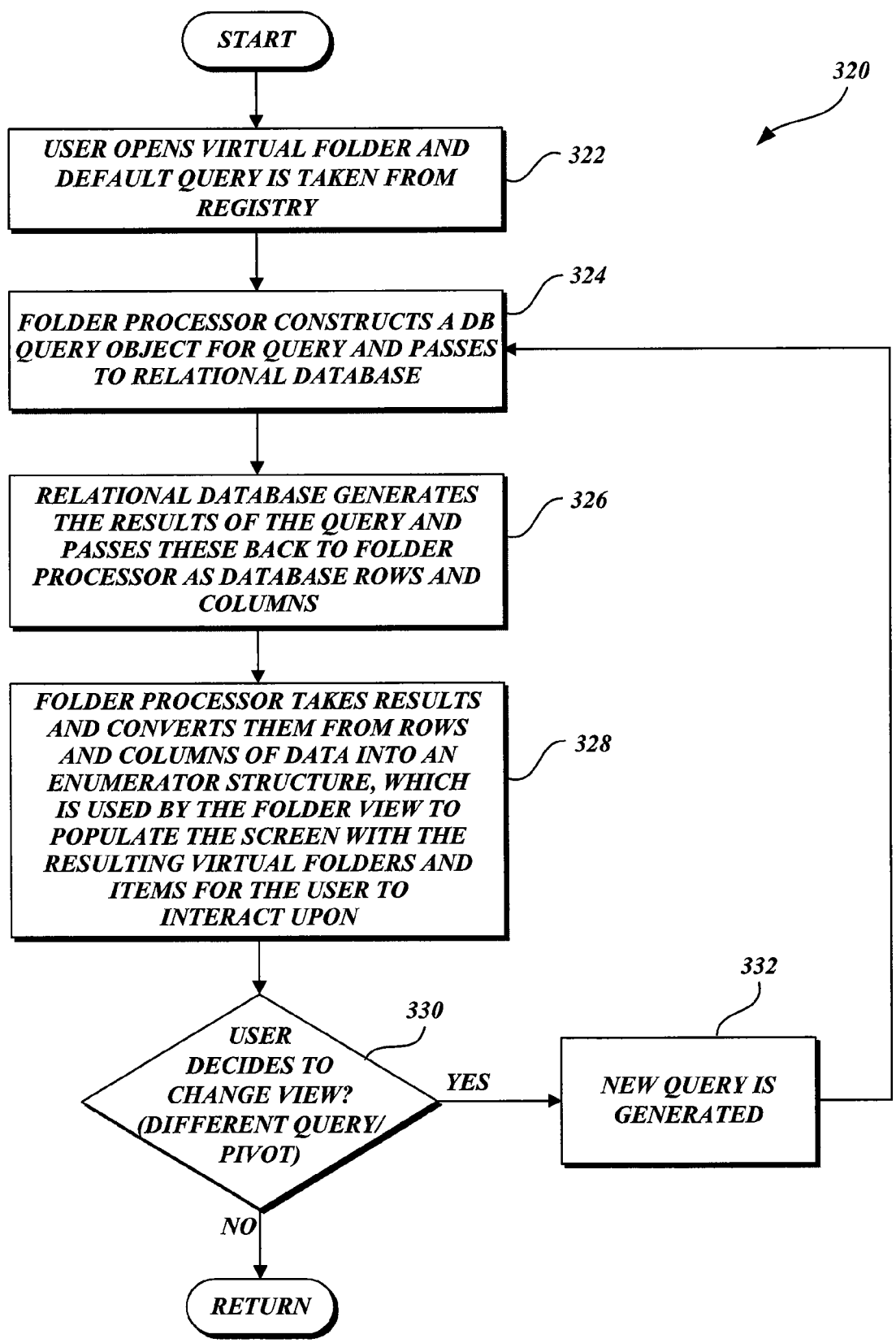
FIG. 4 is a flow diagram illustrative of a routine by which virtual folders are constructed and displayed on the screen in accordance with either a default query or a query from the user.

FIG. 4 is a flow diagram illustrative of a routine 320 by which virtual folders are constructed and displayed on the screen in accordance with either a default query or a query from the user. At a block 322, when a user first opens the virtual folder, a default query is used. This default query is taken from the registry. For example, the default query for a music library could be to show all the songs grouped by album. At a block 324, the folder processor constructs a query object for this query, and then passes this query to the relational database. At a block 326, the relational database generates the results of the query and passes these back to the folder processor as database rows and columns.

At a block 328, the folder processor takes these results and converts them from the rows and columns of data into an enumerator structure, which is used by the folder view to populate the screen with the resulting virtual folders and items for the user to interact upon. At a decision block 330, a user decides whether to change the view (by issuing a different query or "pivot"). For example, a user could issue a "show all artists" pivot. If the user does want to change the view, then the routine returns to block 324 where the folder processor passes this new query to the relational database, and receives back new rows and columns of results, and constructs a new enumerator structure. The process then continues as described above, as the folder view clears and updates, using the enumerator to draw the "artist" objects to the screen.

In one example, album objects are provided that represent containers that users can navigate into. For example, double-clicking the "Beatles" albums will navigate the view to see all of the Beatles' songs. The folder processor issues the "show all Beatles' songs" query to the relational database, which hands back the rows and columns of data for those songs. The folder processor creates an enumerator of all these songs, which then get drawn to the screen.

The user can also choose the view at any point while browsing virtual folders. From the above example, after narrowing down to just show Beatles songs, a user can change the view to only show the songs as albums. The process of changing the view of items into another representation is called "stacking". This is because the items are conceptually arranged into "stacks" based on that representation. In this case, the songs are rearranged into stacks for each of the various albums. Users can then navigate into one of these stacks, only seeing the songs from that particular album. Again, the user can rearrange the view of these remaining songs into stacks based on a property (e.g., a rating, for example). If the rating property were selected, the songs from that Beatles album would be shown in stacks for a one-, two-, or a three-star rating.

The results of each query depend on which physical locations are included in the scope. For example, the scope may be made to include only the folders in the user's "my documents" folder. Alternatively, the scope could include all folders on the computer, or even all folders on multiple network connected computers. The user is able to view and change the scope through a scope property sheet. In one example, the scope property sheet could be exposed by right-clicking on the virtual folder and choosing "properties." The user could add new folders to the scope, or remove folders that were previously added.

One group of users for which virtual folders will provide particular utility is knowledge workers. Virtual folders allow knowledge workers to easily switch between viewing documents by file type, project, case number, author, etc. Since knowledge workers each tend to have a different method for organizing documents, virtual folders can be used to accommodate these different preferences.

Figure 5:
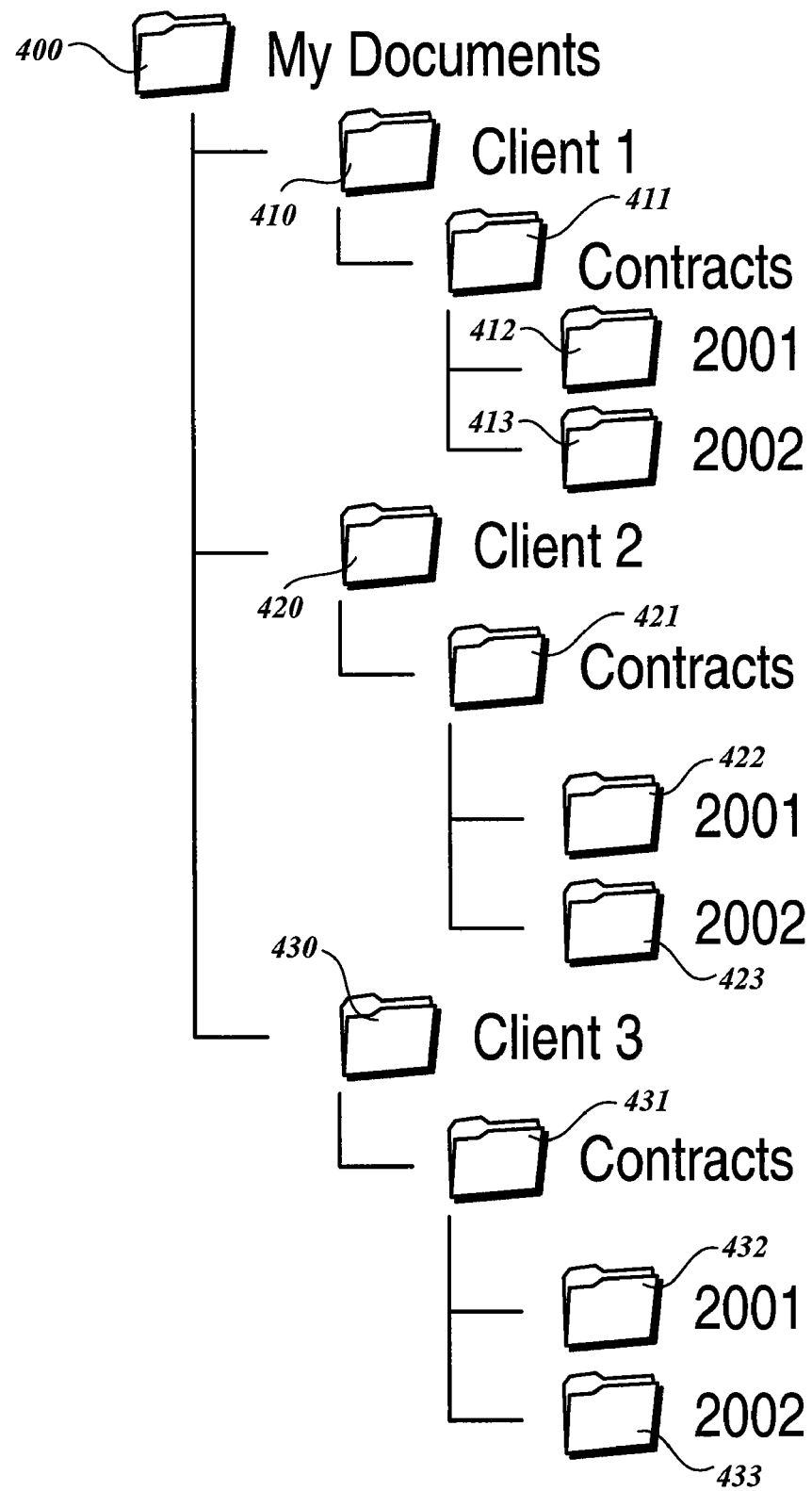
FIG. 5 is a tree diagram of a folder structure in accordance with a physical folder arrangement on a hard drive.

FIG. 5 is a tree diagram of a folder structure in accordance with a physical folder arrangement on a hard drive. This physical folder arrangement is based on the traditional implementation of folders, which may be based on NTFS or other existing file systems. Such folders are referred to as physical folders because their structuring is based on the actual physical underlying file system structure on the disk. As will be described in more detail below, this is in contrast to virtual folders, which create location-independent views that allow users to manipulate files and folders in ways that are similar to those currently used for manipulating physical folders.

As illustrated in FIG. 5, a folder 400 is a "my documents" folder. At a first level, the folder 400 includes folders 410, 420, and 430, corresponding to Clients 1, 2, and 3, respectively. At a second level, each of the folders 410, 420, and 430 contain a folder 411, 421, and 431, respectively, which each correspond to the contracts for the selected client. At a third level, each of the folders 411, 421, and 431 contains a folder 412, 422, and 432, respectively, each corresponding to the year 2001. At the third level, each of the folders 411, 421, and 431 also contains a folder 413, 423, and 433, respectively, each corresponding to the year 2002.

It will be appreciated that a number of obstacles are presented to a user who wishes to navigate a physical folder file structure such as that illustrated in FIG. 5. For example, if the user wishes to work with all of the contracts that the user has produced, the user will first need to navigate to the folder 411 to work with the contracts for Client 1, and then will have to renavigate to the folder 421 to reach the contracts for Client 2, and will again have to renavigate to the folder 431 for the contracts for Client 3. This arrangement makes it difficult for the user to access all of the contracts, and in general prevents simultaneous viewing and manipulation of all of the contracts. Similarly, if the user wishes to view all of the contracts produced in the year 2001, the user will have to navigate and renavigate to the folders 412, 422, and 432, respectively. As will be described in more detail below, the virtual folders of the present invention provide an improved file system structure.

Figure 6:
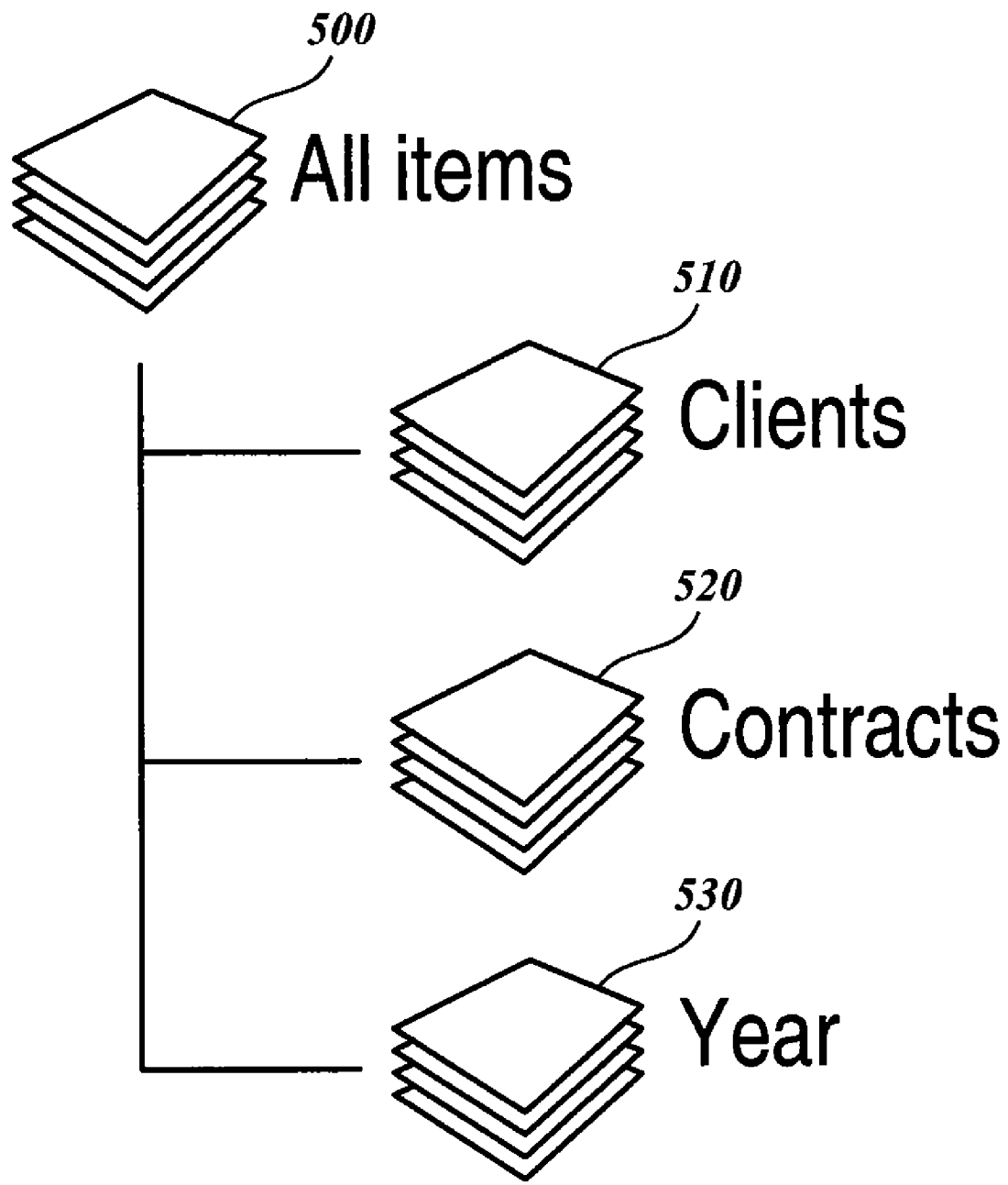
FIG. 6 is a tree diagram of a virtual folder structure.

FIG. 6 is a tree diagram of a virtual folder structure. As will be described in more detail below, virtual folders create location-independent views that allow users to manipulate their files and folders in convenient ways. As shown in FIG. 6, the virtual folders are represented as stacks. A virtual folder 500 is an "all items" folder. At a first level, the virtual folder 500 contains virtual folders 510, 520, and 530, corresponding to clients, contracts, and year, respectively. As will be described in more detail below, this structure allows a user to access files according to a desired parameter.

Figure 7:
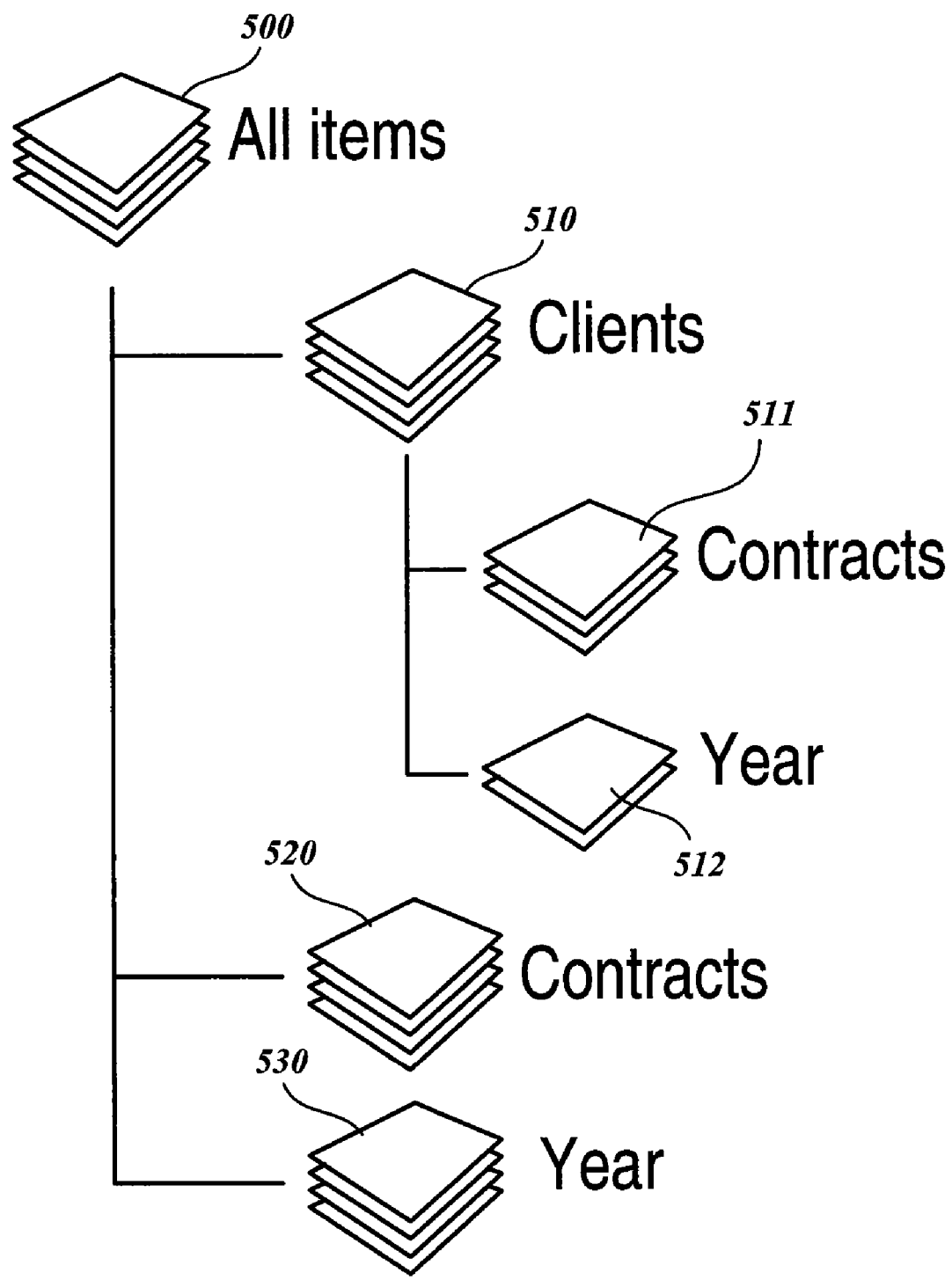
FIG. 7 is a tree diagram of the virtual folder structure of FIG. 6, wherein the clients stack is further filtered by contracts and year.

FIG. 7 is a tree diagram of the virtual folder structure of FIG. 6, wherein at a second level, the virtual folder 510 further includes virtual folders 511 and 512, which correspond to contracts and year, respectively. In other words, the clients stack of virtual folder 510 is further filtered by contracts and year. The process for determining which files and items are contained in each of the virtual folders will be described in more detail below.

Figure 8:
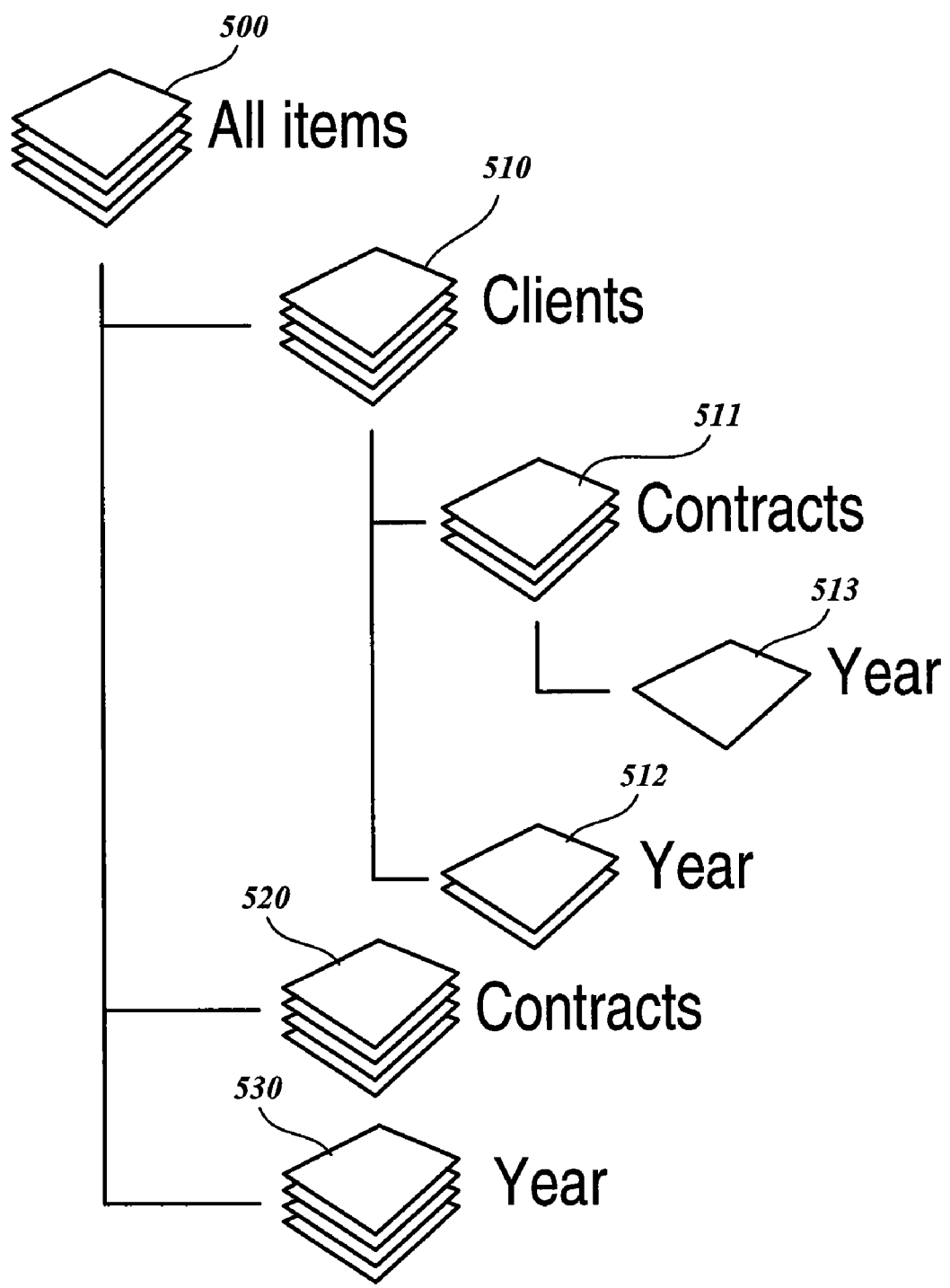
FIG. 8 is a tree diagram of the virtual folder structure of FIG. 7, wherein the contracts of the clients stack are further filtered by year.

FIG. 8 is a tree diagram of the virtual folder structure of FIG. 7, wherein at a third level, the virtual folder 511 contains a virtual folder 513, which corresponds to a year. In other words, the contracts stack of virtual folder 511 is further filtered by year. While the virtual folder structure for the virtual folders 510, 511, and 513 have been structured according to clients, contracts, and year, it will be appreciated that the virtual folders allow for other structuring sequences to occur, as will be described in more detail below with reference to FIG. 9.

Figure 9:
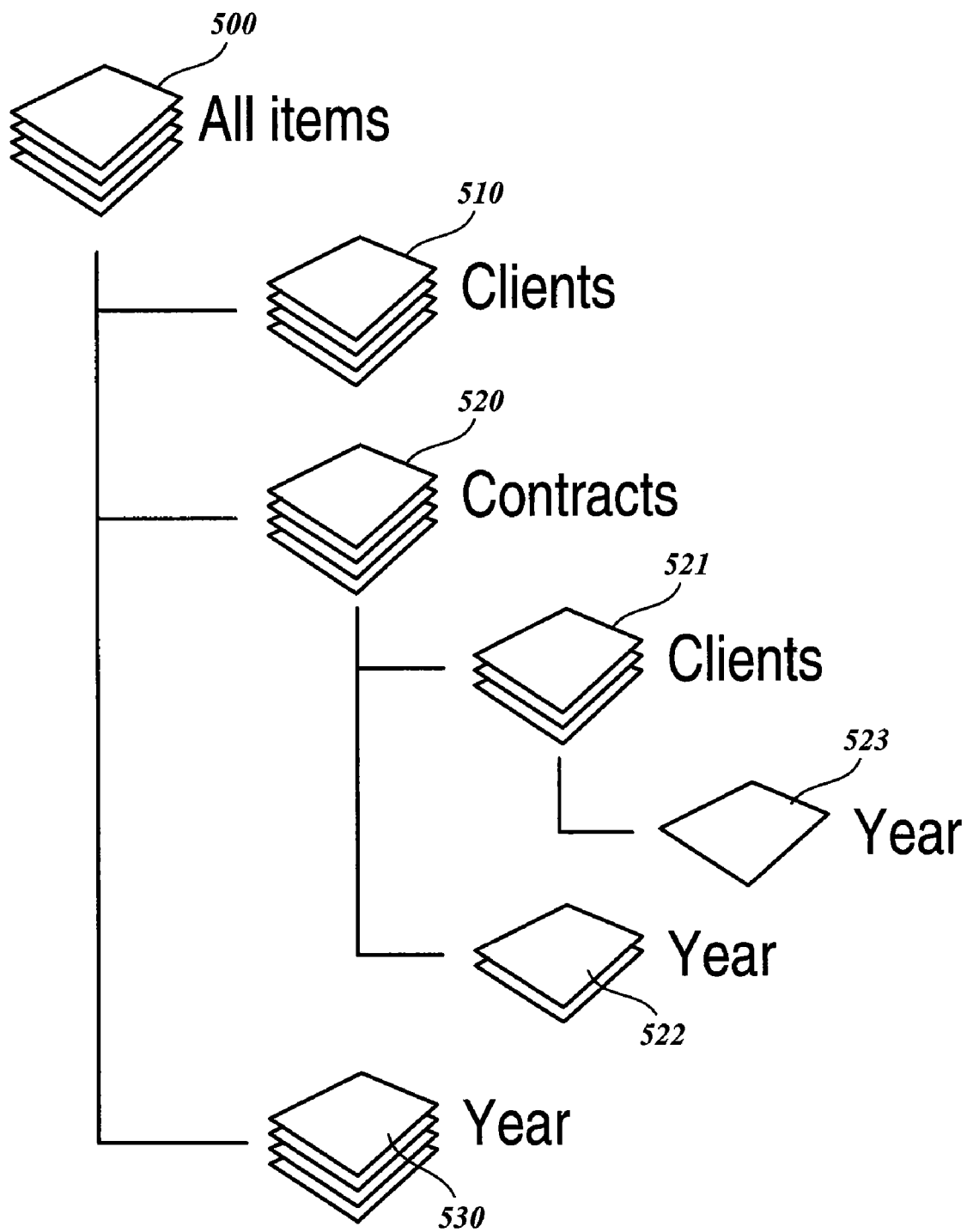
FIG. 9 is a tree diagram of the virtual folder structure of FIG. 6, wherein the contracts stack is further filtered by clients and year, of which the clients are still further filtered by year.

FIG. 9 is a tree diagram of the virtual folder structure of FIG. 6, wherein at a second level, the virtual folder 520 has been further filtered into virtual folders 521 and 522, corresponding to clients and year. At a third level, the virtual folder 521 has further been filtered to a virtual folder 523, corresponding to a year. The contrast between the organizational structures of FIGS. 8 and 9 helps illustrate the flexibility of the virtual folder system. In other words, in a virtual folder system, a user is able to navigate the virtual folders according to desired parameters, as opposed to being dependent on the location-dependent views of a physical file structure such as that illustrated in FIG. 5.

Figure 10:
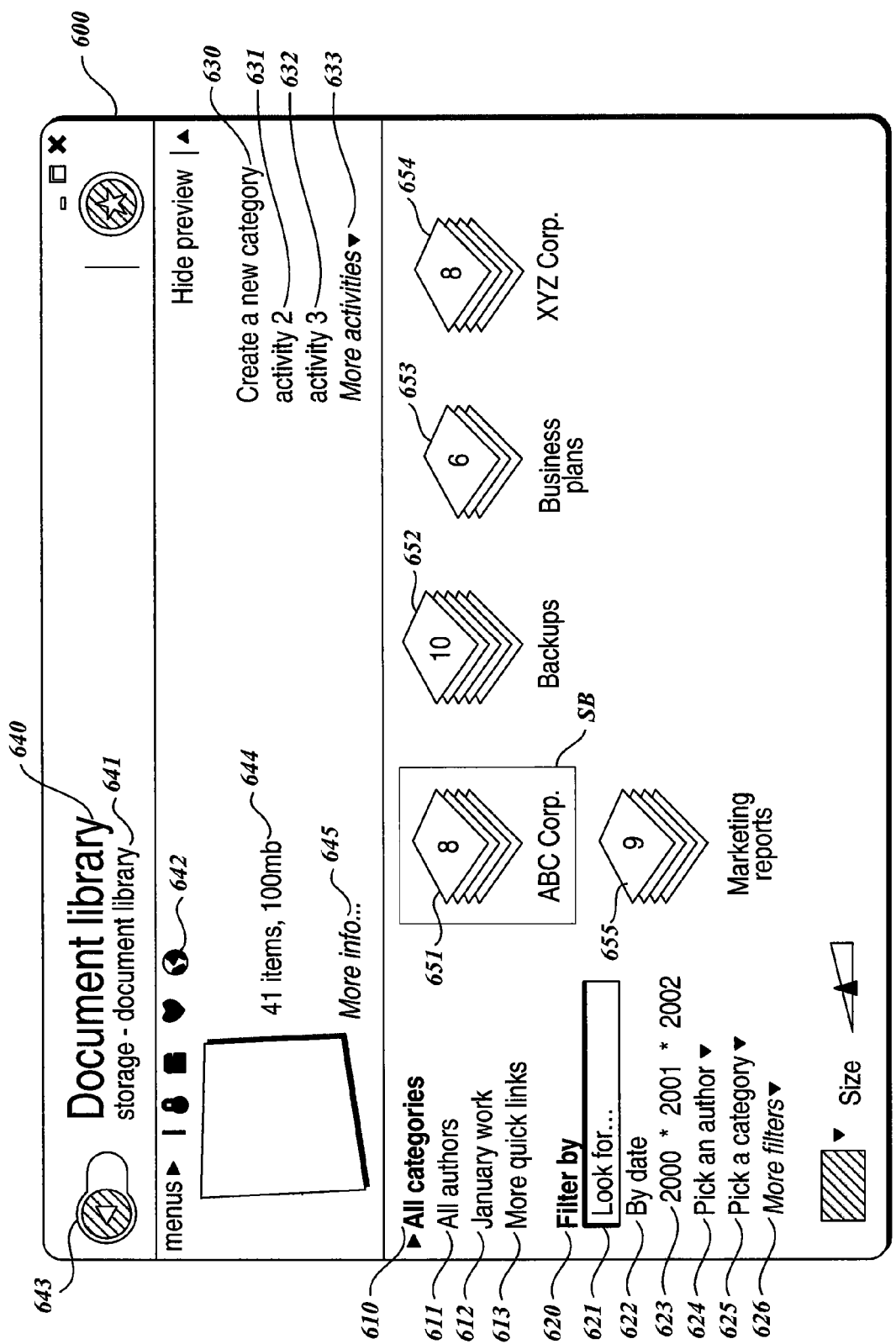
FIG. 10 is a diagram illustrative of a screen display showing the stacks of a document library.

FIG. 10 is a diagram illustrative of a screen display 600 showing the stacks of a document library. As noted above, stacks can be used to represent a type of virtual folder. As will be described in more detail below, the screen display 600 includes quick link elements 610-613, filter elements 620-626, activity elements 630-633, information and control elements 640-645, and virtual folder stacks 651-655.

The quick link elements include an "all categories" quick link 610, on "all authors" quick link 611, a "January work" quick link 612, and a selection for displaying additional quick links 613. As will be described in more detail below, quick links can be selected by a user to perform desired navigations of the virtual folders. Quick links may be provided by the system, and some quick links may be created and saved by a user.

The filter elements include a "filter by" indicator 620, an entry blank 621, a "by date" indicator 622, a "year" selector 623, a "pick an author" selector 624, a "pick a category" selector 625, and a "more filters" selector 626. The "filter by" indicator 620 directs a user to the fact that the items below can be used to filter the virtual folders or items. The entry blank 621 provides an area in which a user can type a desired new filter term. The "by date" indicator 622 directs a user to the fact that by selecting a date from the "year" selector 623, the virtual folders or items can be filtered by the selected year. The "pick an author" selector 624 allows a user to filter according to a specific author. The "pick a category" selector 625 allows a user to filter according to a selected category. The "more filters" selector 626 allows a user to pull up additional filters on the display.

The activity selectors include a "create a new category" selector 630, "activity" selectors 631 and 632, and a "more activities" selector 633. As will be described in more detail below, the activities that are presented may be for generally desirable functions, or may more specifically be directed to activities useful for the type of virtual folders that are currently being displayed. For example, the "create a new category" selector 630 can be selected by the user to create a new category which will be represented by a new stack.

As noted above, the activity selectors 631 and 632 may be more specifically directed to the type of folders or items that are being displayed. For example, the present display is of a document library, for which the "activity" selectors 631 and 632 may be directed to activities specifically tailored for documents, such as editing or creating attachments. If the present library had been a photo library, the "activity" selector 631 and 632 could be for activities specifically directed to photos, such as forming photo albums or sharing photos with other users.

The information and control elements include information lines 640 and 641, a control line 642, a backspace control 643, and information lines 644 and 645. The information lines 640 and 641 provide information as to the current navigation of the virtual folders or items. In the present example, the information line 640 indicates that the current navigation is to a document library, while the information line 641 indicates the more complete navigation, showing that the document library is within the storage area. The control line 642 provides a number of standard controls, and the backspace button 643 allows a user to back up through navigation. The information line 644 provides numerical information about the contents of the present navigation. In the present example, the information line 644 indicates that there are 41 items which take up 100 MB in the stacks of the document library. The information line 645 is available to provide additional information, such as additional information about a file that is selected.

The stacks of the document library include an "ABC Corp." stack 651, a "backups stack" 652, a "business plans" stack 653, an "XYZ Corp." stack 654, and a "marketing reports" stack 655. The numbers on top of each of the stacks indicate how many items are in each stack. For example, the "ABC Corp." stack 651 is shown to include 8 items. The total number of items of the stacks adds up to the number of items indicated in the information line 644, which as described above is 41 in the present example. A selection box SB is provided which can be utilized by a user to select a desired item. The selection of the "ABC Corp." stack 651 yields a view of the items of that stack, as will be described below with respect to FIG. 11.

Figure 11:
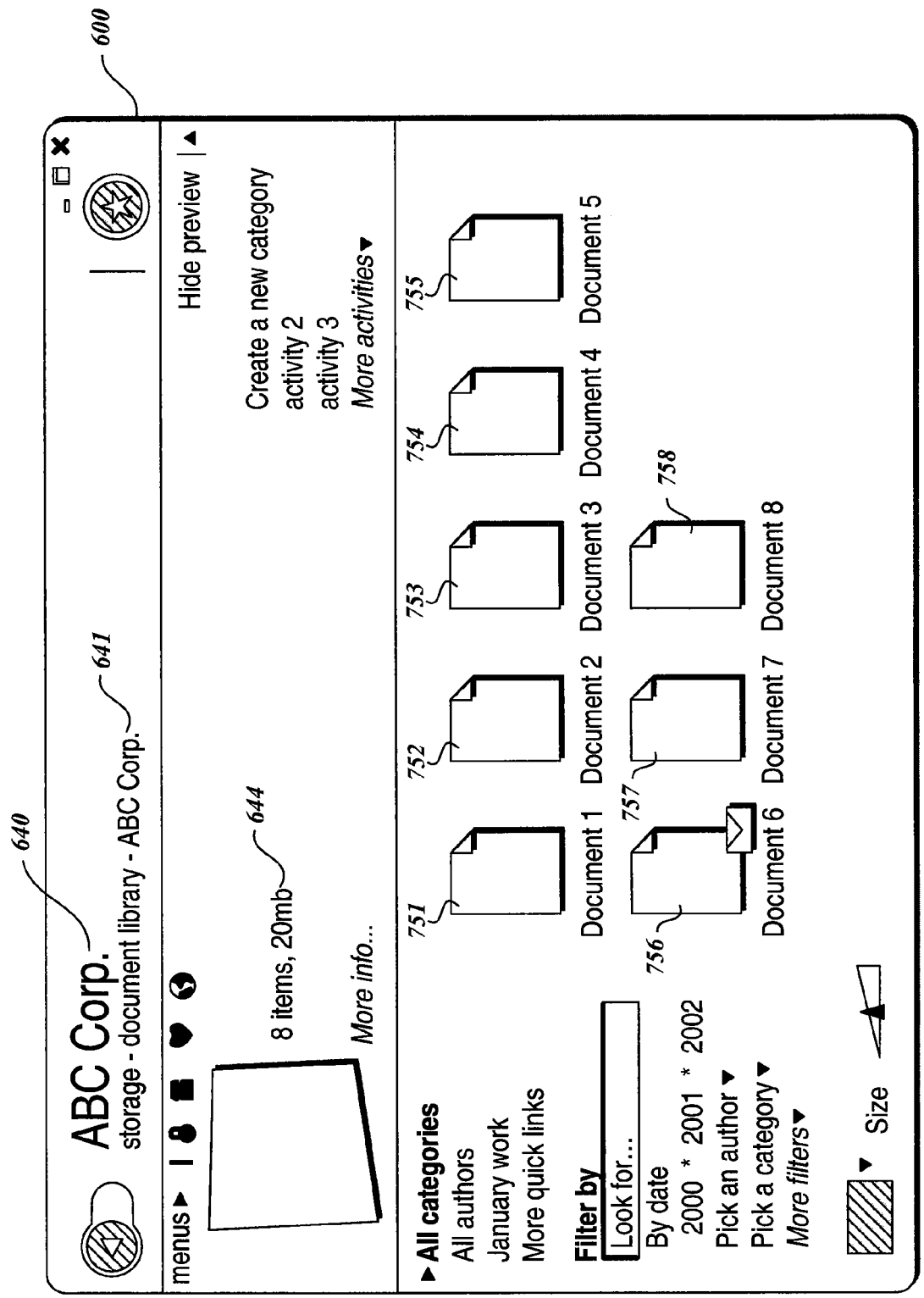
FIG. 11 is a diagram illustrative of a screen display showing the documents in the ABC Corp. stack of FIG. 10.

FIG. 11 is a diagram illustrative of a screen display showing the items in the "ABC Corp." stack 651 of FIG. 10. It should be noted that the information lines 640 and 641 now indicate that the present navigation is showing the "ABC Corp." stack. The "ABC Corp." stack 651 is shown to include 8 documents 751-758, corresponding to documents 1-8, respectively. The information line 644 correspondingly indicates that there are 8 items which take up 20 MB of memory. Documents of FIG. 11 may be further arranged into stacks within the ABC Corp. stack. In other words, within the virtual folder represented by the ABC Corp. stack 651, additional virtual folders may be organized to hold the documents, as will be described below with respect to FIGS. 12-16.

Figure 12:
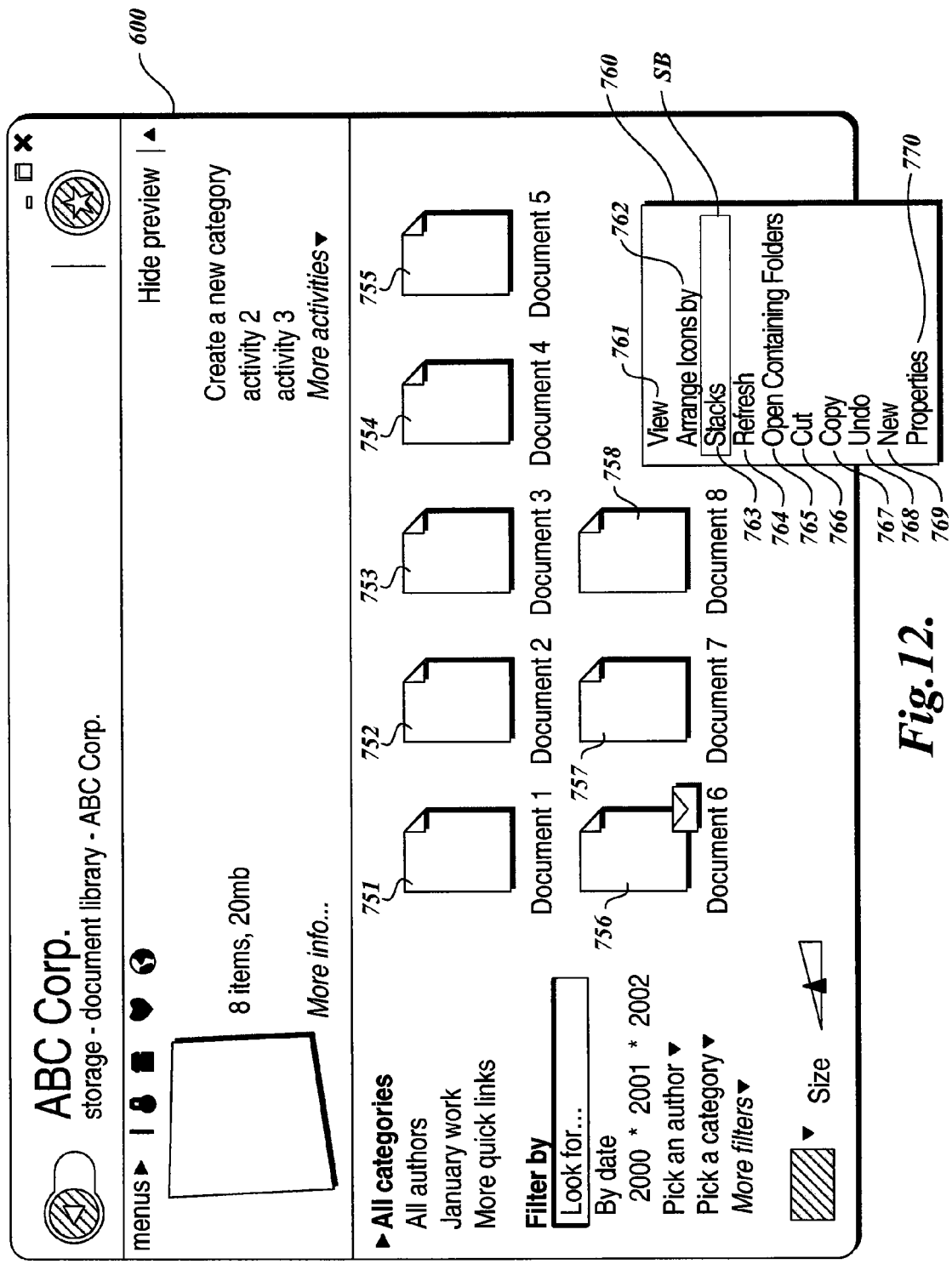
FIG. 12 is a diagram illustrative of a screen display in which a stacking function is selected for the documents of FIG. 11.

FIG. 12 is a diagram illustrative of a screen display in which a stacking function is selected for the documents of FIG. 11. As shown in FIG. 12, the user is able to pull up a function box 760. The function box 760 includes a "view" selection 761, an "arrange icons by" selection 762, a "stacks" selection 763, a "refresh" selection 764, an "open containing folders" selection 765, a "cut" selection 766, a "copy" selection 767, an "undo" selection 768, a "new" selection 769, and a "properties" selection 770. The selection box SB is shown to be around the "stacks" selection 763.

Figure 13:
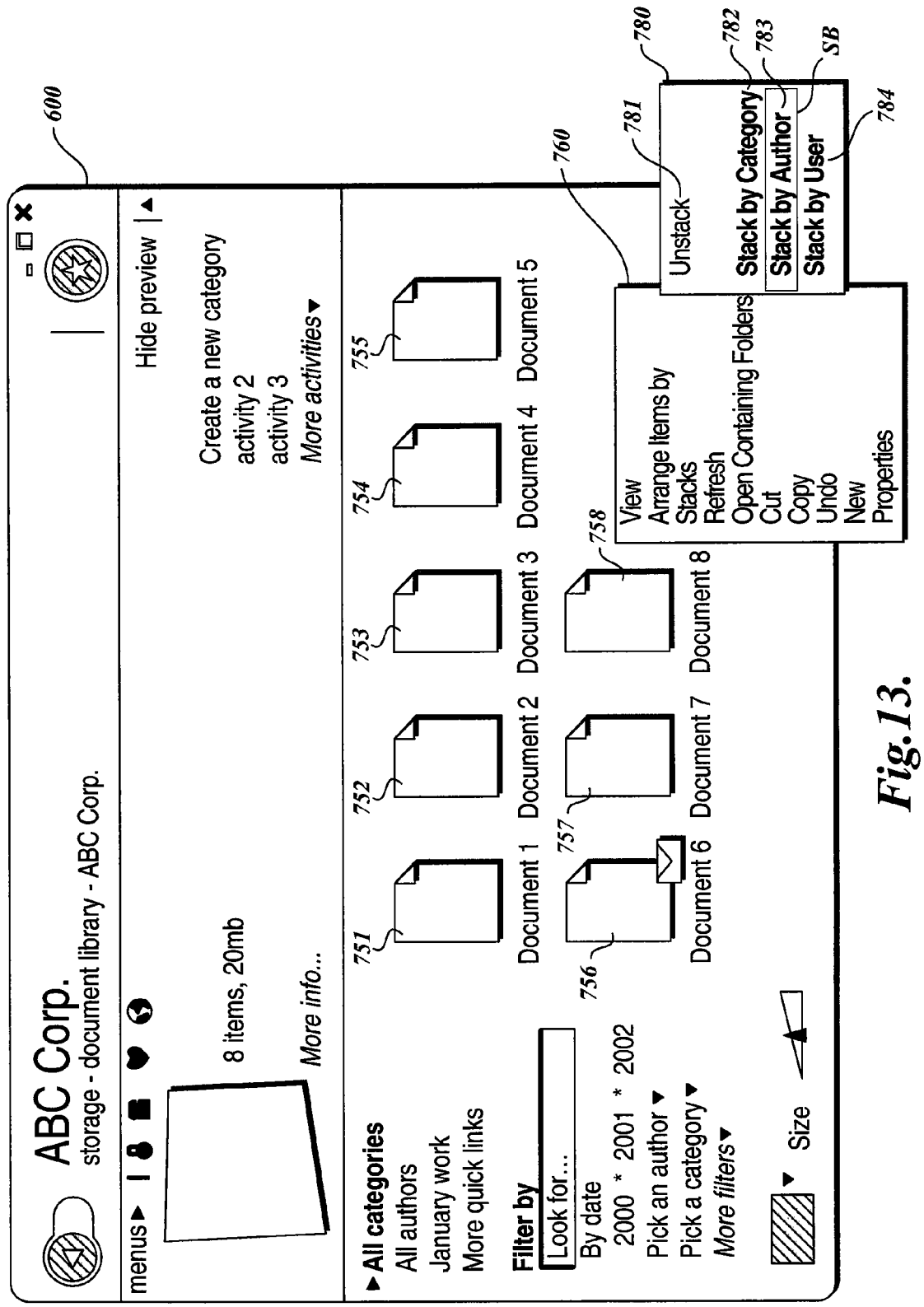
FIG. 13 is a diagram illustrative of a screen display in which a "stack by author" parameter is selected for the stacking function of FIG. 12.

FIG. 13 is a diagram illustrative of a screen display in which a "stack by author" parameter is selected for the stacking function of FIG. 12. As shown in FIG. 13, a box 780 is displayed which presents various stacking options. The stacking options include an "unstack" option 781, a "stack by category" option 782, a "stack by author" option 783, and a "stack by a user" option 784. The selection box SB is shown to be around the "stack by author" option 783.

Figure 14:
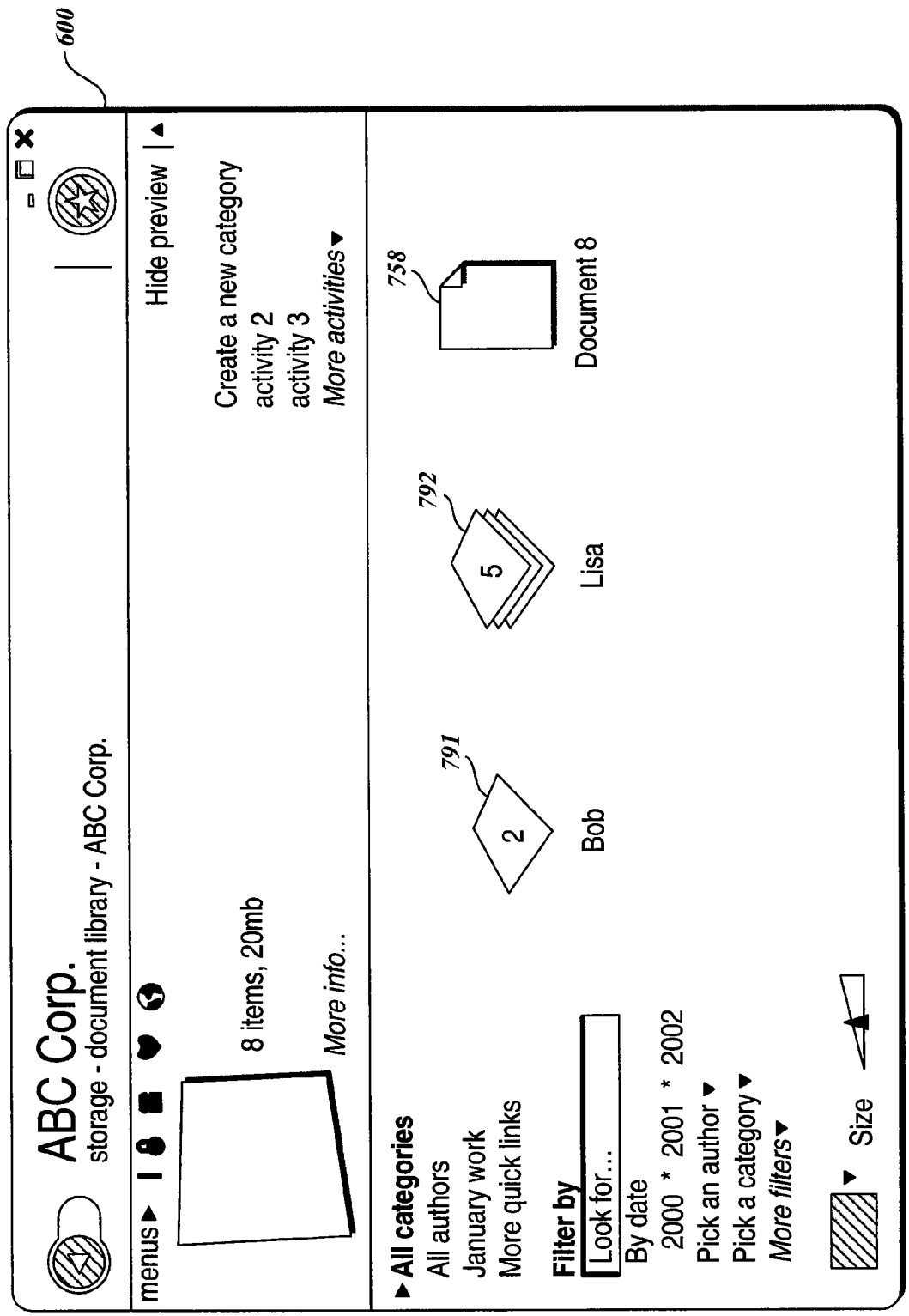
FIG. 14 is a diagram illustrative of a screen display in which the files of FIG. 13 have been stacked by author.

FIG. 14 is a diagram illustrative of a screen display in which the files of FIG. 13 have been stacked by author. As shown in FIG. 14, stacks 791 and 792 correspond to authors Bob and Lisa, respectively. As indicated by the numbers on top of each of the stacks, the Bob stack 791 includes two items, while the Lisa stack 792 includes five items. The item 758 (corresponding to document 8) did not have an author, and so is not included in an "author" stack. The stacks 791 and 792 illustrate that stacks may be organized at multiple levels, such as within the "ABC Corp." stack 651. Thus, the virtual folders may be formed at multiple levels, such as the "Lisa" stack 792 being within the "ABC Corp." stack 651 which is within the document library.

Figure 15:
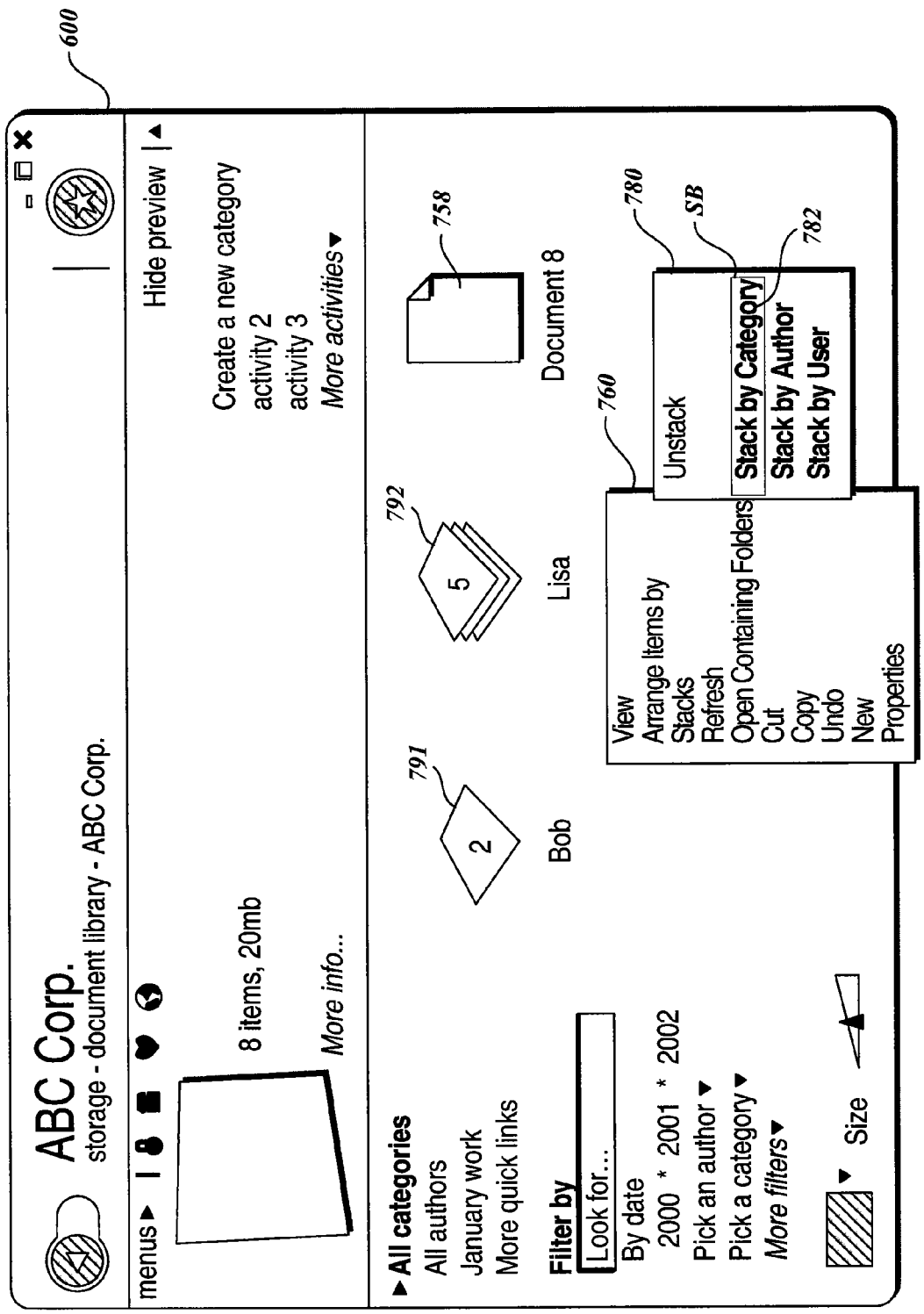
FIG. 15 is a diagram illustrative of a screen display in which a stacking function is selected and a "stack by category" option is further selected for restacking the files of FIG. 14.

FIG. 15 is a diagram illustrative of a screen display in which a "stack by category" option is further selected for restacking the files of FIG. 14. As shown in FIG. 15, the selection box SB is around the "stack by category" option 782. Since some of the items are already stacked in the stacks 791 and 792, the selection of the "stack by category" option 782 will restack the items, as will be described in more detail below with reference to FIG. 16.

Figure 16:
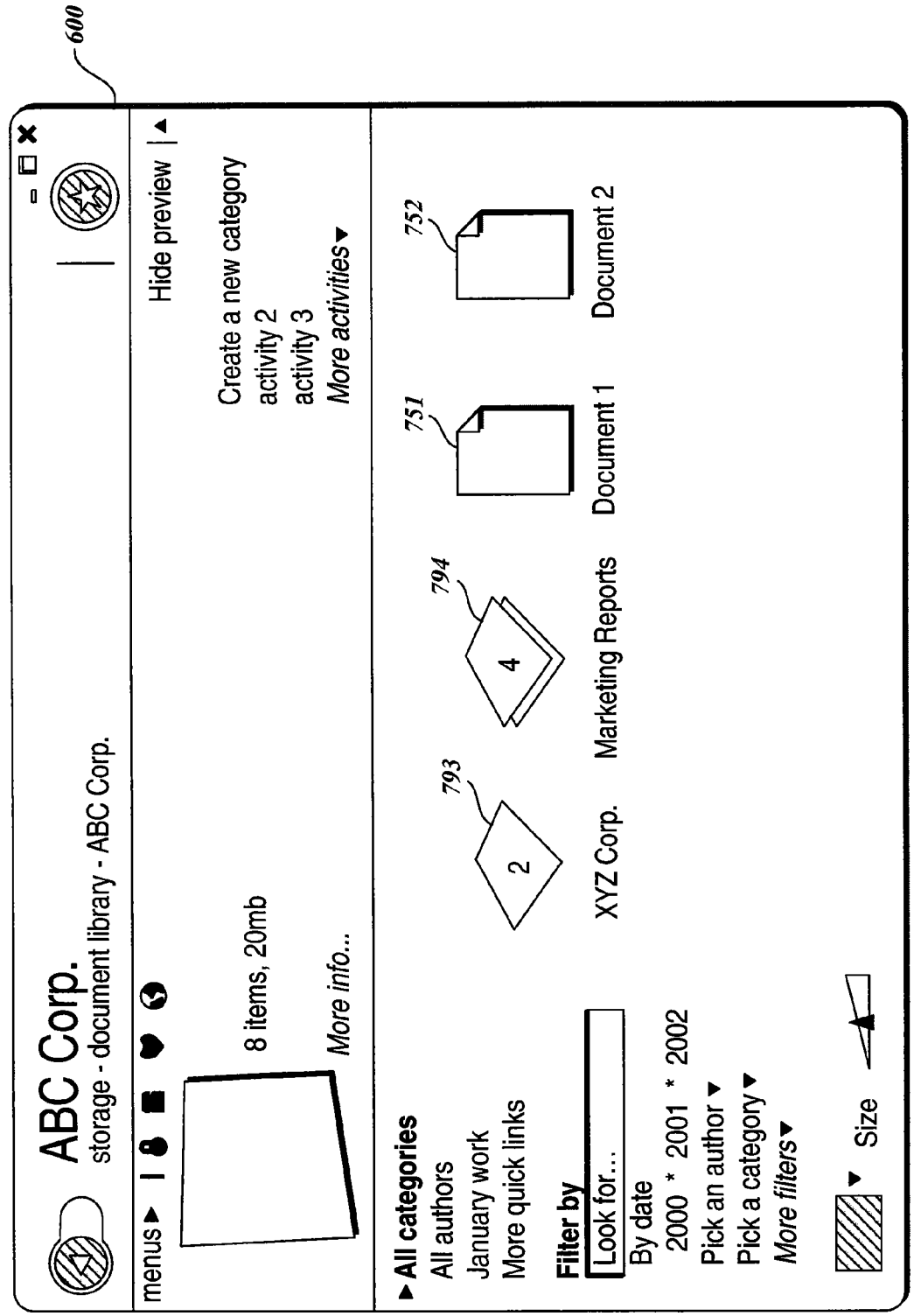
FIG. 16 is a diagram illustrative of a screen display in which the files of FIG. 14 have been restacked by category.

FIG. 16 is a diagram illustrative of a screen display in which the files of FIG. 14 are restacked by category. As shown in FIG. 16, the stacks 793 and 794 correspond to the "XYZ Corp." and "marketing reports" categories, respectively. The items 751 and 752, corresponding to documents 1 and 2, were not designated for any additional categories, and thus did not fall into any of the other category stacks.

Figure 17:
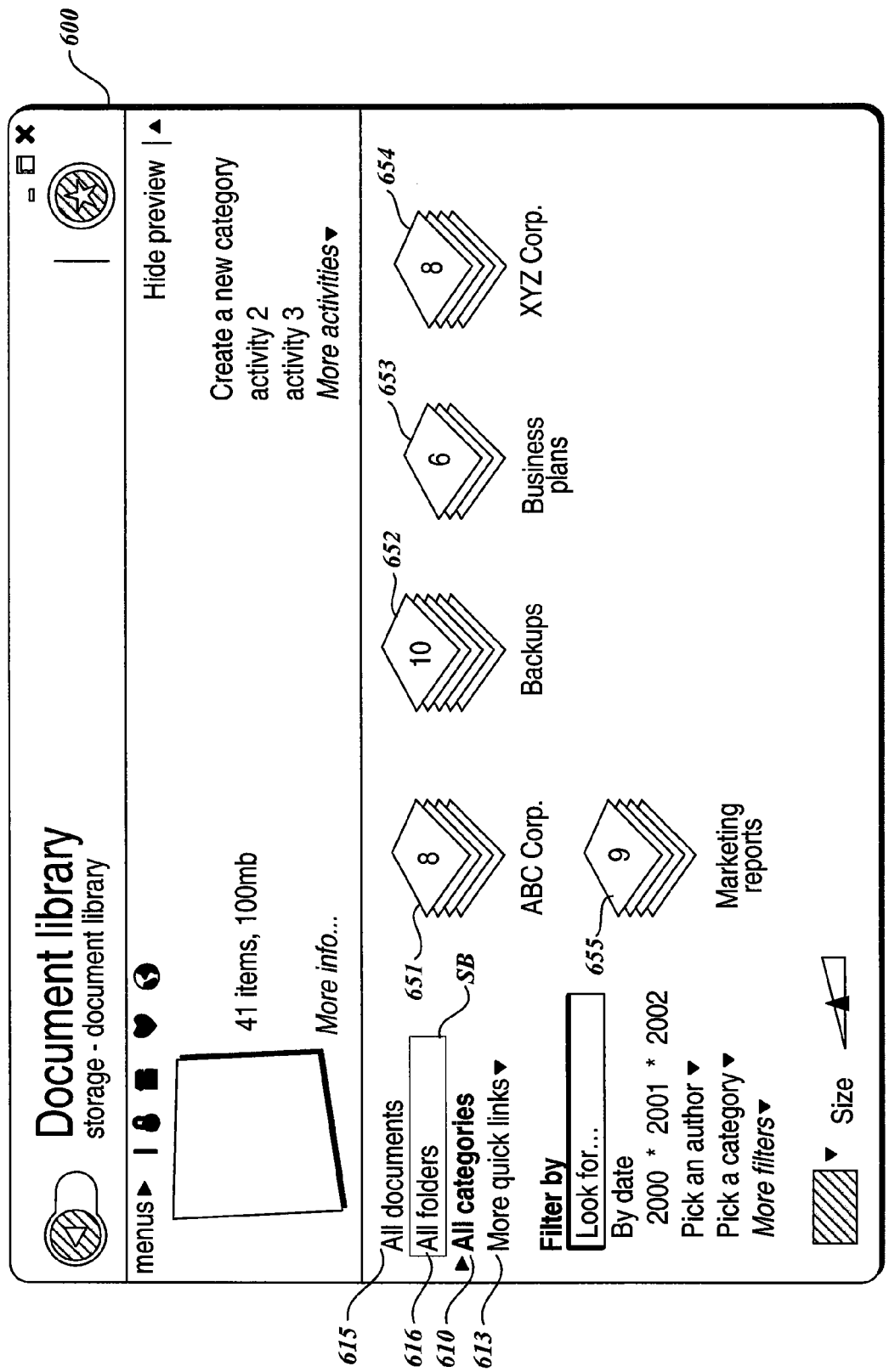
FIG. 17 is a diagram illustrative of a screen display in which a quick link for showing physical folders is selected.

FIG. 17 is a diagram illustrative of a screen display in which a quick link for physical folders is selected. The selection box SB is shown to be around the "all folders" quick link 616. As will be described in more detail below with respect to FIG. 18, the "all folders" quick link 616 provides for switching to a view of physical folders.

Figure 18:
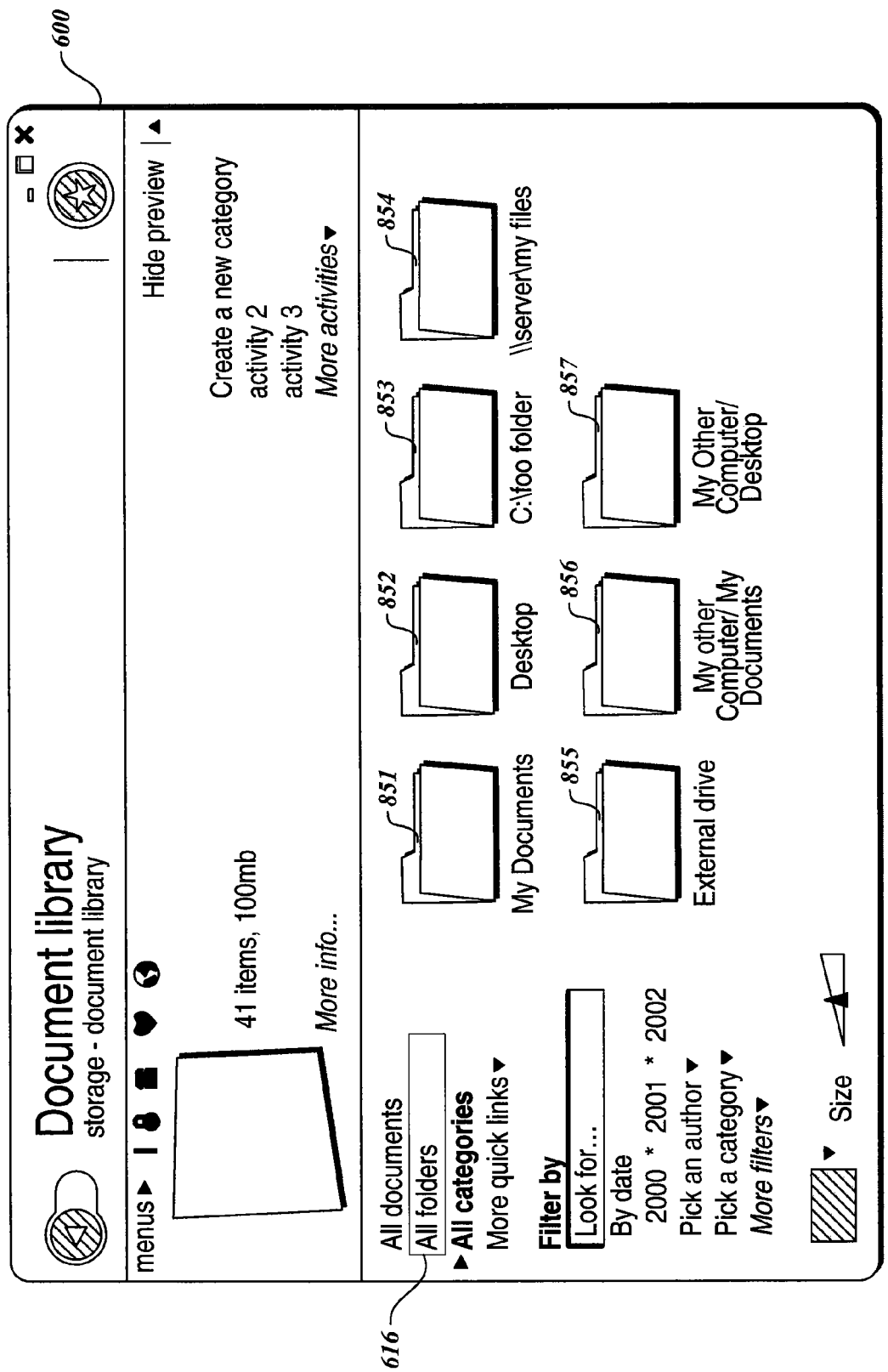
FIG. 18 is a diagram illustrative of a screen display in which the physical folders are shown which contain the files of the virtual folder stacks of FIG. 17.

FIG. 18 is a diagram illustrative of a screen display showing physical folders. The physical folders that are shown contain the files of the virtual folder stacks of FIG. 17. In other words, the items contained within the stacks 651-655 of FIG. 17 are also contained in certain physical folders in the system. These are shown in FIG. 18 as a "My Documents" folder 851 that is located on the present computer, a "Desktop" folder 852 that is located on the present computer, a "Foo" folder 853 that is located on the hard drive C:, a "My Files" folder 854 that is located on a server, an "External Drive" folder 855 that is located on an external drive, a "My Documents" folder 856 that is located on another computer, and a "Desktop" folder 857 that is located on another computer.

As shown in FIG. 18, a user is able to switch from the virtual files representation of FIG. 17 to the physical file representation of FIG. 18. This allows a user to toggle between virtual file representations and physical file representations, depending on which is desired for a current task. The different locations of the physical folders 851-857 also illustrate that the scope of the virtual file system may be relatively broad, as will be described in more detail below.

Figure 19:
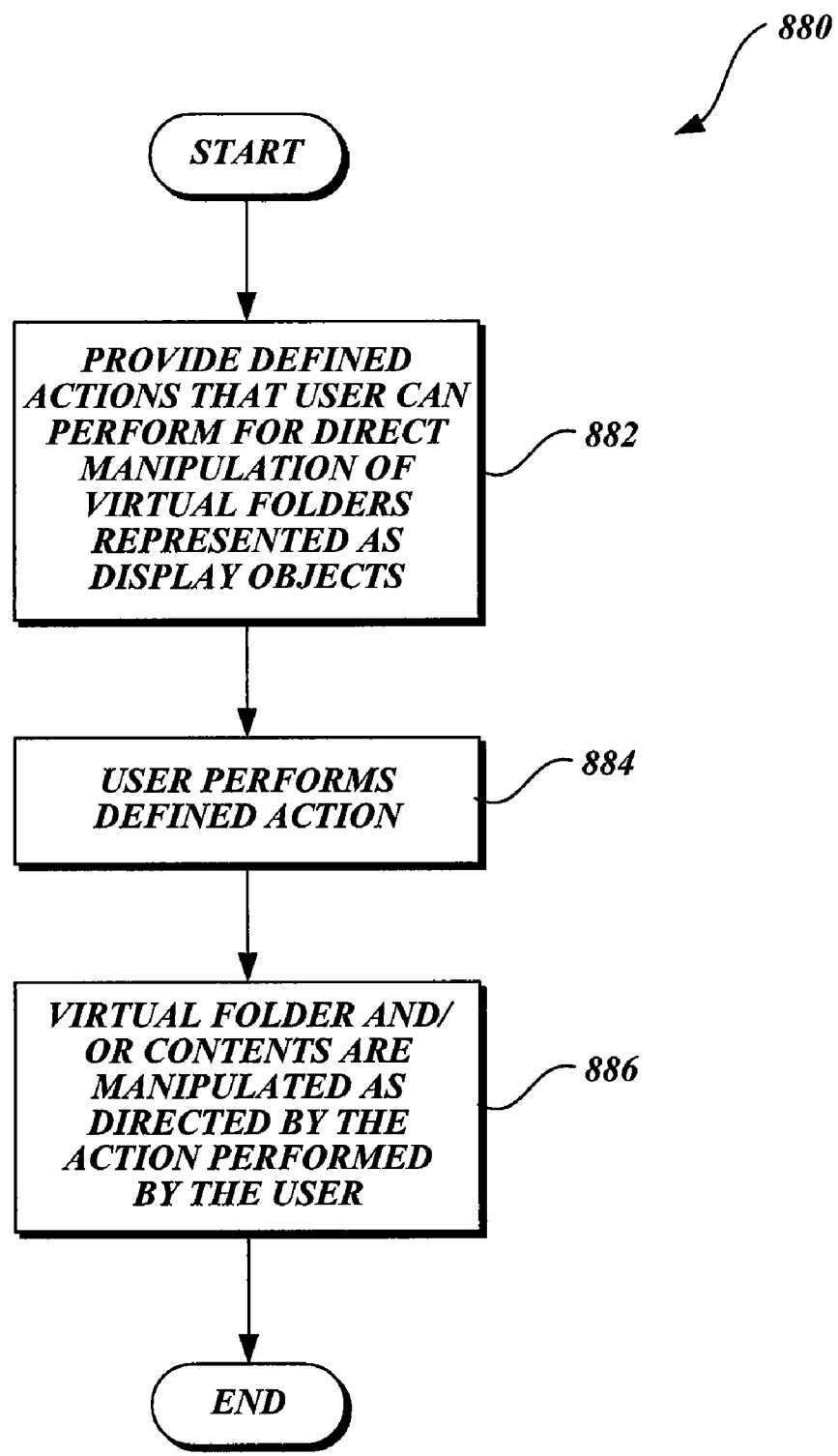
FIG. 19 is a flow diagram illustrative of a routine by which a user can directly manipulate virtual folders.

FIG. 19 is a flow diagram illustrative of a routine 880 by which a user can directly manipulate virtual folders. As will be described in more detail below, the mechanisms that are provided for manipulating the virtual folders are similar to those that are currently used for manipulating regular folders (e.g., clicking and dragging, copying, pasting, etc.). As shown in FIG. 19, at a block 882, the system provides defined actions that the user can perform for direct manipulation of the virtual folders that are represented as display objects. At a block 884, the user performs a defined action. As noted above, one example of this might be a user clicking and dragging a virtual folder to copy its contents to another virtual folder. At a block 886, the virtual folder and/or contents are manipulated as directed by the action performed by the user.

Figure 20:
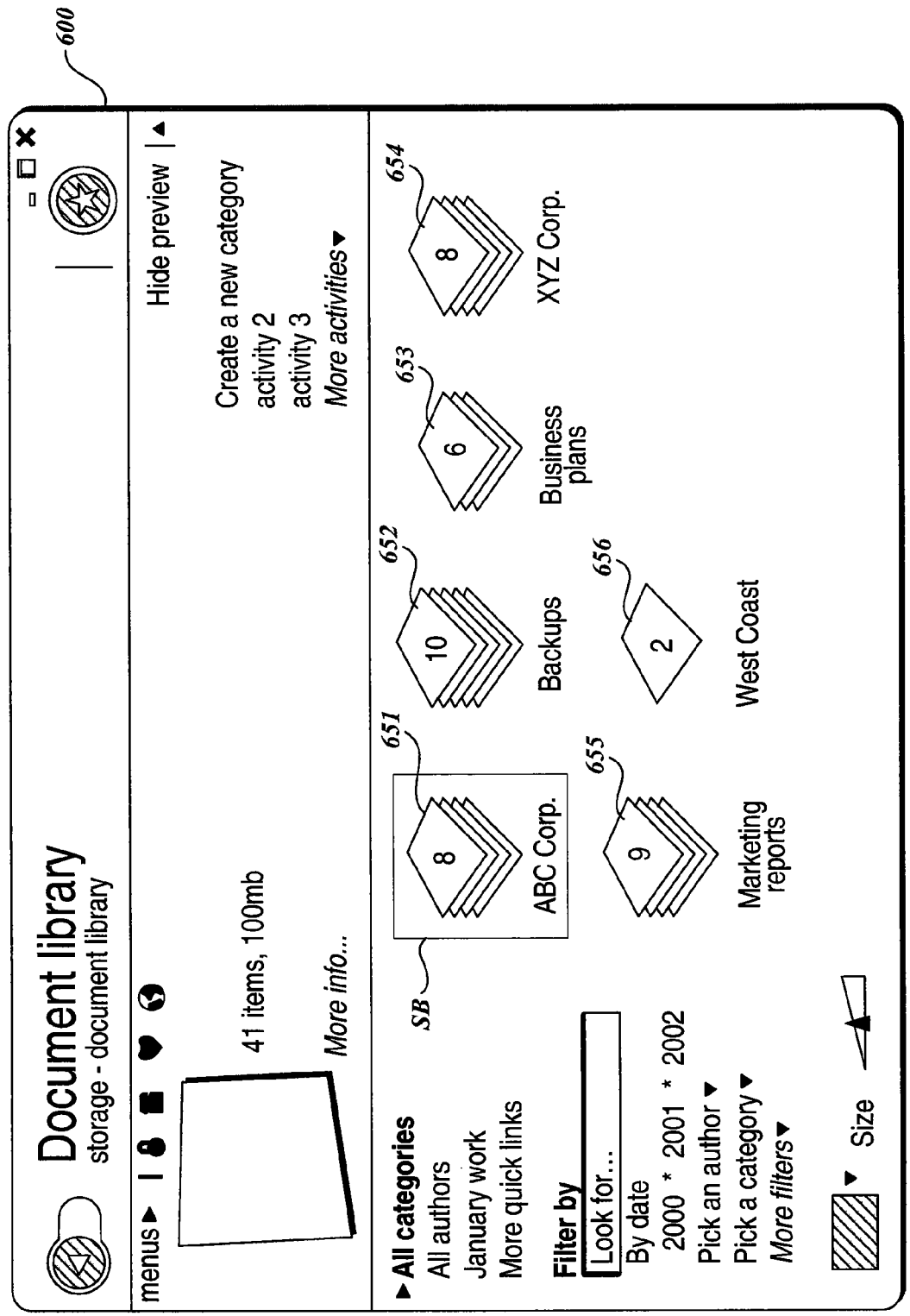
FIG. 20 is a diagram illustrative of a screen display in which a new "West Coast" stack has been added to the stacks of FIG. 10.

FIG. 20 is a diagram illustrative of a screen display in which a new West Coast stack 656 has been added to the stacks of FIG. 10. The West Coast stack 656 was formed by a user creating a new category of "West Coast." Upon its initial creation, the new West Coast stack 656 would be empty and have zero items. In the embodiment of FIG. 20, two items have been added to the West Coast stack 656. One method for adding items to a stack is to select a particular item, and either modify or add additional categories to the category metadata for the item, such as adding the category "West Coast" to two items as was done in the embodiment of FIG. 20. This process illustrates that the category data is a metadata property for an item that is a type of ad-hoc property. In other words, a property of this type does not have any implicit meaning, and can be assigned an arbitrary value by the user. For example, the category "property" can have any value whereas the "author" property should be the name of a person. As will be described in more detail below with reference to FIG. 21, items may also be clicked and dragged to be copied from other stacks to the West Coast stack 656 (in which case the categories of the items are automatically updated to include "West Coast"). In this regard, FIG. 20 shows that the selection box SB is around the ABC Corp. stack 651, in preparation for its contents being copied.

Figure 21:
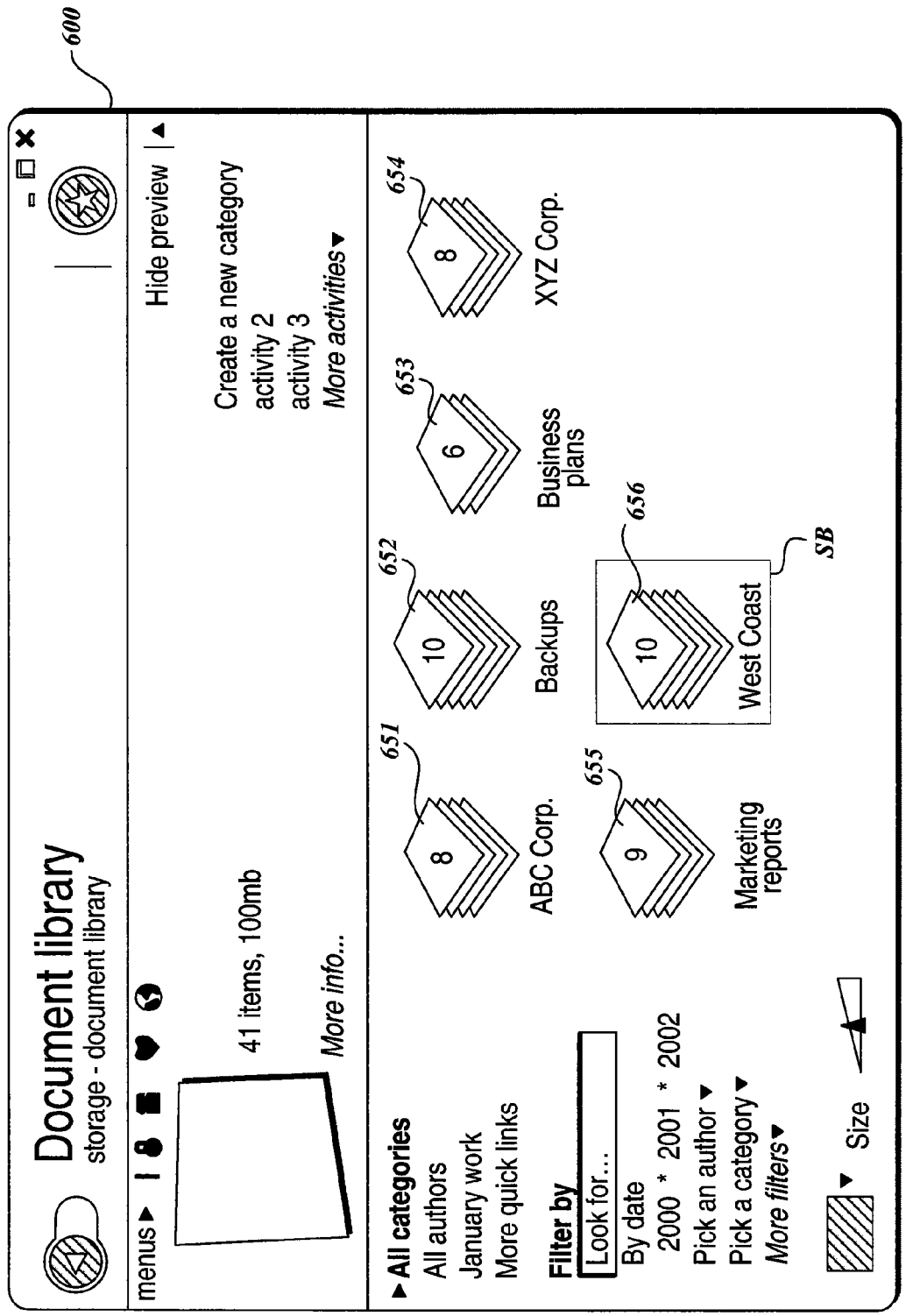
FIG. 21 is a diagram illustrative of a screen display in which direct manipulation is used for copying the files from the "ABC Corp." stack to the "West Coast" stack of FIG. 20.

FIG. 21 is a diagram illustrative of a screen display in which direct manipulation is used for copying the files from the ABC Corp. stack 651 to the West Coast stack 656. In other words, as shown in FIG. 20, the user selected the ABC Corp. stack 651, and then as shown in FIG. 21 the user has clicked and dragged the stack to be copied to the West Coast stack 656. Thus, the West Coast stack 656 which had two items in FIG. 20, is now shown to include a total of ten items, including the additional eight items from the ABC Corp. stack 651. When the items from the ABC Corp. stack 651 were copied to the West Coast stack 656, this was accomplished by modifying the category descriptions of the eight items to also include the "West Coast" category in addition to including the original "ABC Corp." category. This illustrates one type of direct manipulation that may be performed.

Another example of direct manipulation is right clicking an item and selecting delete. In one embodiment, when a deleting function is selected by a user, the user is queried whether the item should be deleted all together, or simply removed from the present virtual folder. If the item is just to be removed from a present virtual folder category stack as noted above, this can be accomplished by removing the desired category from the metadata for the item. In other words, if one of the items that had been copied from the ABC Corp. stack 651 to the West Coast stack 656 was then to be removed from the West Coast stack 656, this could be accomplished by modifying the category data for the particular file to no longer include the "West Coast" category.

Figure 22:
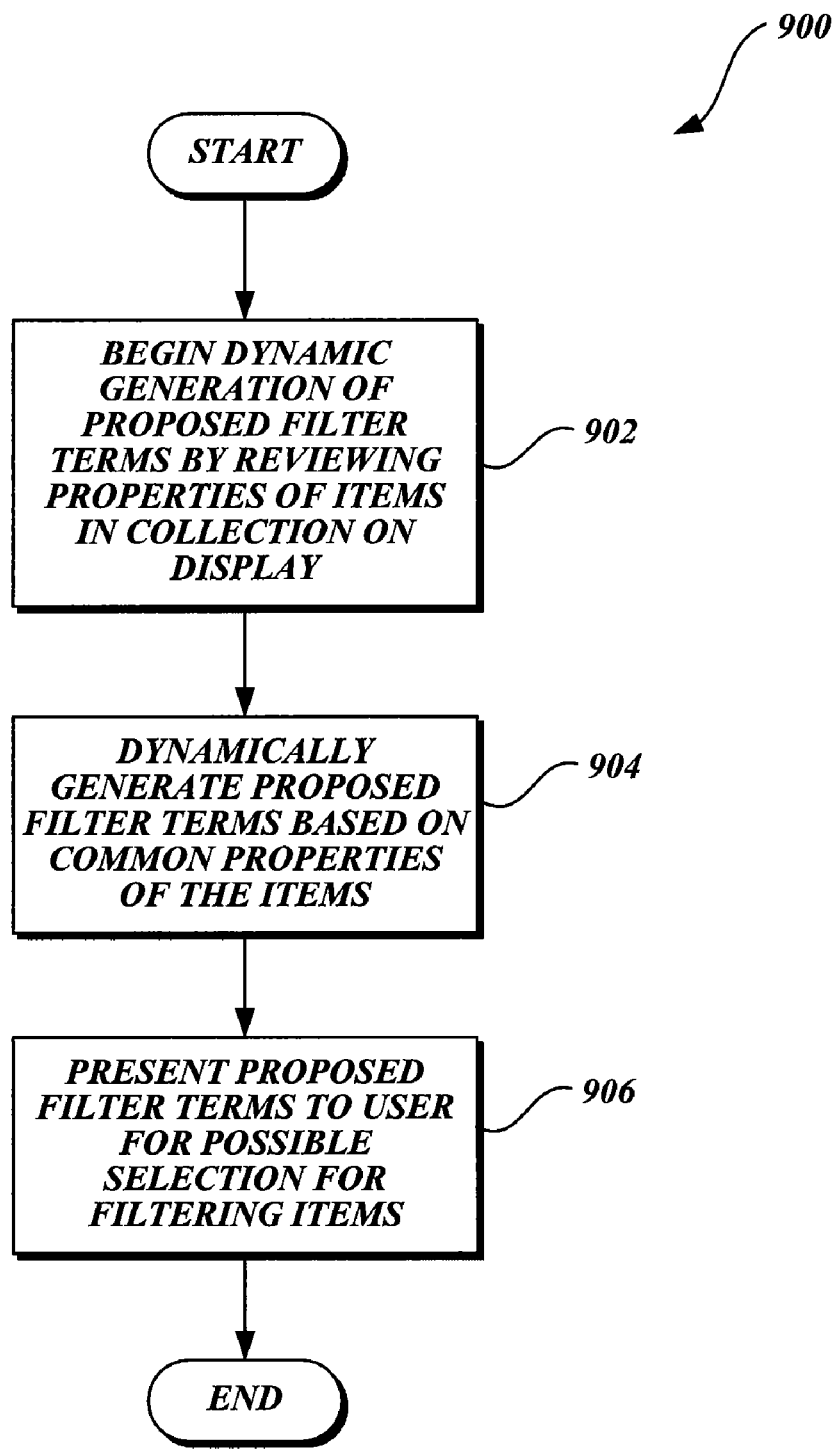
FIG. 22 is a flow diagram illustrative of a routine for the system dynamically generating new filter terms.

FIG. 22 is a flow diagram illustrative of a routine 900 for the system dynamically generating new filter terms. Filter terms are utilized for manipulating the virtual folders. The filtering terms are essentially utilized as a set of tools for narrowing down a set of items. In one embodiment, filters consist of metadata categories and their values (presented to the user in the user interface as clickable links or drop-down menus). The user clicks on a filter term in order to filter down the current results set of items on the display.

FIG. 22 illustrates how filters may be dynamically generated. As shown in FIG. 22, at a block 902, the properties (from the metadata) of the items in a collection on the present display are reviewed. In a block 904, proposed filter terms are dynamically generated based on common properties of the items. At a block 906, the proposed filter terms are presented to the user for possible selection for filtering items. As an example of this process, the system may review the properties of a set of items, and if the items generally have "Authors" as a property, the filter can provide a list of the authors to filter by. Then, by clicking on a particular Author, the items that don't have that Author are removed from the set on the display. This filtering process provides the user with a mechanism for narrowing the set of items on the display.

Figure 23:
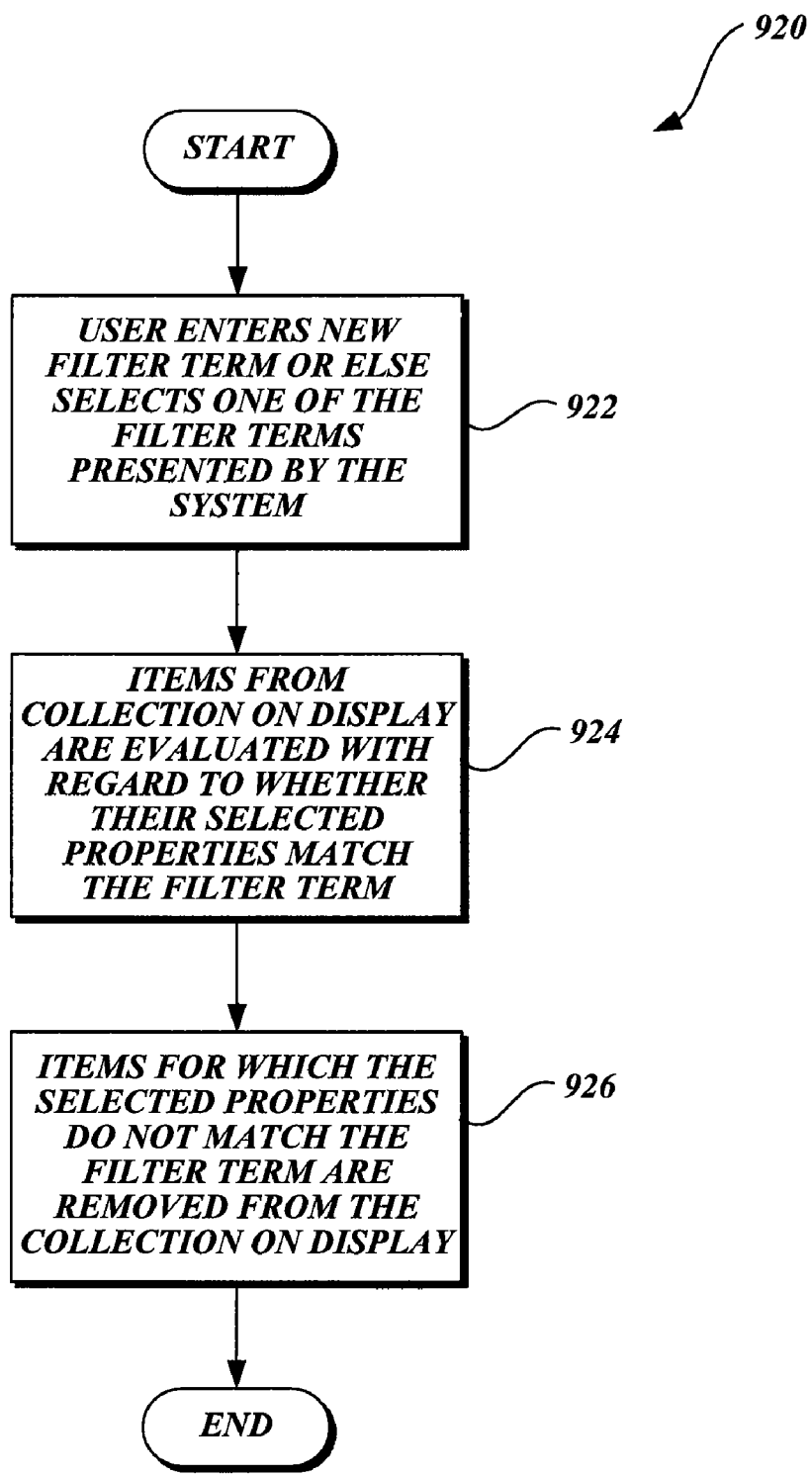
FIG. 23 is a flow diagram illustrative of a routine for the system filtering items based on the selection of a filter term.

FIG. 23 is a flow diagram illustrative of a routine 920 for the system filtering items based on the selection of a filter term. At a block 922, the user either enters a new filter term or else selects one of the filter terms that have been presented by the system. As noted above, the filter terms may be dynamically generated by the system, or they may be preset. At a block 924, the items from the collection on the display are evaluated with regard to whether their selected properties match the filter term. For example, if the filter term is for items that were authored by "Bob," then the items are evaluated in accordance with whether their author property includes "Bob". At block 926, the items for which the selected properties do not match the filter term are removed from the collection on the display.

FIGS. 24-29 generally illustrate how the filtering process appears on the screen display. As will be described below with reference to FIGS. 24-29, in one embodiment, the filtering may generally operate according to the following process. After the user clicks on a filter value, the items outside the filter range are animated off the screen. The animation is generally designed to make it obvious that items are being removed and that no new items are being added. The back button 643 may be selected by a user so as to undo the filter operations. In one embodiment, a navigation stack is created which contains the sequential filter actions, which is utilized to undo each of the filter actions when the back button 643 is selected. Each time a filter value is selected, the information areas 640 and 641 are updated to indicate the current filter value. In one embodiment, after a filter value is selected, a user is provided an option for saving a new quick link to the current filter navigation, as will be described in more detail below with respect to FIG. 30. As filter values are selected, the filter controls may be updated to be appropriate for the items remaining in the view.

Figure 24:
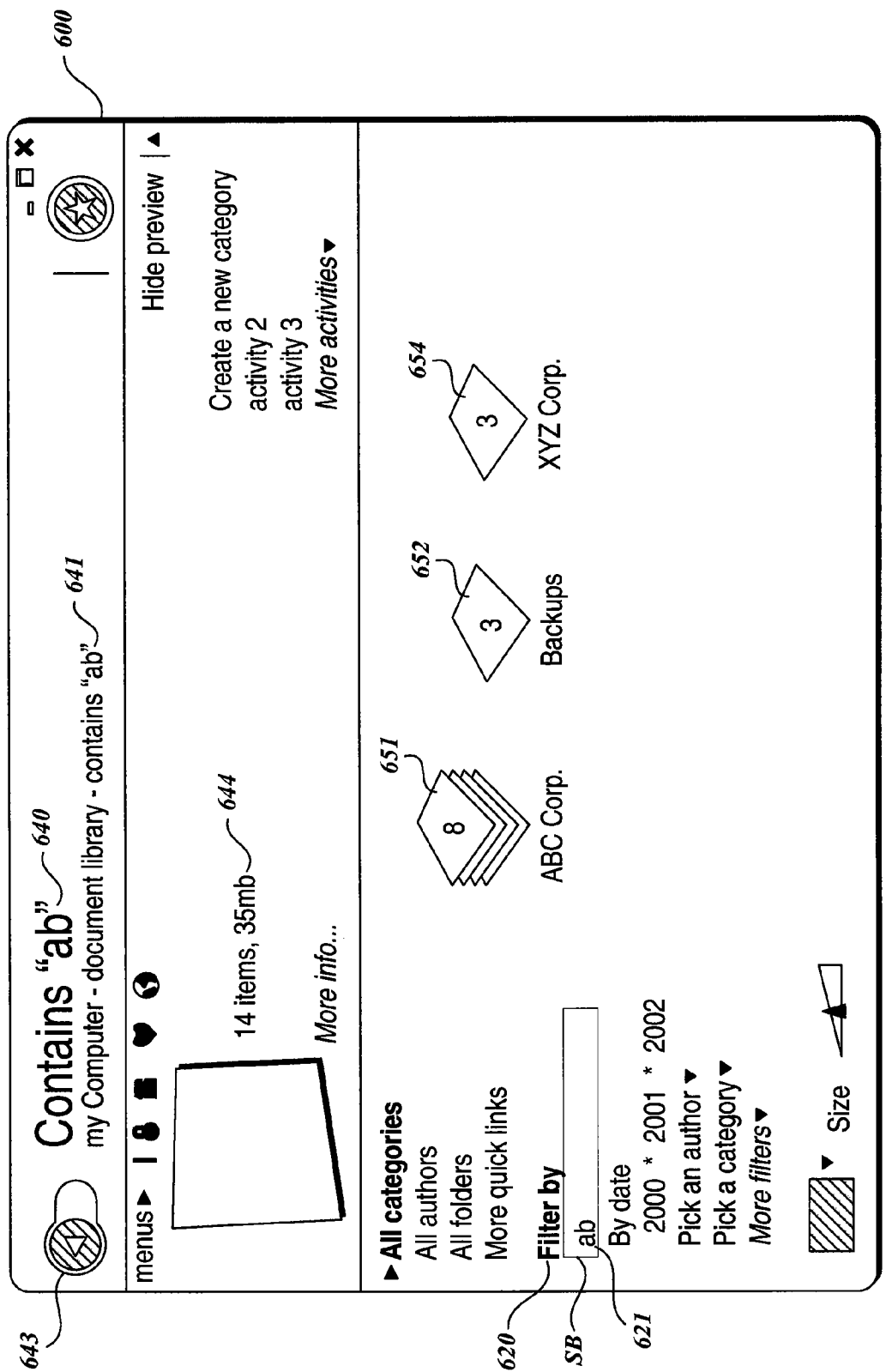
FIG. 24 is a diagram illustrative of a screen display in which the stacks of FIG. 10 have been filtered by the term "AB"

FIG. 24 is a diagram illustrative of a screen display in which the stacks of FIG. 10 have been filtered by the term "AB". As shown, in the filter area 621, the term "AB" has been typed by a user. The information lines 640 and 641 indicate that the items in the display are now those that have been filtered by the term "AB". As shown, the ABC Corp. stack 651 still contains eight items, while the Backups stack 652 now contains three items, and the XYZ Corp. stack 654 also contains three items. The information line 644 thus indicates that there are a total of 14 items, taking up a total of 35 MB of memory.

Figure 25:
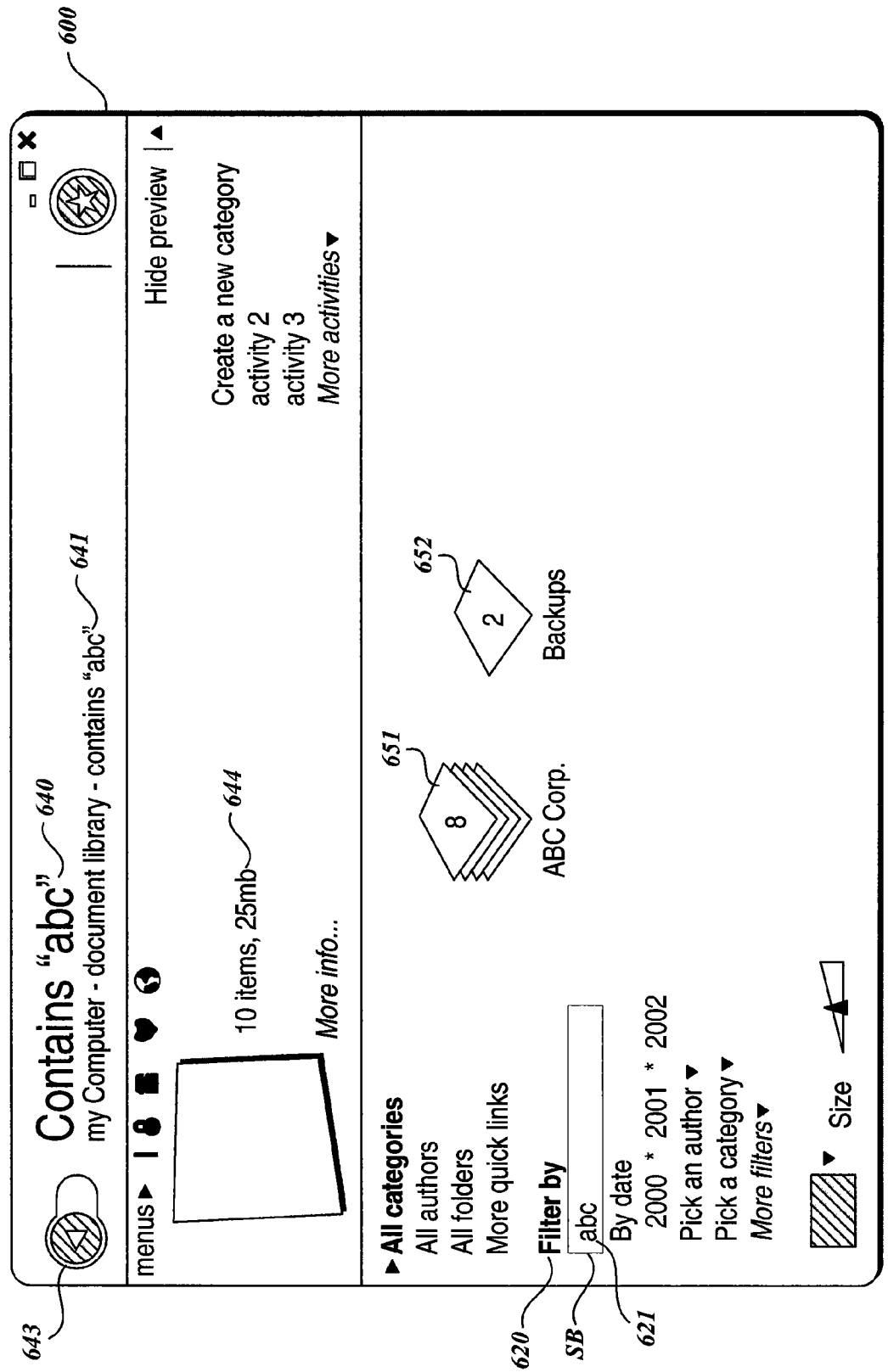
FIG. 25 is a diagram illustrative of a screen display in which the stacks of FIG. 10 have been filtered by the term "ABC"

FIG. 25 is a diagram illustrative of a screen display in which the stacks of FIG. 10 have been filtered by the term "ABC". With regard to the filter term "AB" of FIG. 24, the user has simply typed the additional letter "C" to make the total filter term "ABC". As shown in FIG. 25, the information lines 640 and 641 now indicate that the items on the display are those that contain the term "ABC". The ABC Corp. stack 651 is still shown to contain eight items, while the Backups stack 652 now contains only two items. The XYZ Corp. stack 654 has disappeared because none of its contents matched the "ABC" filter. The information line 644 now indicates that there are a total of 10 items in the stacks on the display, which take up a total of 25 MB of memory. FIGS. 24 and 25 thus provide examples of how a user may enter new filter terms, and how those filter terms are then used to filter the items that are shown on the display.

The back button 643 may be utilized by a user to back through the filtering process. As described above with respect to FIG. 10, the back button 643 allows a user to back up through navigation. With regard to the examples of FIGS. 24 and 25, after filtering by the term "ABC" in FIG. 25, a user could select the back button 643 so as to back up one step of the filtering process, which would return to the state of FIG. 24. Alternatively, in another embodiment, the back button 643 may clear out the entire filter term, and may thus return to the state before that filtering occurred. In this case, by pressing the back button 643 in FIG. 25, a user would return to the state of FIG. 10.

In one embodiment, in addition to the back button, an additional means is provided for a user to back up in or otherwise modify the filtering navigation. This additional means involves allowing the user to directly access and modify the information line 641, which correspondingly changes the filter navigation. In other words, by directly accessing and modifying the information line 641, the user can remove one or more of the applied filters, or modify the values for any of the applied filters. This feature is described in greater detail in U.S. patent application Ser. No. 10/420,040, filed Apr. 17, 2003, which is commonly assigned and hereby incorporated by reference in its entirety.

A timer may also be utilized in conjunction with a user typing in filter terms such as those shown in FIGS. 24 and 25. The timer is used to monitor for a pause in the typing by the user. After a selected interval of no typing, the filter is applied. For example, in the state of FIG. 24, a user has typed the filter term "AB", with no significant time lag between the "A" and the "B." After typing the term "AB", the user pauses, thus producing the state shown in FIG. 24, where the filter term "AB" is applied. Sometime later, the user adds the letter "C" to complete the filter term "ABC", and then pauses again, at which point the filter term "ABC" is applied as illustrated in FIG. 25.

In one embodiment, after a user has typed a filter term in the filter area 621, and then chooses another filter or navigation, the navigation state is updated, and the filter term in the filter area 621 is made to be empty again. In addition, as will be described in more detail below with reference to FIGS. 26-29, other filter controls may be updated based on the selection of certain filter terms.

Figure 26:
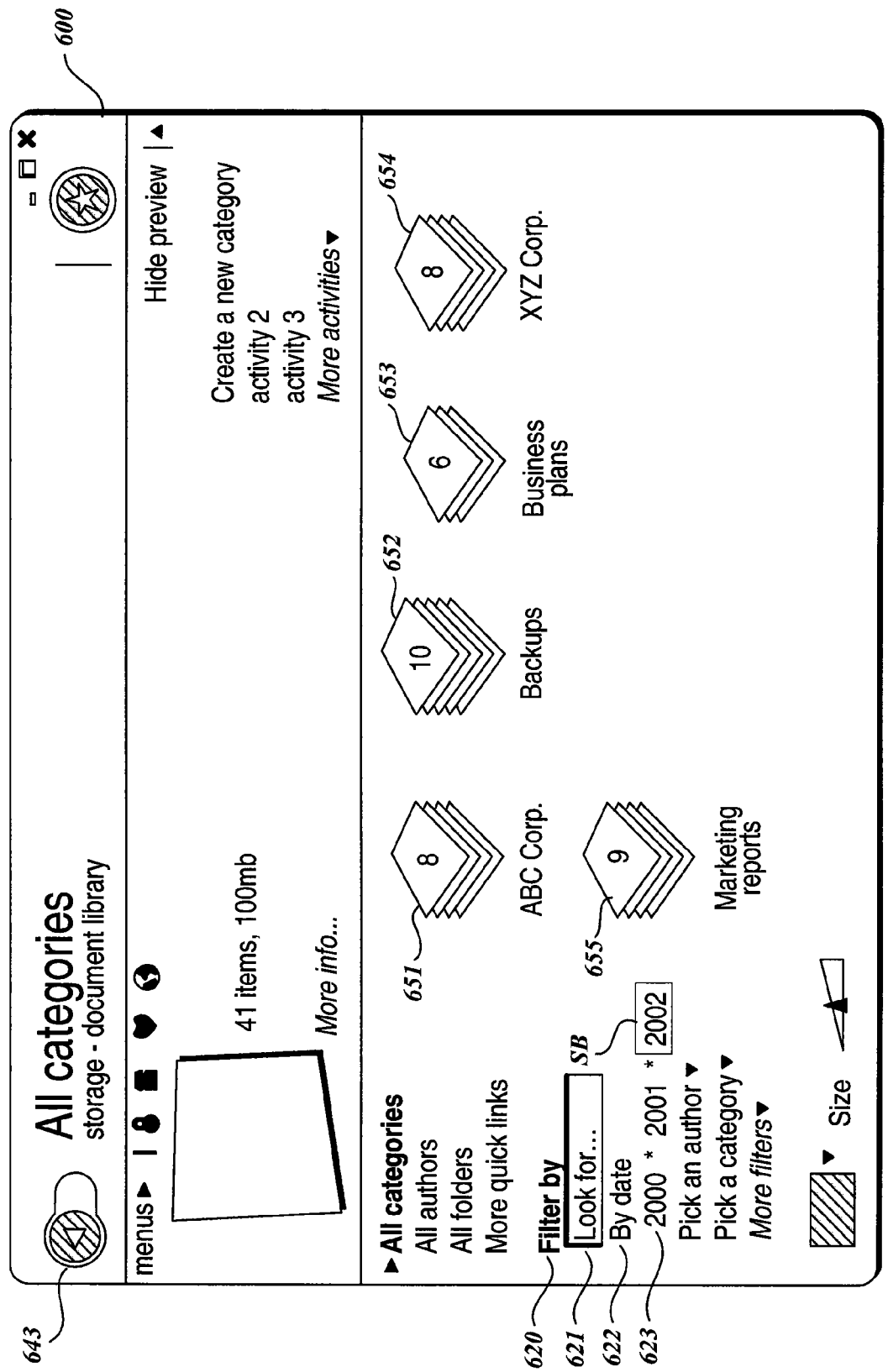
FIG. 26 is a diagram illustrative of a screen display in which the filter term "year 2002" is selected for the stacks of FIG. 10.

FIG. 26 is a diagram illustrative of a screen display in which the system provided filter term "year 2002" is selected. As noted above, under the by date indicator 622, the year selections 623 include the years 2000, 2001, or 2002. The selection box SB is shown to be around the year 2002, indicating that the user is selecting that as the desired filter term.

Figure 27:
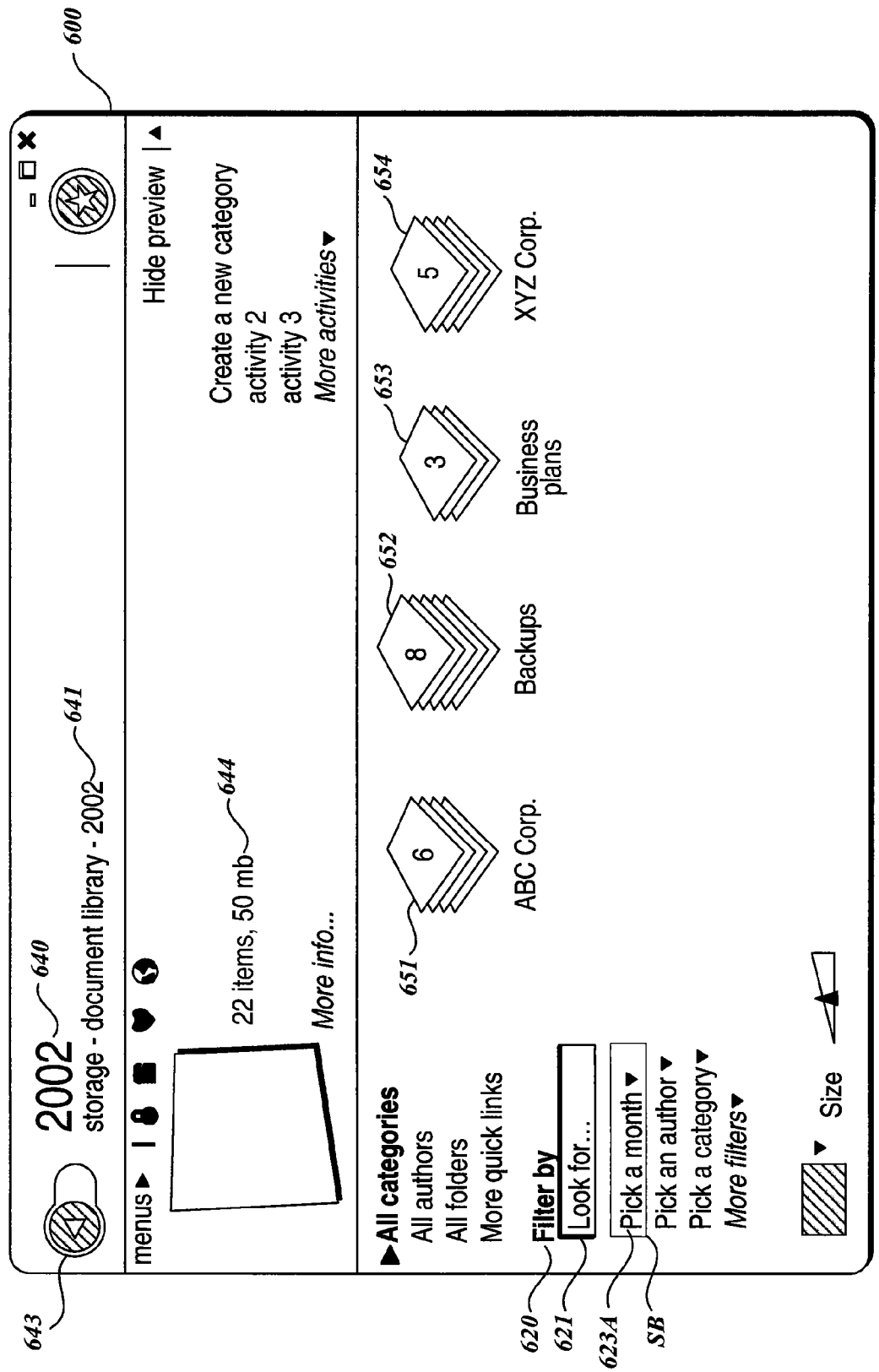
FIG. 27 is a diagram illustrative of a screen display in which the stacks of FIG. 10 have been filtered by the "year 2002" and the further selection of the filter term "month"

FIG. 27 is a diagram illustrative of a screen display in which the filter term "2002" has been applied. Also shown is the further selection of the "pick a month" selector 623A. As shown in FIG. 27, after applying the filter term "2002", the number of items in the stacks have been reduced. More specifically, the ABC Corp. stack 651 now contains six items, the Backups stack 652 now contains eight items, the Business Plans stack 653 now contains three items, and the XYZ Corp. stack 654 now contains five items. The information line 644 now indicates a total of 22 items, taking up a total of 50 MB of memory. The information lines 640 and 641 now indicate that the items shown on the display are those that have been filtered to contain the filter term "2002".

Figure 28:
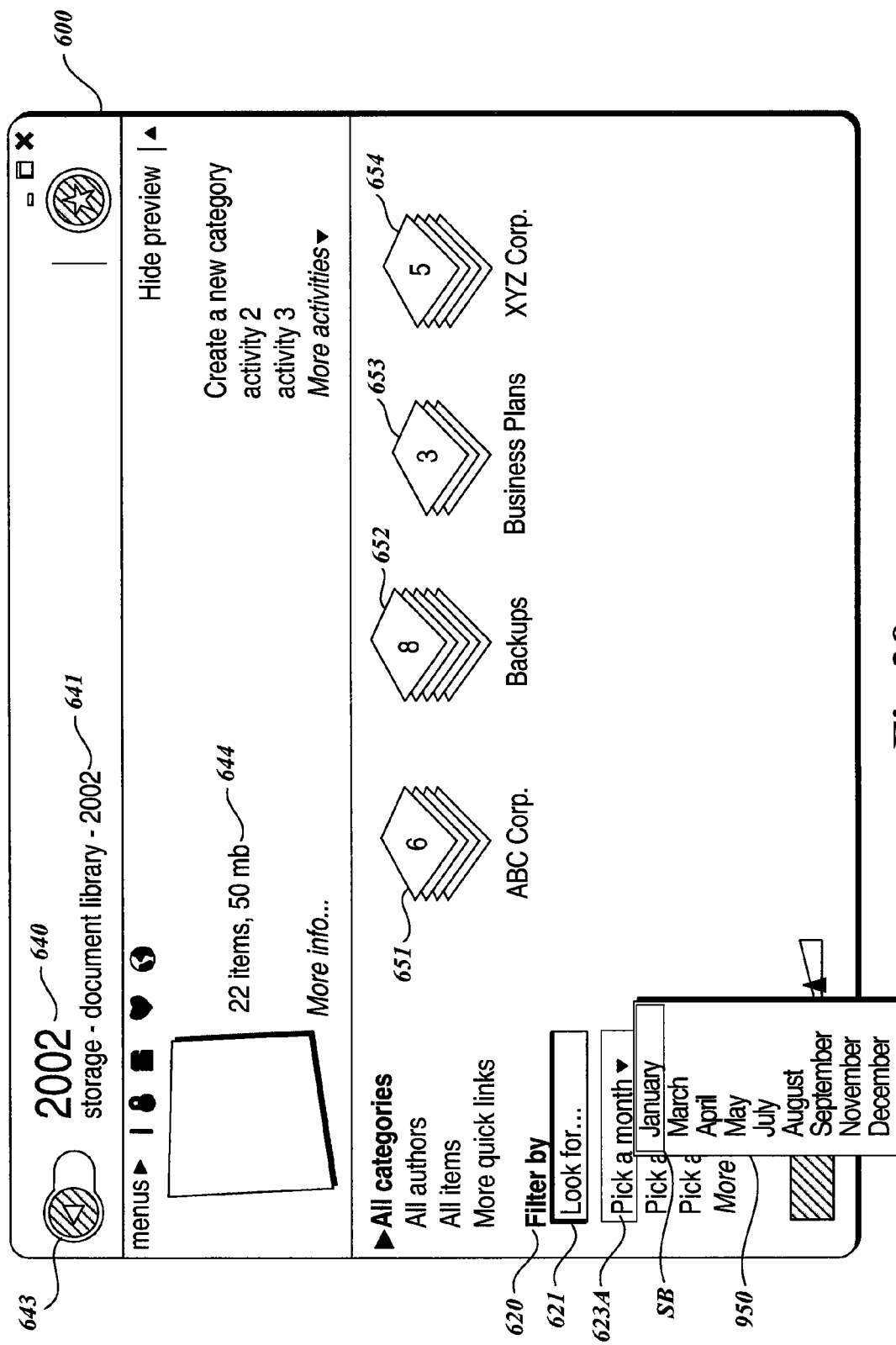
FIG. 28 is a diagram illustrative of a screen display in which a list is presented for selecting a month for filtering.

FIG. 28 is a diagram illustrative of a screen display in which a list is presented for selecting a month for filtering. A box 950 is provided which includes the list of the months. The box 950 has been provided on the display due to the user selecting the "pick a month" selector 623A. The selection box SB is shown to be around the month of January.

Figure 29:
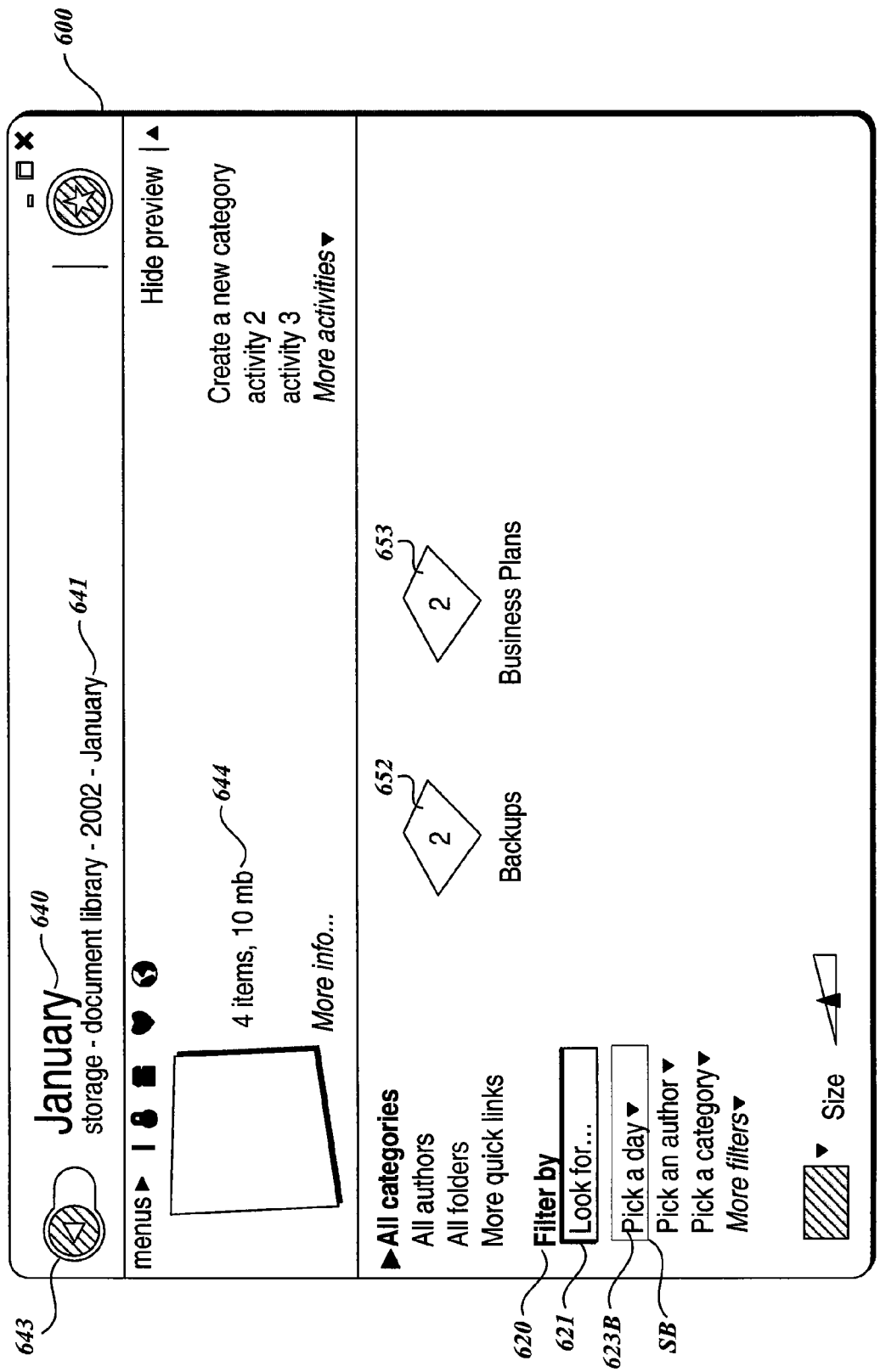
FIG. 29 is a diagram illustrative of a screen display wherein the stacks of FIG. 10 have been further filtered by the month of January, and further showing a filter term of "day"

FIG. 29 is a diagram illustrative of a screen display wherein the stacks of FIG. 28 have been further filtered by the month of January, and further showing a filter term of "day". As shown in FIG. 29, the information lines 640 and 641 now indicate that the items on the display are those that have been filtered by the term "January". The Backups stack 652 is now shown to contain two items, while the Business Plans stack 653 is also shown to contain two items. The information line 644 indicates that there are a total of four items on the display, which take up a total of 10 MB of memory. A "pick by day" selector 623B is provided, should the user wish to further filter the results to a specific day.

As described above with respect to FIGS. 24-29, filter terms may be presented by the system, or typed by a user. Once a filter term is selected, the remaining filter terms that are presented may be updated (e.g., after the year "2002" is selected in FIG. 26, in FIG. 27 the options for selecting a year are no longer presented and instead a "pick a month" option is provided). As noted above, the back button 643 may be selected by a user to back through the filtering process. For example, after the month of "January" has been selected in FIG. 29, the user may select the back button 643 to back up the filtering process to the year "2002", as illustrated in FIG. 27. The filter menu may also include a "stack by" function, which would work similarly to the stack by function described above with respect to FIGS. 15 and 16. For example, a "file type" filter could have choices for "Excel", "PowerPoint", "Word", and also "Stack by file type". Choosing the "stack by" function changes the view to show stacks for the various file types.

In general, the filters may be configured to apply to different properties of the files or items. In one embodiment, the filters may be classified according to different types, such as: alphabet index; discrete values; dates; and numerical ranges. Example properties for the alphabet index may include file name, author, artist, contact friendly name, owner, document author, document title, document subject, and description. Example properties for the discrete values may include location, file type (application name), genre, track, decade (for music), rating (for music), bit rate, protected, document category, document page count, document comments, camera model, dimensions, product name, product version, image X, image Y, and document created time. Example properties for the dates may include last accessed, last modified, created on, taken on (for pictures). An example property for the numerical range may be file size.

It will be appreciated that the filters described above with respect to FIGS. 24-29 allow users to reduce a list of items to find a particular item that is of interest. As a specific example, according to the processes described above, a user could narrow a current list of documents to only show Microsoft Word files, authored by a particular person and edited in the last week. This functionality allows a user to find a particular item in a list of many, and helps the user avoid having to manually scan each item in the list.

Figure 30:
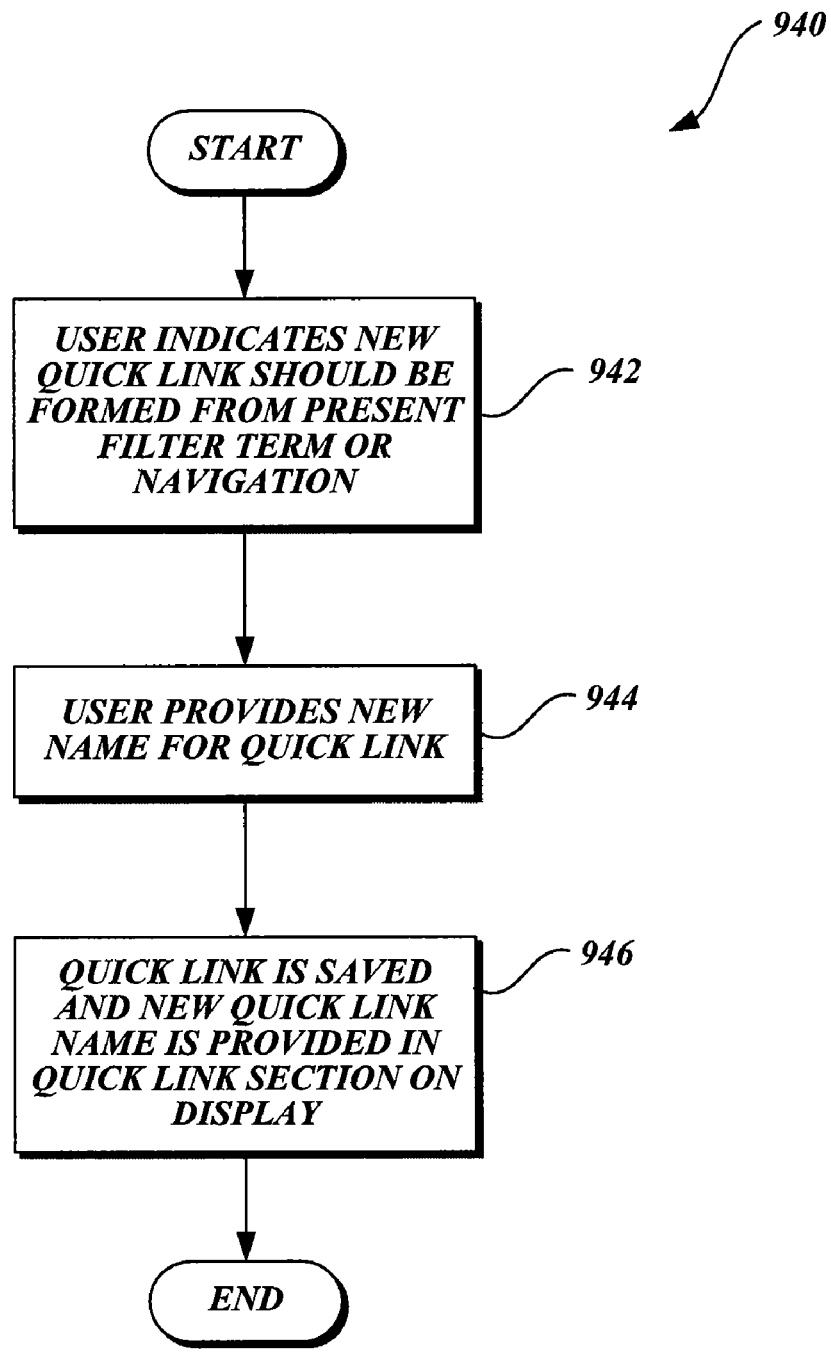
FIG. 30 is a flow diagram illustrative of a routine for creating a new quick link.

FIG. 30 is a flow diagram illustrative of a routine 940 for creating a new quick link. As will be described in more detail below, quick links are predefined links that can be clicked on by a user to create user selected views of the sets of items. In one embodiment, a quick link may be thought of as a type of pivot. Quick links provide a mechanism for retrieving a virtual folder. Clicking a quick link can take a user to a desired folder (in the same way that clicking a "favorites" may take a user to a Web site. The quick links can be predefined by the system, or can be set by a user. For example, clicking on "all authors" could return a view stacked by authors. Clicking on "all documents" may return a flat view for all of the documents for all of the storage areas. Users can also create their own quick links.

As shown in FIG. 30, at a block 942, a user makes a selection on the display to indicate that a new quick link should be formed from the present filter term or navigation. At a block 944, the user provides a new name for the new quick link. At a block 946, the new quick link is saved and the new quick link name is provided in the quick link section on the display.

Figure 31:
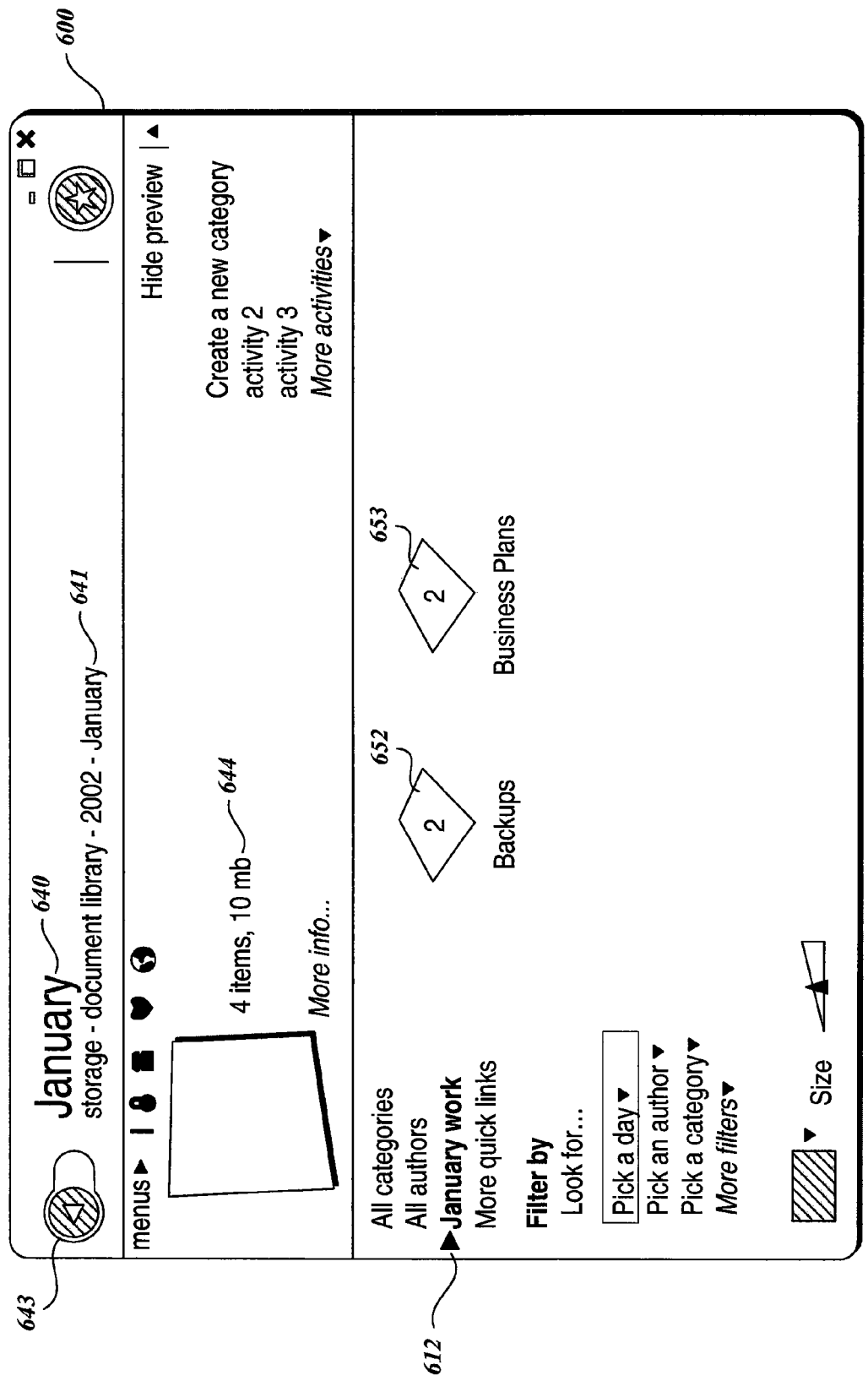
FIG. 31 is a diagram illustrative of a screen display for creating a new quick link called "January Work" based on the filtering of FIG. 29.

FIG. 31 is a diagram illustrative of a screen display for creating a new quick link called "January Work" based on the filtering of FIG. 29. As described above, in FIG. 29, the stacks have been filtered by the month of January. In FIG. 31, the user has indicated that the filtering of FIG. 29 should be saved as a new quick link, and has named the new quick link "January work". Thus, the new January work quick link 612 is shown in the quick links section of the display. With regard to forming new quick links, the user is generally provided with an option such as "save this collection as a quick link".

Figure 32:
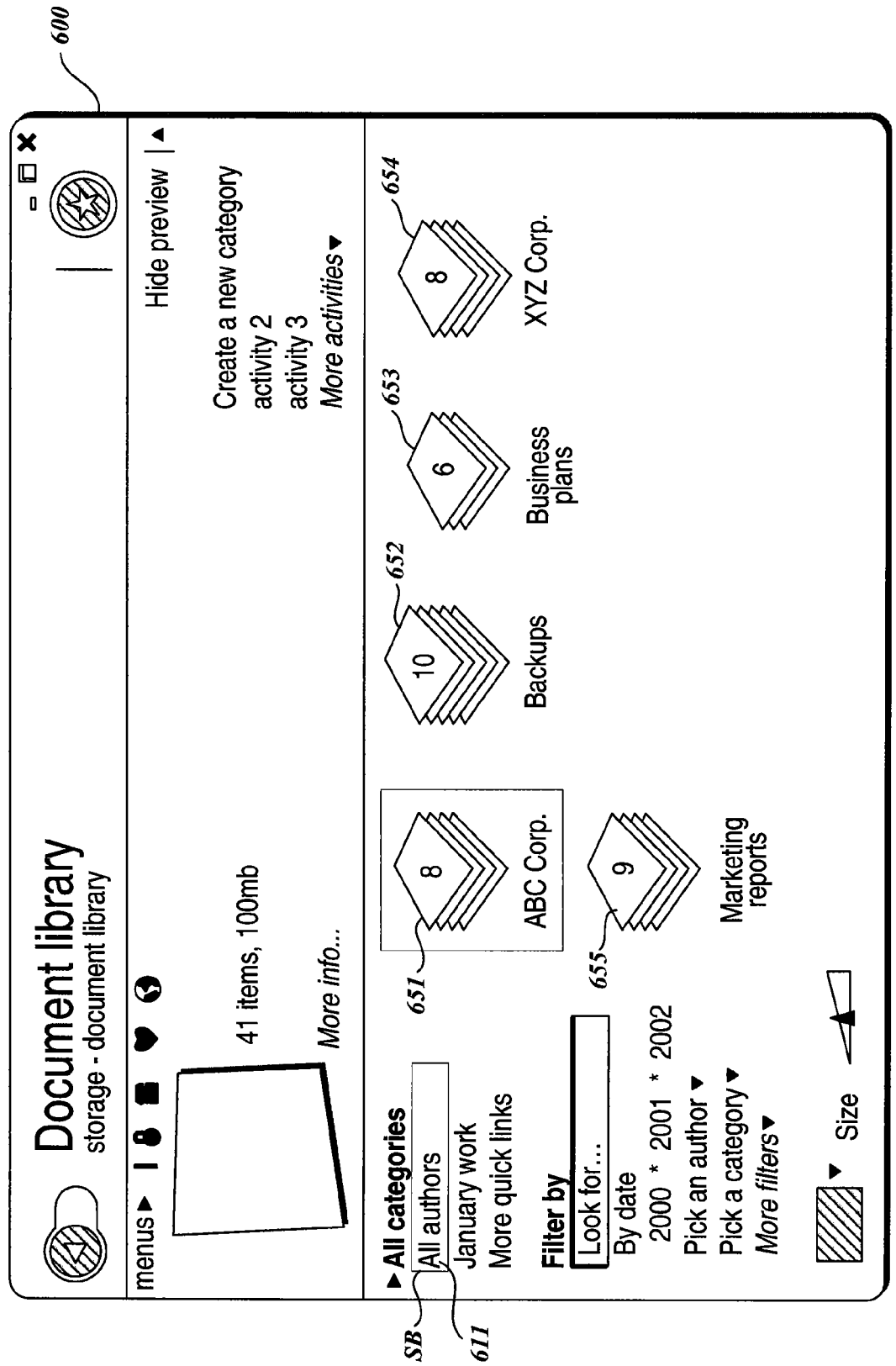
FIG. 32 is a diagram illustrative of a screen display in which a quick link of "All Authors" is selected.

FIG. 32 is a diagram illustrative of a screen display in which a quick link of "All Authors" is selected. As shown in FIG. 32, the selection box SB is shown around the All Authors selection 611. Other examples of collections that might be accessible by quick links include "all authors", "recent documents", "all documents I've shared", "all documents I've authored", "all documents not authored by me", "desktop", and "all types"

FIG. 33 is a diagram illustrative of a screen display in which a list of all of the authors of the items of FIG. 32 is presented. As shown in FIG. 33, an information line 950 is provided, which indicates columns for showing the name of an item, the author, the modified date, the type, the size, and the location of an item. A list of Authors 951-954 are shown, corresponding to Authors 1-4, respectively.

FIG. 34 is a diagram illustrative of a screen display in which "Author 1" has been selected from the list of FIG. 33. The Author 1's documents include documents 951A and 951B, corresponding to documents 1 and 2, respectively. The document 951A is shown to have been authored by Author 1, was modified on 11 Jul. 2001, is a Microsoft Excel file, takes up 282 Kb of memory, and was obtained from the location \\server1†folder2. The document 951B is shown to have been authored by Author 1, was modified on 22 Dec. 2002, is a Microsoft Word file, takes up 206 kilobytes of memory, and is physically stored in the location My Documents†folder1. The locations of the documents 951A and 951B also illustrate that the virtual folders of the present invention may contain items from different physical locations, as will be described in more detail below.

Figure 35:
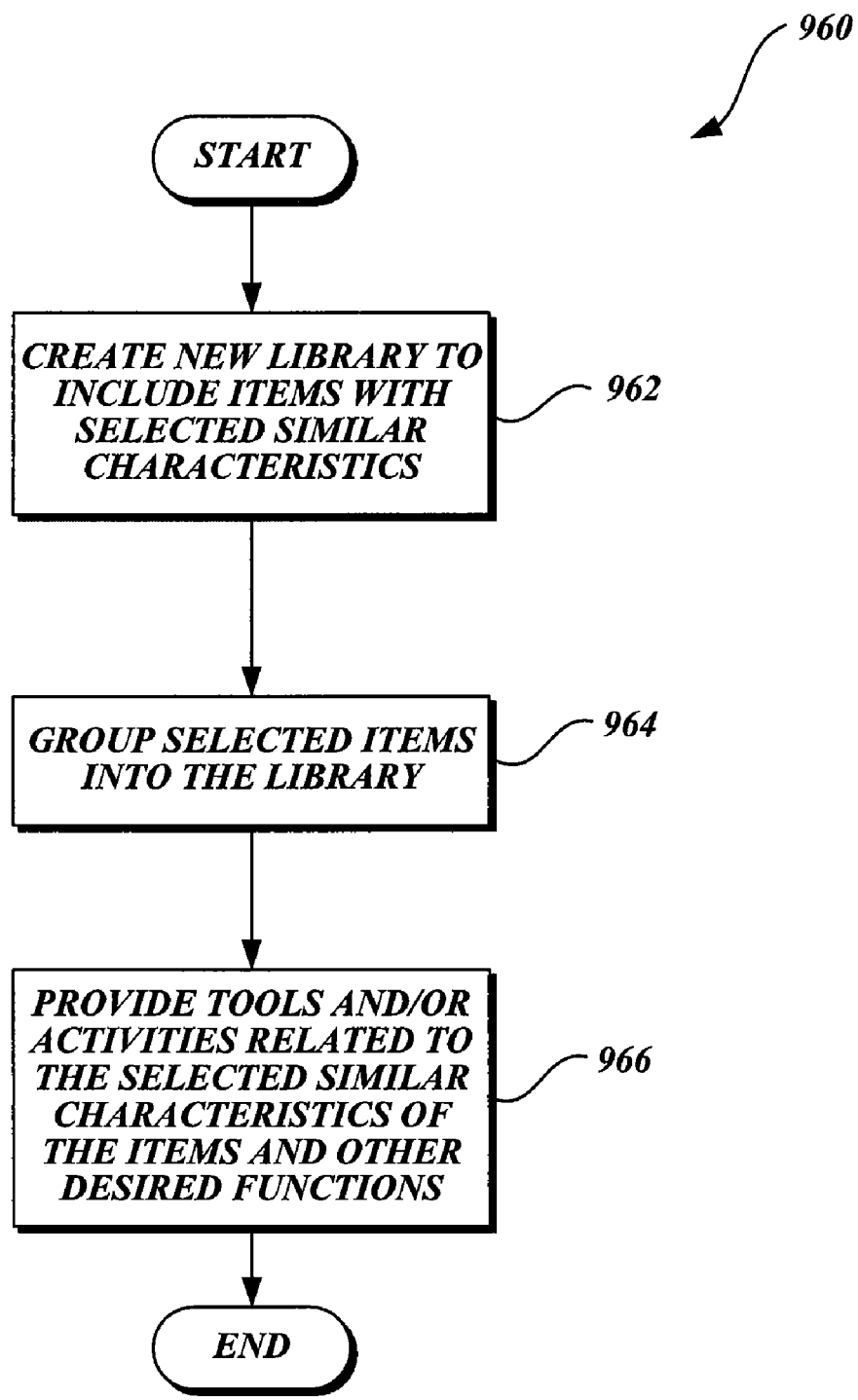
FIG. 35 is a flow diagram illustrative of a routine for creating a new library.

FIG. 35 is a flow diagram illustrative of a routine 960 for creating a new library. One example of a library is the documents library described above with reference to FIG. 10. In general, libraries consist of large groups of usable types of files that can be associated together. For example, photos may be one library, music may be another, and documents may be another. Libraries may provide tools and activities that are related to the particular types of items. For example, in the photo library, there may be tools and filters that relate to manipulating photos, such as for creating slide shows or sharing pictures. As shown in FIG. 35, at a block 962, a new library is created which is to include items with selected characteristics. At a block 964, the selected items are grouped into the library. At a block 966, the tools and/or activities related to the selected characteristics of the items or to other desired functions are provided.

Figure 36:
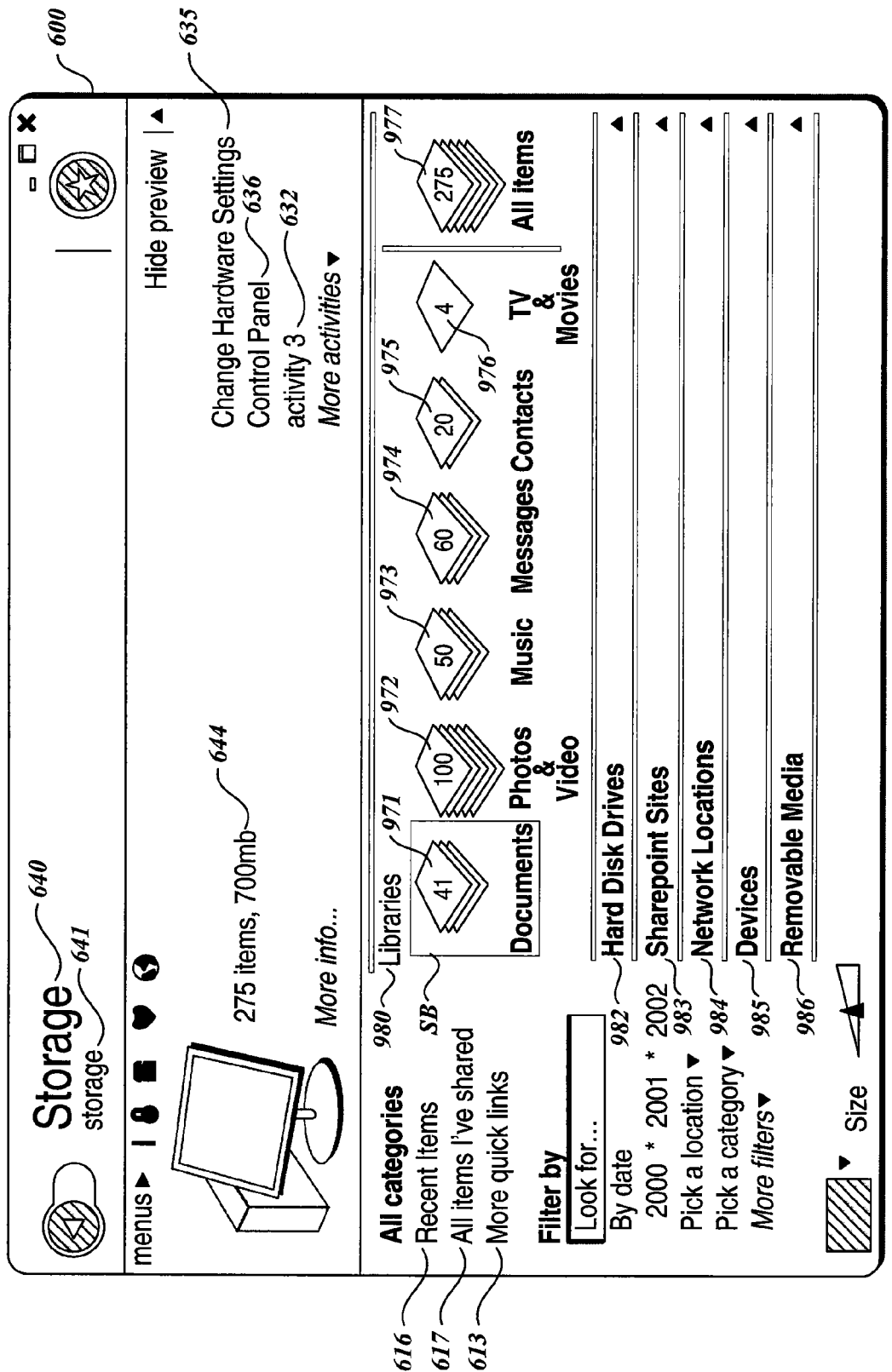
FIG. 36 is a diagram illustrative of a screen display in which a collection of various available libraries are shown.

FIG. 36 is a diagram illustrative of a screen display in which a collection of available libraries are shown. As shown in FIG. 36, the libraries include a documents library 971, a photos and video library 972, a music library 973, a messages library 974, a contacts library 975, and a TV and movies library 976, as well as an all items library 977. The all items library 977 is shown to include 275 items, which is the total number of items from all of the other libraries combined. The information line 644 indicates a total of 275 items, which take up a total of 700 MB of memory. It should be noted that the documents library 971 is the library that was described above with respect to FIG. 10.

Figure 37:
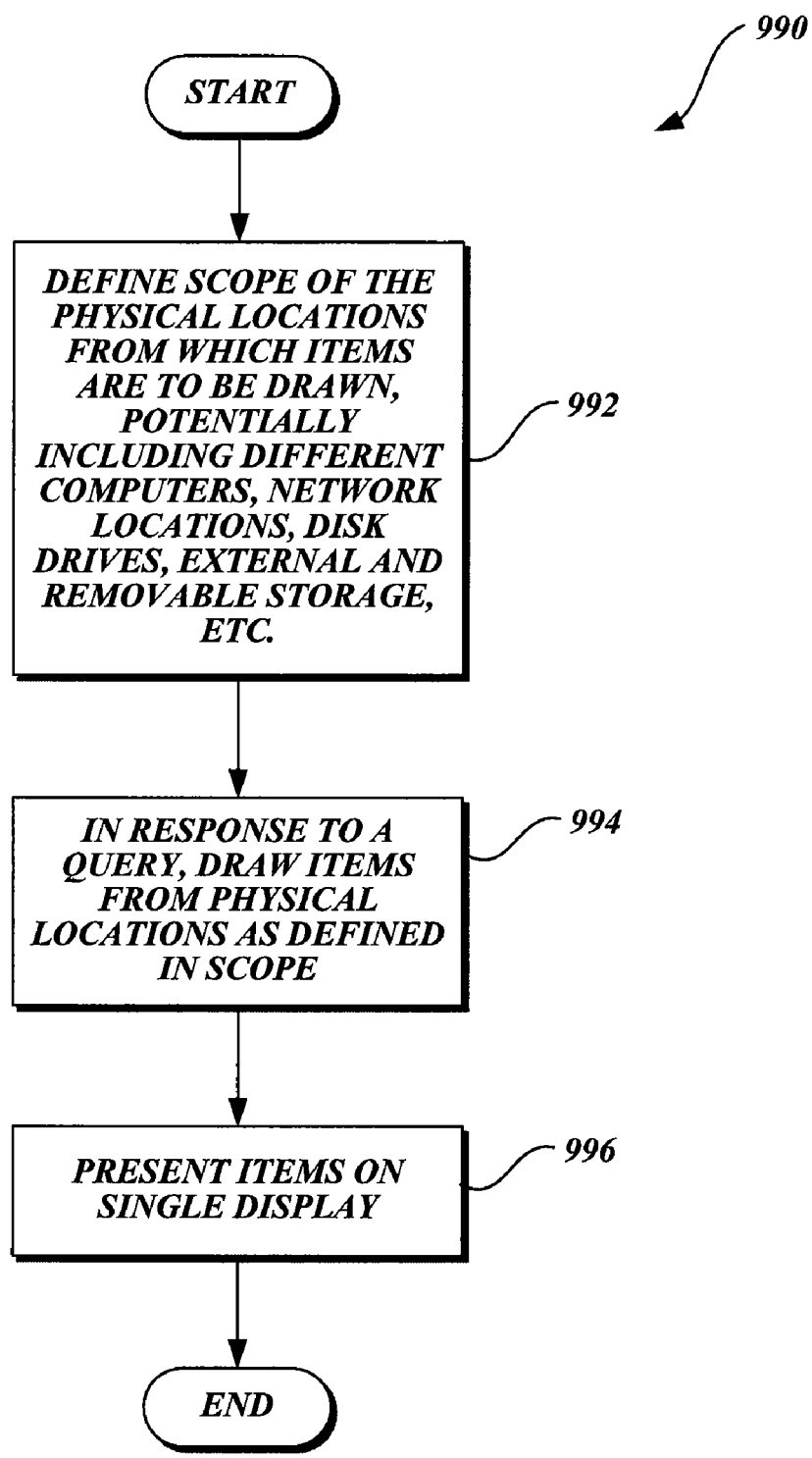
FIG. 37 is a flow diagram illustrative of a routine for defining the scope of a virtual folder collection.

FIG. 37 is a flow diagram illustrative of a routine 990 for defining the scope of a virtual folder collection. As will be described in more detail below, a virtual folder system is able to represent items from multiple physical locations (e.g., different hard drives, different computers, different networks locations, etc.) so that to a user, all of the items are readily accessible. For example, a user can be presented with music files from multiple physical locations on a single display, and manipulate the files all at once.

As shown in FIG. 37, at a block 992, a scope is defined for the physical locations from which items are to be drawn. At a block 994, in response to a query, the items are drawn from the physical locations as defined in the scope. At a block 996, all of the items drawn by the query are presented on a single display.

Figure 38:
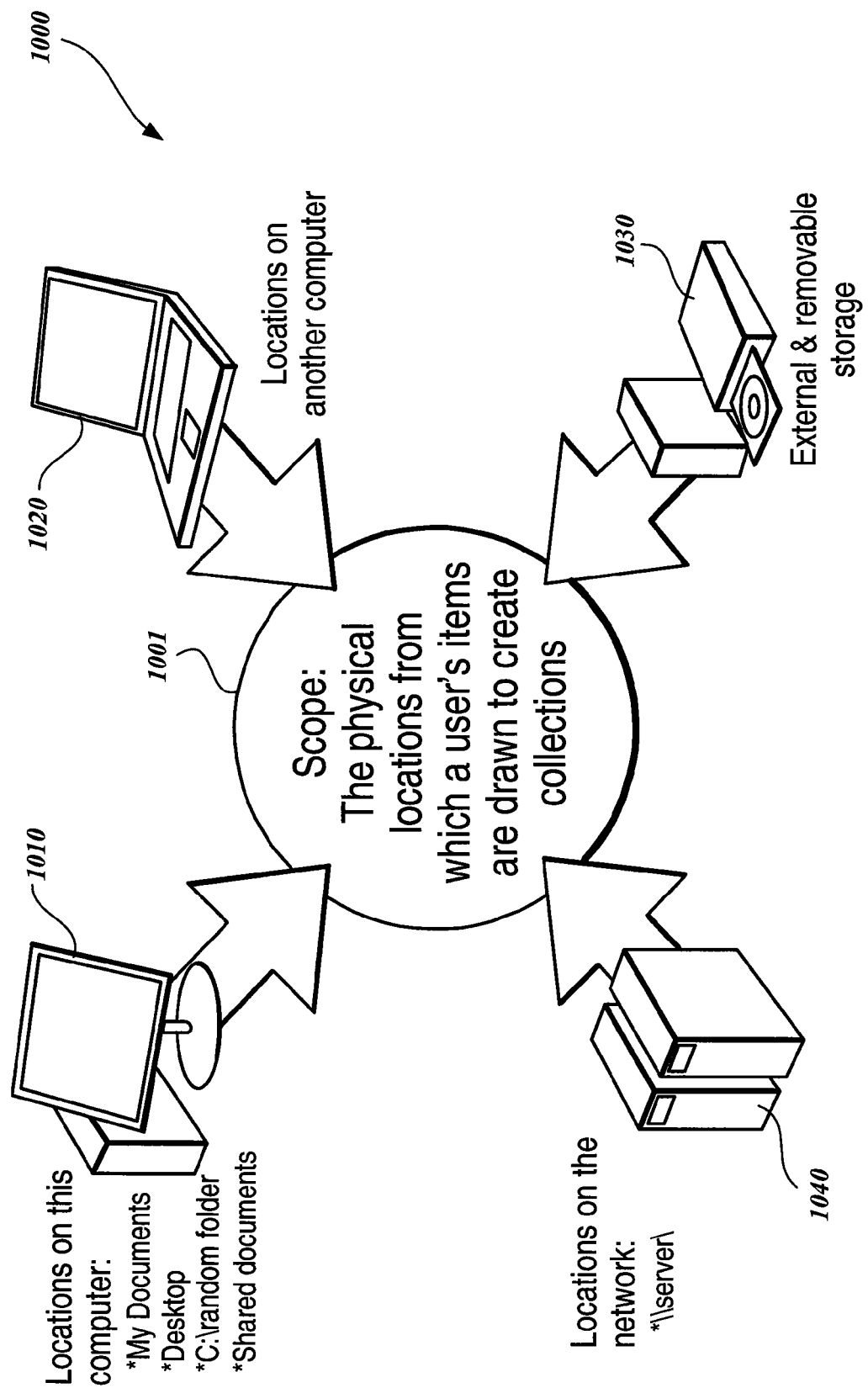
FIG. 38 is a block diagram illustrative of the various sources which may form the scope of a virtual folder collection.

FIG. 38 is a block diagram illustrative of the various sources which may form the scope of a virtual folder collection. As shown in FIG. 38, the system 1000 may include a present computer 1010, an additional computer 1020, external and removable storage 1030, and locations on a network 1040. The overall scope 1001 is described as including all of the physical locations from which a user's items are drawn to create collections. The scope may be set and modified by a user. As noted above, other figures have illustrated that items may come from different physical locations, such as FIG. 34 showing different documents coming from a server and a My Documents folder on a present computer, and in FIG. 18 showing physical folders that are physically stored in multiple locations.

Figure 39:
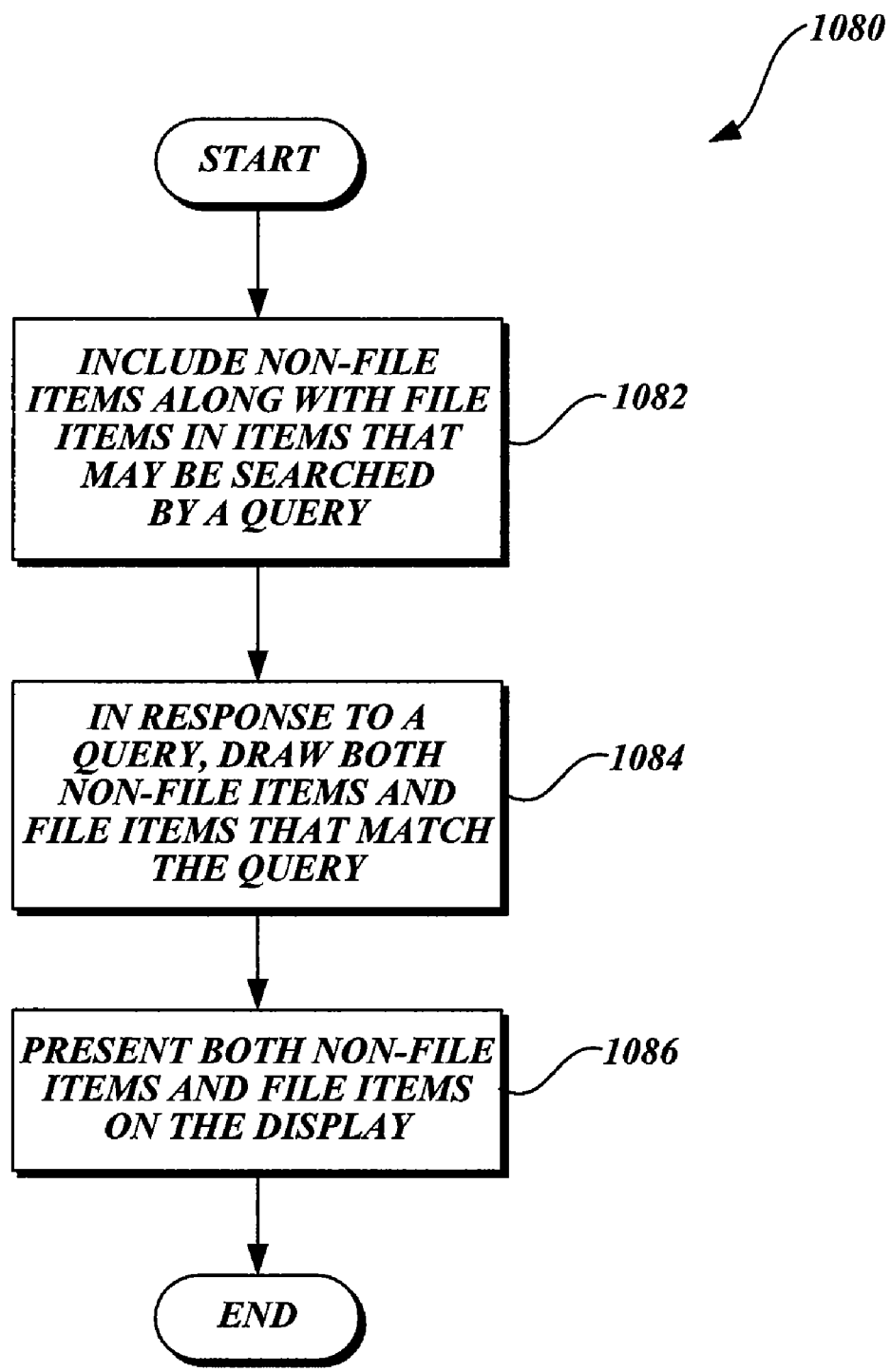
FIG. 39 is a flow diagram illustrative of a routine for including non-file items in a virtual folder collection.

FIG. 39 is a flow diagram illustrative of a routine 1080 for including non-file items in a virtual folder collection. Non-file items are contrasted with file items that are typically located in a physical file storage. Examples of non-file items would be things like e-mails, or contacts. As shown in FIG. 39, at a block 1082 a database is utilized to include non-file items along with file items that may be searched by a query. At a block 1084, in response to a query, both non-file items and file items are drawn to match the query. At a block 1086, both the non-file items and the file items that matched the query are presented on the display.

Figure 40:
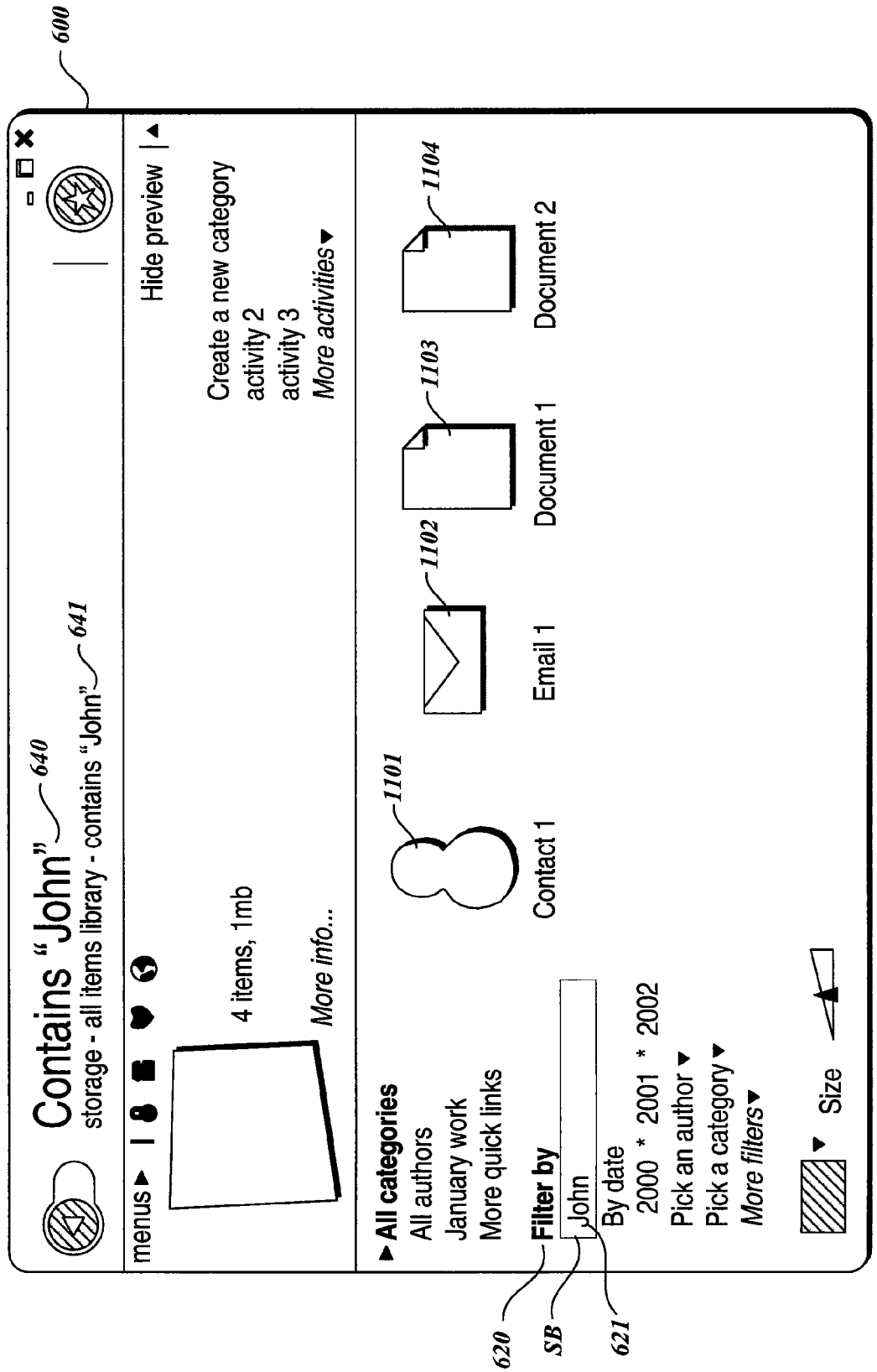
FIG. 40 is a diagram illustrative of a screen display showing various non-file items included in a virtual folder.

FIG. 40 is a diagram illustrative of a screen display showing various non-file items. As shown in FIG. 40, the items have been filtered to those that include "John". The items are shown to include a contact item 1101, an e-mail item 1102, and document items 1103 and 1104. The contact item 1101 and e-mail item 1102 are non-file items. The present system allows such non-file items to be included with regular file items, such that they can be organized and manipulated as desired by a user. As was described above with respect to FIG. 2, such non-file items may be contained entirely within the relational database 230, which otherwise includes information about the properties of files.

While the preferred embodiment of the invention has been illustrated and described, it will be appreciated that various changes can be made therein without departing from the spirit and scope of the invention.

What is claimed is:

1. In a computer system having a display and a memory for storing items with metadata properties, a method of refining the filtering of items, the method comprising:
   providing a plurality of display objects on the display that each represent one or more items, wherein the plurality of display objects is populated using a first enumerator structure and wherein display objects in the plurality can be directly manipulated;
   filtering the items represented by the display objects based on a filter term;
   modifying the display objects that are provided on the display so as to represent the items that have the metadata property that corresponds to the filter term in response to the filtering of the items, wherein one or more of the modified display objects comprises a virtual folder populated by a second enumerator structure;
   providing additional filtering functions on the display; and
   in response to the modifying of the display objects, modifying the additional filtering functions provided on the display corresponding to metadata properties of the filtered items that are represented on the display.

2. The method of claim 1, wherein the filter term is selected by the user from a plurality of filter terms that are provided on the display.

3. The method of claim 1, wherein the filter term comprises a plurality of characters and additional filtering is performed by the user adding additional characters to the filter term.

4. The method of claim 3, wherein a timer is utilized such that the filtering is performed after a user has entered characters of a filter term and has performed no additional activity for a predetermined period of time.

5. The method of claim 1, wherein a back button is provided to allow a user to back up through the filtering process.

6. The method of claim 1, wherein a library is provided that includes a collection of items and a set of tools for manipulating the items of the library, and the filter term is used for filtering the items of the library.

7. The method of claim 6, wherein the library comprises a shell browser.

8. The method of claim 1, wherein the items that are represented by the display objects on the display are physically stored in different folders unrelated within a hierarchical tree structure.

9. The method of claim 1, wherein the items that are represented by the display objects on the display are stored in different folders in a same physical location.

10. The method of claim 1, wherein the items that are represented by the display objects on the display are not stored in the same folder.

11. The method of claim 1 further comprising:
   providing a filter area on the display in which a user can enter the filter term; and
   receiving the filter term corresponding to a metadata property entered by the user in the filter area.

12. The system of claim 1, wherein the first enumerator structure is a conversion of a data structure of rows and columns in a relational database into a first identification list of the plurality of display objects; and wherein the second enumerator structure is a conversion, of the data structure, from rows and columns in the relational database into a second identification list containing entries associated with the items that have the metadata property that correspond to the filter term.

13. In a computer system having a display and a memory for storing items with metadata properties, a method of refining the filtering of items, the method comprising:
   providing a plurality of display objects on the display that each represent one or more items, wherein the display objects of the plurality are capable of direct manipulation and wherein the plurality of display objects is populated using a first enumerator structure;
   filtering the items represented by the display objects based on a filter term;
   modifying the display objects that are provided on the display so as to represent the items that have the metadata property that corresponds to the filter term in response to the filtering of the items, wherein one or more of the modified display objects comprises a virtual folder populated by a second enumerator structure and wherein the filtered items that are represented by the modified display objects on the display are stored in different physical locations comprising a present computer and a different computer;
   providing additional filtering functions on the display; and
   in response to the modifying of the display objects, modifying the additional filtering functions provided on the display according to the filtered items that are represented on the display.

14. The method of claim 13 further comprising:
   providing a filter area on the display in which a user can enter a filter term; and
   receiving a filter term corresponding to a metadata property entered by the user in the filter area.

15. In a computer system having a display and a memory for storing items with metadata properties, a method of refining the filtering of items, the method comprising:
   providing a plurality of display objects on the display that each represent one or more items and that can be directly manipulatedm wherein the plurality of display objects is populated using a first enumerator structure;
   filtering the items represented by the display objects based on a filter term;
   modifying the display objects that are provided on the display so as to represent the items that have the metadata property that corresponds to the filter term in response to the filtering of the items, wherein the filtered items that are represented by the modified display objects on the display comprise both file items and non-file items and wherein one or more of the modified display objects comprises a virtual folder populated by a second enumerator structure;
   providing additional filtering functions on the display; and
   in response to the modifying of the display objects, modifying the additional filtering functions provided on the display corresponding to metadata associated with the filtered items that are represented on the display.

16. The method of claim 15, wherein the non-file items comprise at least one of contacts or e-mails.

17. The method of claim 15, wherein the non-file items comprise an electronic communication.

18. The method of claim 15 further comprising:
   providing a filter area on the display in which a user can enter a filter term; and
   receiving a filter term corresponding to a metadata property entered by the user in the filter area.

* * * * *